(12) United States Patent
Boykin et al.

(10) Patent No.: US 12,433,872 B2
(45) Date of Patent: Oct. 7, 2025

(54) **TREATMENT OF *ACANTHAMOEBA* OR *BALAMUTHIA* TROPHOZOITES AND/OR CYSTS**

(71) Applicants: GEORGIA STATE UNIVERSITY RESEARCH FOUNDATION, INC., Atlanta, GA (US); UNIVERSITY OF GEORGIA RESEARCH FOUNDATION, INC., Athens, GA (US); UNIVERSITY OF SOUTH FLORIDA, Tampa, FL (US)

(72) Inventors: David W. Boykin, Atlanta, GA (US); Dennis E. Kyle, Athens, GA (US); Christopher A. Rice, Athens, GA (US); Abdelbasset A. Farahat, Atlanta, GA (US)

(73) Assignee: GEORGIA STATE UNIVERSITY RESEARCH FOUNDATION, INC., Atlanta, GA (US)

( * ) Notice: Subject to any disclaimer, the term of this patent is extended or adjusted under 35 U.S.C. 154(b) by 643 days.

(21) Appl. No.: 17/286,058

(22) PCT Filed: Oct. 17, 2019

(86) PCT No.: PCT/US2019/056761
§ 371 (c)(1),
(2) Date: Apr. 16, 2021

(87) PCT Pub. No.: WO2020/081829
PCT Pub. Date: Apr. 23, 2020

(65) Prior Publication Data
US 2022/0096441 A1    Mar. 31, 2022

Related U.S. Application Data

(60) Provisional application No. 62/746,940, filed on Oct. 17, 2018.

(51) Int. Cl.
| | | |
|---|---|---|
| A61K 31/4184 | (2006.01) |
| A01N 43/52 | (2006.01) |
| A01N 43/54 | (2006.01) |
| A61K 31/155 | (2006.01) |
| A61K 31/4174 | (2006.01) |
| A61K 31/4196 | (2006.01) |
| A61K 31/496 | (2006.01) |
| A61K 31/506 | (2006.01) |
| A61K 31/661 | (2006.01) |
| A61K 31/7036 | (2006.01) |
| A61K 31/785 | (2006.01) |
| A61K 38/12 | (2006.01) |
| A61P 33/04 | (2006.01) |
| C07D 235/18 | (2006.01) |
| C07D 235/20 | (2006.01) |
| C07D 403/04 | (2006.01) |
| C07D 403/14 | (2006.01) |

(52) U.S. Cl.
CPC .......... *A61K 31/4184* (2013.01); *A01N 43/52* (2013.01); *A01N 43/54* (2013.01); *A61K 31/155* (2013.01); *A61K 31/4174* (2013.01); *A61K 31/4196* (2013.01); *A61K 31/496* (2013.01); *A61K 31/506* (2013.01); *A61K 31/661* (2013.01); *A61K 31/7036* (2013.01); *A61K 31/785* (2013.01); *A61K 38/12* (2013.01); *A61P 33/04* (2018.01); *C07D 235/18* (2013.01); *C07D 235/20* (2013.01); *C07D 403/04* (2013.01); *C07D 403/14* (2013.01)

(58) Field of Classification Search
None
See application file for complete search history.

(56) References Cited

U.S. PATENT DOCUMENTS

| | | |
|---|---|---|
| 2010/0249175 A1 | 9/2010 | Wilson et al. |
| 2018/0243333 A1 | 8/2018 | Brown et al. |

FOREIGN PATENT DOCUMENTS

| | | |
|---|---|---|
| WO | 2017094204 | 6/2017 |

OTHER PUBLICATIONS

Brown, Nathan, Bioisosterism in Medicinal Chemistry, SN 9783527330157 (2012) (Year: 2012).*
Rice et al., Antimicrob Agents Chemother. Apr. 2015;59(4):2037-44 (Year:2015).*
Hu et al. Bioorg Med Chem Lett. Jul. 1, 2009;19(13):3374-3377 & 4626-4629 (Year: 2009).*
Kobrina et al., 1988 Russ. Chem. Rev. 57 62 (Year: 1988).*
Parija et al., Trop Parasitol. 2015;5(1):23-28 (Year: 2015).*
EP19873034.3 , "Partial Supplementary European Search Report", Jun. 15, 2022, 11 pages.
Hu et al., "Optimization of the Central Linker of Dicationic Bis-Benzimidazole Anti-MRSA And Anti-VRE Agents", Bioorganic & Medicinal Chemistry Letters, vol. 19, No. 13, May 20, 2009, pp. 3374-3377.
Hu et al., "Synthesis and Structure-Activity Relationship Of Dicationic Diaryl Ethers as Novel Potent Anti-MRSA And Anti-VRE Agents", Bioorganic & Medicinal Chemistry Letters, vol. 19, No. 16, Jun. 25, 2009, pp. 4626-4629.
Brocius et al., "Acanthamoeba: An Overview of the Challenges to the Development of a Consensus Methodology of Disinfection Efficacy Testing for Contact Lens Care Products", Eye & Contact Lens Science & Clinical Practice, vol. 44, No. 6, Nov. 2018, 4 pages.

(Continued)

Primary Examiner — Jeffrey S Lundgren
Assistant Examiner — Anthony Joseph Seitz
(74) Attorney, Agent, or Firm — Kilpatrick Townsend & Stockton LLP

(57) ABSTRACT

Compounds, compositions, and methods for the treatment of infections caused by *Acanthamoeba* or *Balamuthia mandrillaris* trophozoites and/or cysts and for the disinfection of solids and/or liquids, such as medical and personal care items, for example contact lenses, that may harbor *Acanthamoeba* trophozoites and/or cysts are provided.

28 Claims, No Drawings

(56) References Cited

OTHER PUBLICATIONS

Cabello-Vilchez, "Granulomatous Meningoencephalitis Balamuthia Mandrillaris in Peru: Infection of the Skin and Central Nervous System", SMG ebooks titled Encephalitis, Feb. 16, 2017, 23 pages.
Clarke et al., "The Pathophysiology of Acanthamoeba Keratitis", Trends in Parasitology, vol. 22, No. 4, Apr. 2006, pp. 175-180.
Elder et al., "A Clinicopathologic Study of In Vitro Sensitivity Testing and Acanthamoeba Keratitis", Investigative Ophthalmology & Visual Science, vol. 35, No. 3, Mar. 1994, pp. 1059-1064.
Fuerst et al., "Phylogenetic Analysis and the Evolution of the 18S rRNA Gene Typing System of Acanthamoeba", Journal of Eukaryotic Microbiology, vol. 62, No. 1, Jan.-Feb. 2015, pp. 69-84.
Kappagoda et al., "Symposium on Antimicrobial Therapy Antiparasitic Therapy", Mayo Clinic Proceedings, vol. 86, No. 6, Jun. 2011, pp. 561-583.
Khan, "Pathogenesis of Acanthamoeba Infections", Microbial Pathogenesis, vol. 34, No. 6, Jun. 2003, pp. 277-285.
Lehmer et al., "Cutaneous Balamuthia Mandrillaris Infection as a Precursor to Balamuthia Amoebic Encephalitis (BAE) in a Healthy 84-Year-Old Californian", Dermatology Online Journal, vol. 23, No. 7, Jul. 2017, pp. 1-10.
Lemgruber et al., "The Fine Structure of the Acanthamoeba Polyphaga Cyst Wall", FEMS Microbiology Letters, vol. 305, No. 2, Apr. 2010, pp. 170-176.
Lorenzo-Morales et al., "An Update on Acanthamoeba Keratitis: Diagnosis, Pathogenesis and Treatment", Parasite, vol. 22, No. 10, 2015, pp. 1-20.
Martinez et al., "Successful Treatment of Balamuthia Mandrillaris Amoebic Infection With Extensive Neurological and Cutaneous Involvement", Clinical Infectious Diseases, vol. 51, No. 2, Jul. 15, 2010, pp. e7-e11.
Martin-Navarro et al., "The Potential Pathogenicity of Chlorhexidine-Sensitive Acanthamoeba Strains Isolated From Contact Lens Cases from Asymptomatic Individuals in Tenerife, Canary Islands, Spain", Journal of Medical Microbiology, vol. 57, No. 11, 2008, pp. 1399-1404.
Matin et al., "Balamuthia Mandrillaris Interactions With Human Brain Microvascular Endothelial Cells in Vitro", Journal of Medical Microbiology, vol. 56, Aug. 2007, pp. 1110-1115.
McBride et al., "Development of Colorimetric Microtiter Plate Assay for Assessment of Antimicrobials against Acanthamoeba", Journal of Clinical Microbiology, vol. 43, No. 2, Feb. 2005, pp. 629-634.
Neelam et al., "Pathobiology and Immunobiology of Acanthamoeba Keratitis: Insights from Animal Models", The Yale Journal of Biology and Medicine, vol. 90, No. 2, Jun. 23, 2017, pp. 261-268.
Oldenburg et al., "Microbiological cure times in Acanthamoeba Keratitis", Eye, vol. 25, No. 9, Sep. 2011, pp. 1155-1160.
Padzik et al., "Tannic Acid-Modified Silver Nanoparticles as a Novel Therapeutic Agent Against Acanthamoeba", Parasitology Research, vol. 117, Aug. 15, 2018, pp. 3519-3525.
Application No. PCT/US2019/056761, International Search Report and Written Opinion, Mailed On Dec. 30, 2019, 17 pages.
Perez-Santonja et al., "Persistently Culture Positive Acanthamoeba Keratitis: in Vivo Resistance and in Vitro Sensitivity", Ophthalmology, vol. 110, No. 8, Aug. 2003, pp. 1593-1660.
Rice et al., "Bis-Benzimidazole Hits against Naegleria fowleri Discovered with New High-Throughput Screens", Antimicrobial Agents and Chemotherapy, vol. 59, No. 4, 2015, pp. 2037-2044.
Shehab et al., "Balamuthia Mandrillaris Granulomatous Amebic Encephalitis With Renal Dissemination in a Previously Healthy Child: Case Report and Review of the Pediatric Literature", Journal of the Pediatric Infectious Diseases Society, vol. 7, No. 3, Sep. 2018, pp. e163-e168.
Siddiqui et al., "Balamuthia Mandrillaris Resistance to Hostile Conditions", Journal of Medical Microbiology, vol. 57, Apr. 2008, pp. 428-431.
Siddiqui et al., "Balamuthia Mandrillaris: Morphology, Biology, and Virulence", Tropical Parasitology, vol. 5, No. 1, Jan.-Jun. 2015, pp. 15-22.
Siddiqui et al., "Biology and Pathogenesis of Acanthamoeba", Parasites & Vectors, vol. 5, Jan. 10, 2012, pp. 1-13.
Thomson et al., "Characterization of Sterol Biosynthesis and Validation of 14α-Demethylase as a Drug Target in Acanthamoeba", Scientific Reports, vol. 7, No. 1, Aug. 15, 2017, pp. 1-9.
Verani et al., "National Outbreak of Acanthamoeba Keratitis Associated With Use of a Contact Lens Solution, United States", Emerging Infectious Diseases, vol. 15, No. 8, Aug. 2009, pp. 1236-1242.
Msvesvara et al., "Pathogenic and Opportunistic Free-Living Amoebae: *Acanthamoeba* Spp., Balamuthia Mandrillaris, Naegleria Fowleri, and Sappinia Diploidea", FEMS Immunology & Medical Microbiology, vol. 50, No. 1, Jun. 2007, pp. 1-26.

\* cited by examiner

TREATMENT OF *ACANTHAMOEBA* OR *BALAMUTHIA* TROPHOZOITES AND/OR CYSTS

RELATED APPLICATIONS

This application claims the benefit of U.S. Provisional Application No. 62/746,940, filed Oct. 17, 2018, the entirety of which is incorporated by reference.

GOVERNMENT INTEREST

This invention was made with government support under Grant No. NIH R21 AI1119787 awarded by the National Institutes of Health. The government has certain rights in the invention.

FIELD OF THE INVENTION

The present invention provides compounds, compositions, and methods for the treatment of infections caused by *Acanthamoeba* or *Balamuthia mandrillaris* trophozoites and/or cysts and for the disinfection of medical and personal care items, for example contact lenses, that may harbor *Acanthamoeba* trophozoites and/or cysts.

BACKGROUND OF THE INVENTION

*Acanthamoeba* are a genus of amoebae that are found ubiquitously and are among the most prevalent protozoa found in the environment. *Acanthamoeba* have been isolated from a diverse array of locations such as soil, air, sewage, seawater, chlorinated swimming pools, domestic tap water, bottled water, dental treatment units, hospitals, air conditioning units, and contact lens cases. *Acanthamoeba* have also been found on human skin, nasal cavities, throats, and intestines, as well as within plants and other mammals. In nature, *Acanthamoeba* typically consume bacteria, but in some situations they can cause infectious disease in humans and other animals, resulting in a condition known as Acanthamebiasis.

Members of the *Acanthamoeba* genus are distinguished from other genera of protists by examination of their morphological characteristics; however, differentiating one species of *Acanthamoeba* from another can prove difficult. Based on 18S ribosomal RNA (rRNA) sequencing, known *Acanthamoeba* species can be organized into 20 groups (T1-T20), with most disease-causing species belonging to the T4 subtype (see Fuerst, P. A. et al. "Phylogenetic Analysis and the Evolution of the 18S rRNA Gene Typing System of *Acanthamoeba*" J. Eukaryot. Microbiol. 2015, 62:69-84; and Siddiqui et al. "Biology and pathogenesis of *Acanthamoeba*" Parasites and Vectors 2012, 5:6).

While transmission may occur by other routes, infection caused by *Acanthamoeba* keratitis is most commonly associated with contact lens use, particularly when lens wearers carry out improper lens disinfection or hand washing before handling contact lenses. Multipurpose contact lens solutions are generally ineffective against *Acanthamoeba*. In a well-known example, an outbreak of *Acanthamoeba keratitis* was tied to the Complete Moisture contact lens solution produced by Advanced Medical Optics, leading to a voluntary recall in 2007 (see Lorenzo Morales, J. et al.). Studies by the Centers for Disease Control (CDC) found that use of this ineffective lens solution led to a 17-fold increased risk of contracting *Acanthamoeba keratitis* (see Verani, J. R. et al. "National outbreak of *Acanthamoeba keratitis* associated with use of a contact lens solution, United States" Emerg. Infect. Dis. 2009, 15:1236-42). With increasing numbers of contact lens wearers, the incidence of *Acanthamoeba keratitis* has been steadily increasing around the world.

*Acanthamoeba keratitis* is a disorder caused by an eye infection of *Acanthamoeba* that may lead to corneal ulcers and eventual blindness. Severe disease can require corneal transplants or even enucleation of the eye. Symptoms include severe eye pain, severe corneal keratitis, corneal perineuritis and eventual formation of a ring-shaped corneal ulcer upon later progression of the disease. The pathological sequence in *Acanthamoeba keratitis* typically involves initial breakdown of the epithelial layer of the cornea, stromal invasion by the amoebae, keratocyte depletion, induction of an intense inflammatory response, photophobia, and finally stromal necrosis that may lead to blindness (see Brocius J. et al. "*Acanthamoeba*: An Overview of the Challenges to the Development of a Consensus Methodology of Disinfection Efficacy Testing for Contact Lens Care Products" Eye & Contact Lens 2018, 44:351-354).

*Acanthamoeba keratitis* pathology starts with attachment of the organism to mannosylated glycoproteins on the surface of the cornea via MIP-133, an cytolytic amoeba protease (see Neelam S. et al. "Pathobiology and Immunobiology of *Acanthamoeba* keratitis: Insights from Animal Models" Yale J. Biol. Med. 2017, 90(2):261-268; and Clarke, D. W. et al. "The pathophysiology of *Acanthamoeba keratitis*" Trends Parasitol. 2006, 22(4):175-180). The amoeba continuously produces MIP-133 along with serine and cysteine proteases, elastase, metalloproteinase and a plasminogen activator to allow penetration into the stroma. *Acanthamoeba* are rarely documented to penetrate the corneal epithelium and infect intraocularly. Moderately successful treatment can be achieved by using chlorhexidine gluconate, polyhexamethylene biguanide (PHMB), and propamidine, with or without the use of neomycin, azoles, or other antibiotics for the treatment of secondary infections. Even with the use of these treatments, *Acanthamoeba keratitis* often has recurrent episodes of corneal and scleral inflammation, requiring prolonged therapy up to 82 days (see Perez-Santonja, J. et al. "*Acanthamoeba* keratitis: in vivo resistance and in vitro sensitivity" Ophthamol. 2003, 110:1593-1600; and Oldenburg, C. E. et al. "Microbiological cure times in *Acanthamoeba keratitis*" Eye 2011, 25(9): 1155-60). The requirement for prolonged therapy has created concerns about potential drug resistance (see Khan, N. A. "Pathogenesis of *Acanthamoeba* infections" Microb. Pathogen. 2003, 34:277-85). Additionally, the compounds currently used have poor selectivity indices and are toxic after prolonged use (see Lorenzo-Morales, J. et al. "An update on *Acanthamoeba keratitis*: diagnosis, pathogenesis, and treatment" Parasite 2015, 22:10). If the above treatments are not successful, keratoplasty procedures such as a corneal transplant are sometimes required.

Granulomatous amoebic encephalitis (GAE) is a disease of the brain and spinal cord more commonly caused by *Acanthamoeba*, but also by *Balamuthia mandrillaris*. Symptoms of the central nervous disorder include focal paralysis, seizures, and neurological problems. GAE has a 98% mortality rate, in part because most cases are misdiagnosed on initial clinical presentation (Cabello-Víchez A M. 2017. "Granulomatous Meningoencephalitis *Balamuthia mandrillaris* in Peru: Infection of the Skin and Central Nervous System" from SMG ebooks titled Encephalitis). While several cases have been reported worldwide, only four cases have been successfully treated in the United States (Dalila Y. Martinez, et al., Successful Treatment of *Balamuthia man-*

*drillaris* Amoebic Infection with Extensive Neurological and Cutaneous Involvement, Clinical Infectious Diseases, Volume 51, Issue 2, 15 Jul. 2010, Pages e7-e11).

*Balamuthia mandrillaris* is the only known pathogenic species of the amoebae genus *Balamuthia*. *B. mandrillaris* was isolated in 1986 from the brain of a mandrill baboon that died of meningoencephalitis. *B. mandrillaris* is commonly found as trophozoites or cysts in soil and water environments. Inhalation of contaminated water droplets into the lungs or infections through breaks in the skin can cause cutaneous plaque lesions (Lehmer L M, Ulibarri G E, Ragsdale B D, Kunkle J. 2017. Cutaneous *Balamuthia mandrillaris* infection as a precursor to *Balamuthia* amoebic encephalitis (BAE) in a healthy 84-year-old Californian. Dermatol Online J 23). Haematogenous dissemination has been suspected to be the transmission route of these parasites to spread to various tissues/organs. The parasite can also use proteases to break down the blood-brain barrier to gain entry into the brain (Matin A, Siddiqui R, Jung S Y, Kim K S, Stins M, et al. *Balamuthia mandrillaris* interactions with human brain microvascular endothelial cells in vitro. J Med Microbiol. 2007; 56: 1110-1115).

Anti-parasitic therapy for granulomatous amoebic encephalitis (GAE) caused by *Acanthamoeba* and *B. mandrillaris* is based on limited experimental data and the low number reports of successful treatments. Physicians are almost always advised to consult with a Center for Disease Control (CDC) expert if an amoebic infection is suspected. Treatment duration has not been well established and may depend on several underlying factors, but case-by-case treatments have ranged from several weeks to years.

*Acanthamoeba* and *B. mandrillaris* have two distinct stages in their life cycle: a trophozoite stage, where the organism is active and feeding; and a cyst stage, where the organism is dormant. *Acanthamoeba* trophozoites have a cell membrane composed mainly of ergosterol which can be damaged by azole therapeutics (see Thomson, S. et al. "Characterization of sterol biosynthesis and validation of 14α-demethylase as a drug target in *Acanthamoeba*" Sci. Rep. 2017, 7(1):8247). In contrast, cysts of *Acanthamoeba* are protected by a double cell wall, containing an inner endocyst and an outer exocyst composed of cellulose (see Lemgruber, L. et al. "The fine structure of the *Acanthamoeba polyphaga* cyst wall" FEMS Microbiology Letters 2010, 305:170-6).

*B. mandrillaris* cysts are well-protected with a triple wall: an inner (the endocyst), and outer wall (the ectocyst), and thick amorphous, fibrillary middle layer, the mesocyst (see Siddiqui et al. "*Balamuthia mandrillaris*: Morphology, biology, and virulence" Trop Parasitol. 2015, 5(1): 15-22).

The presence of the cell wall protection makes *Acanthamoeba* and *B. mandrillaris* cysts highly resistant to a wide variety of biocides. It has been reported that *B. mandrillaris* cysts can survive repeated freeze-thawing (five times), temperatures of up to 70° C., and 200 mJ UV irradiation cm-2 (see Siddiqui et al. "*Balamuthia mandrillaris* resistance to hostile conditions" Journal of Medical Microbiology 2008, 57: 428-531). *Acanthamoeba* can encyst within ocular tissues, leading to recurring infections after drug treatment. Encystation within ocular tissues can be problematic even for patients who received a corneal transplant, leading to recurrent infections after keratoplasty treatment. Further, inconsistent assays have been used that may often overestimate cysticidal effects due to insufficient time to allow for any potential excystation.

Therefore, development of new therapeutics against *Acanthamoeba* and *B. mandrillaris* have been slow, with most protozoa studies focusing on the evaluation of existing antimicrobials or disinfectants. Little attention has been given to the development of compounds and methods that are effective against both trophozoicidal and cysticidal activity.

Thus, there is a clear need for the development of new compounds against *Acanthamoeba* species and *B. mandrillaris* that exhibit broad and effective activity against both trophozoites and cysts.

SUMMARY OF THE INVENTION

The present invention provides compounds, compositions and their uses and manufacture for the treatment of infections of *Acanthamoeba* species and *B. mandrillaris* in both the active trophozoite life stage and the dormant cyst life stage.

In contrast, many currently used therapeutic agents and disinfectants against *Acanthamoeba* are either only effective against the trophozoites or have questionable cysticidal activity. The required cysticidal concentrations are typically more toxic to normal tissue, leading to complications when used in extended therapy.

The present invention provides treatment with typically no excystation observed for at least about 5 days (more generally often at least about 10 days, at least about 15 days, at least about 20 days, at least about 25 days, at least about 27 days, at least about 30 days, or even at least about 40 days or more) after initial administration.

In one aspect, a method is provided for the treatment or prevention of an infection by one or more *Acanthamoeba* species comprising administering to a patient in need thereof, an effective amount of a compound of Formula 1:

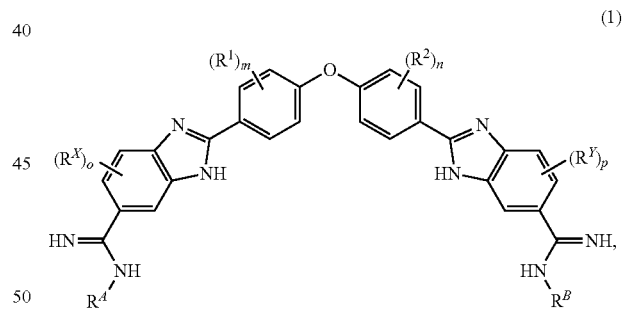

wherein or a pharmaceutically acceptable salt thereof;

$R^A$ and $R^B$ are each independently $C_1$-$C_6$alkyl;

$R^X$ and $R^Y$ are independently at each occurrence selected from halo (for example F, Cl, or Br), $C_{1-4}$alkoxy, and $C_1$-$C_4$haloalkyl;

$R^1$ and $R^2$ are independently selected at each occurrence from halo (for example F, Cl, or Br), $C_1$-$C_4$alkoxy, and $C_1$-$C_4$haloalkyl; and and p are independently at each occurrence selected from 0, 1, 2 and 3; and m and n are independently selected from 0, 1, 2, 3, and 4.

In one aspect, a compound is provided of Formula 2 or Formula 3:

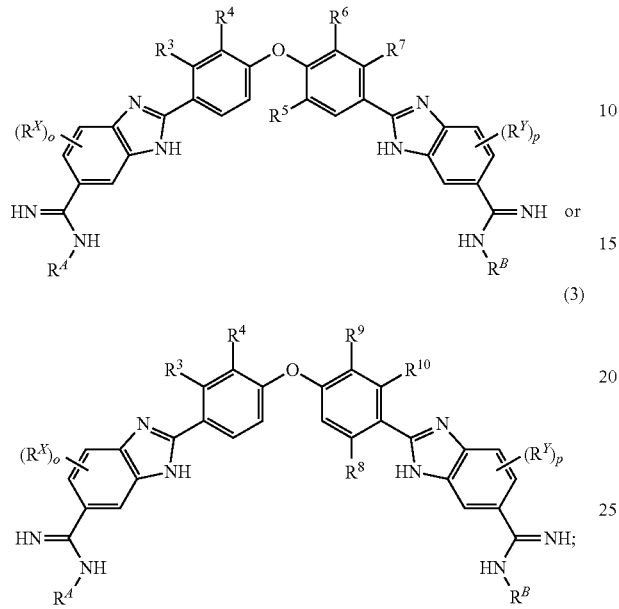

or a pharmaceutically acceptable salt thereof;
wherein
and p are independently at each occurrence selected from 0, 1, 2 and 3;
$R^A$ and $R^B$ are each independently $C_1$-$C_6$alkyl;
$R^X$ and $R^Y$ are independently at each occurrence selected from halo (for example F, Cl, or Br), $C_{1-4}$alkoxy, and $C_1$-$C_4$haloalkyl;
$R^3$ and $R^4$ are independently at each occurrence selected from hydrogen, halo, $C_1$-$C_4$alkoxy, and $C_1$-$C_4$haloalkyl;
$R^5$ is selected from halo, $C_1$-$C_4$alkoxy, and $C_1$-$C_4$haloalkyl;
$R^6$ and $R^7$ are independently at each occurrence selected from hydrogen, halo, $C_1$-$C_4$alkoxy, and $C_1$-$C_4$haloalkyl; wherein at least one of $R^6$ and $R^7$ is not hydrogen;
$R^8$ is selected from halo, $C_1$-$C_4$alkoxy, and $C_1$-$C_4$haloalkyl; and
$R^9$ and $R^{10}$ are independently at each occurrence selected from hydrogen, halo, $C_1$-$C_4$alkoxy, and $C_1$-$C_4$haloalkyl; wherein at least one of $R^9$ and $R^{10}$ is not hydrogen.

In an alternative aspect, a compound is provided of Formula 4

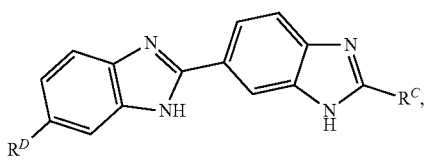

or a pharmaceutically acceptable salt thereof;
wherein
$R^C$ is independently at each occurrence selected from

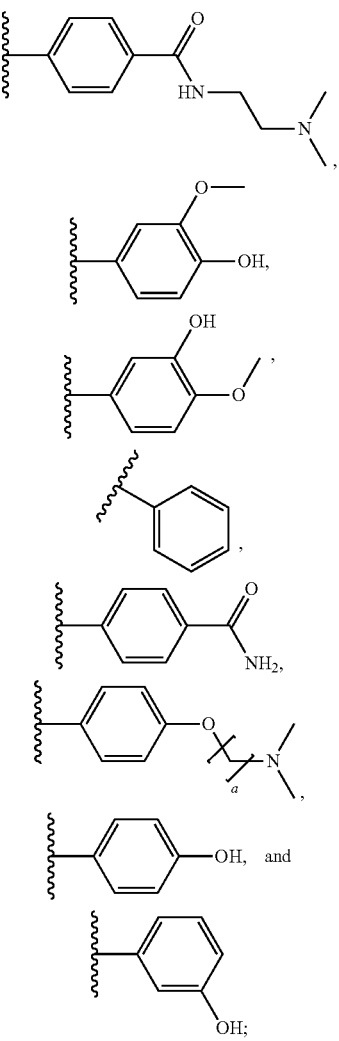

$R^D$ is independently at each occurrence selected from

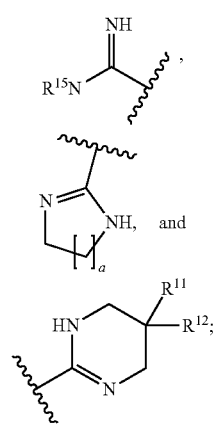

a is 1, 2, 3 or 4;

$R^{11}$ and $R^{12}$ are independently at each occurrence selected from hydrogen, halogen, hydroxyl, $C_1$-$C_6$alkyl, $C_1$-$C_4$alkoxy, and $C_1$-$C_4$haloalkyl; and $R^{15}$ is independently at each occurrence selected from hydrogen, $C_1$-$C_6$alkyl, $C_1$-$C_4$alkoxy, $C_3$cycloalkyl, $C_5$-$C_8$cycloalkyl and $C_1$-$C_4$haloalkyl.

In an alternative aspect, a method is provided for the treatment or prevention of an infection caused by *B. mandrillaris* comprising administering to a patient in need thereof an effective amount of a compound of Formula 5:

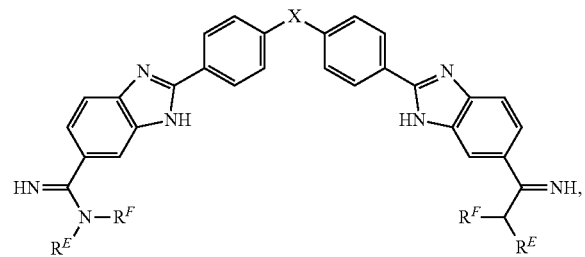

(5)

or a pharmaceutically acceptable salt thereof;
wherein

X is NH, $NR^{16}$, O, or $C_1$-$C_3$alkyl; and wherein $R^{16}$ is at each occurrence selected from hydrogen, $C_1$-$C_6$alkyl, and aryl; and $R^E$ and $R^F$ are each independently at each occurrence selected from hydrogen, $C_1$-$C_6$alkyl; $C_3$-$C_8$cycloalkyl, and heterocyclyl;

or wherein $R^E$ and $R^F$ are joined together to form a $C_3$-$C_8$-membered heterocycle wherein the heterocycle optionally contains one additional N, S, or O atom.

In an alternative aspect, a method is provided for the treatment or prevention of an infection caused by *B. mandrillaris* comprising administering to a patient in need thereof an effective amount of a compound of Formula 6

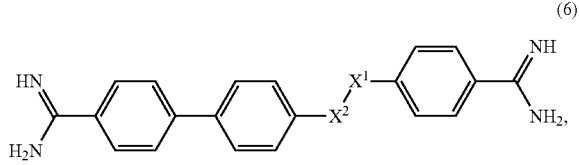

(6)

or a pharmaceutically acceptable salt thereof;
wherein $X^1$ and $X^2$ are each independently at each occurrence selected from $CH_2$, NH, $N(C_1$-$C_6$alkyl), O, and C(O).

In an alternative aspect, a method is provided for the treatment or prevention of an infection caused by one or more *Acanthamoeba* species or *B. mandrillaris* or the disinfection of one or more *Acanthamoeba* species from objects comprising administering to a patient in need thereof an effective amount of a compound of Formula 7

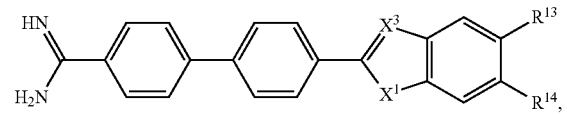

(7)

or a pharmaceutically acceptable salt thereof;
wherein $X^1$ is defined above;

$X^3$ is CH or N; and $R^{13}$ and $R^{14}$ are each independently at each occurrence selected from hydrogen or

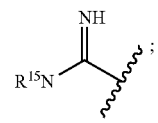

wherein at least one of $R^3$ and $R^4$ is hydrogen.

The inventors have also discovered that previous assays may have overestimated the cysticidal efficacy of currently used treatments by not accounting for the long excystation times of some *Acanthamoeba* species, with some species only showing eventual excystation after as long as 26 days. The inventors have shown that some standard therapies, such as chlorhexidine, have little cysticidal activity when examining potential excystation over a lengthened 30 day period. Only one current therapy, alexidine, shows cysticidal activity when evaluated over this period, but the high concentrations that were required can be toxic to human cells.

In another aspect of this invention, a new assay is provided that is an advance in the art because it can determine whether a drug is active against cysts over a long cyst phase, for example at least 30 days. Assays prior to the assay of the present invention typically only studied cysticidal activity for up to approximately 7 days, and as discussed above, a 7 day period is not long enough when some *Acanthamoeba* species have excystation periods of at least 26 days. The presence of the cyst stage in the *Acanthamoeba* and *B. mandrillaris* life cycle presents an enormous challenge in the treatment of these infections. Using this new assay, the inventors have discovered compounds and compositions that are effective against both trophozoites and cysts of *Acanthamoeba* species, filling an important gap in both the treatment and prevention of *Acanthamoeba* infection.

In one embodiment, the one of more *Acanthamoeba* species or *B. mandrillaris* are cysts, trophozoites, or both. In typical embodiments, the *Acanthamoeba* are present as both cysts and trophozoites.

The present invention also provides uses for the treatment or prevention of infections of the eye for example, caused by one or more species of *Acanthamoeba* on objects, such as solid objects, for example a contact lens or an optical implant, application or dressing, or liquid or gel objects, such as a contact lens solution, an ocular solution for reducing reddening of the eye, or rewetting eye drops.

In another aspect, a method is provided for the disinfection of one or more *Acanthamoeba* species from objects, such as solid objects, for example a contact lens or an optical implant, application or dressing, or a liquid or gel, for example a contact lens solution, an ocular solution for reducing reddening of the eye, or rewetting eye drops, comprising applying an effective amount of a compound of any one of Formula 1, Formula 2, Formula 3, Formula 4, or Formula 7, or a pharmaceutically acceptable salt and/or composition thereof, to the objects or the liquid.

In an alternate aspect, a method is provided for the treatment or prevention of granulomatous amoebic encephalitis (GAE) caused by one or more *Acanthamoeba* species comprising administering to a patient in need thereof an effective amount of a compound of Formula 1, Formula 2, Formula 3, Formula 4, or Formula 7 or a pharmaceutically acceptable salt thereof.

In one aspect, a method is provided for the treatment of an eye infection caused by one or more *Acanthamoeba* species comprising administering an effective amount of a compound of Formula 1, Formula 2, Formula 3, Formula 4, or Formula 7, or a pharmaceutically acceptable salt and/or composition to a patient in need thereof. In one embodiment, the infection is caused by *Acanthamoeba* keratitis.

In an alternate aspect, a method is provided for the treatment or prevention of an infection caused by *Balamuthia mandrillaris* comprising administering to a patient in need thereof an effective amount of a compound of Formula 1, Formula 2, Formula 3, Formula 4, Formula 5, Formula 6, or Formula 7 or a pharmaceutically acceptable salt thereof. In one embodiment, the *Balamuthia mandrillaris* infection is an infection of central the central nervous system.

In an alternate aspect, a method is provided for the treatment or prevention of granulomatous amoebic encephalitis (GAE) caused by *Balamuthia mandrillaris* comprising administering to a patient in need thereof an effective amount of a compound of Formula 1, Formula 2, Formula 3, Formula 4, Formula 5, Formula 6, or Formula 7 or a pharmaceutically acceptable salt thereof.

In some embodiments, the one of more *Acanthamoeba* species are cysts, trophozoites, or both. In some embodiments, the *Balamuthia mandrillaris* is a cyst, a trophozoite, or both.

Non-limiting examples of *Acanthamoeba* species that may be treated using the compounds of the present invention either alone or in combination with another therapeutic agent include *A. astronyxis*, *A. byersi*, *A. castellanii*, *A. comandoni*, *A. culbertsoni*, *A. divionensis*, *A. grifini*, *A. hatchetti*, *A. healyi*, *A. jacobsi*, *A. lenticulata*, *A. lugdunensis*, *A. mauritaniensis*, *A. palestinensis*, *A. paradivionensis*, *A. pearcei*, *A. polyphaga*, *A. pustulosa*, *A. quina*, *A. rhysodes*, *A. royreba*, *A. stevensoni*, *A. terricola* (renamed *A. castallani* Poussard), *A. triangularis*, and *A. tubiashi*.

In one embodiment, the compounds and compositions of the present invention for the treatment of an infection caused by one more *Acanthamoeba* species or for the treatment of an infection caused by *Balamuthia mandrillaris* are administered at least once, at least twice, at least three, at least four, at least five, or more times a day. In one embodiment, the compounds and compositions are administered intravenously. In one embodiment, the compounds and compositions are measured orally and the dosage form is a liquid or solid formulation, such as a pill or tablet.

In one embodiment, after administration of an effective amount of a compound of the present invention, no excystation of the one or more *Acanthamoeba* species or *Balamuthia mandrillaris* is observed for at least about 5 days, 10 days, at least about 12 days, at least about 15 days, at least about 18 days, at least about 20 days, at least about 22 days, at least about 25 days, at least about 28 days, at least about 30 days, at least about 35 days, at least about 40 days, at least about 45 days, or at least about 50 days. In an alternative embodiment, the patient in need thereof is treated with a compound of Formula 1, Formula 2, Formula 3, Formula 4, Formula 5, Formula 6, or Formula 7 or a pharmaceutically acceptable salt for at least about 1 day, at least about 3 days, at least about 5 days, for at least about 10 days, for at least about 15 days, at least about 20 days, at least about 25 days, at least about 30 days, at least about 35 days, at least about 40 days, at least about 45 days, or at least about 50 days.

The compounds of the present invention are diamidine-containing compounds. The infections of the brain described here can cause swelling and other pathologies and/or structural damage to tissues that can result in the breakdown of the blood brain barrier, allowing access to the selected active compounds described herein. Further, the compounds can be administered via intrathecal injection directly into the brain. Therefore, the compounds of the present invention can be administered systemically or directly to the brain or central nervous system generally to the effectuate treatment.

In one aspect, the present invention provides a compound selected from Compound A through Compound H:

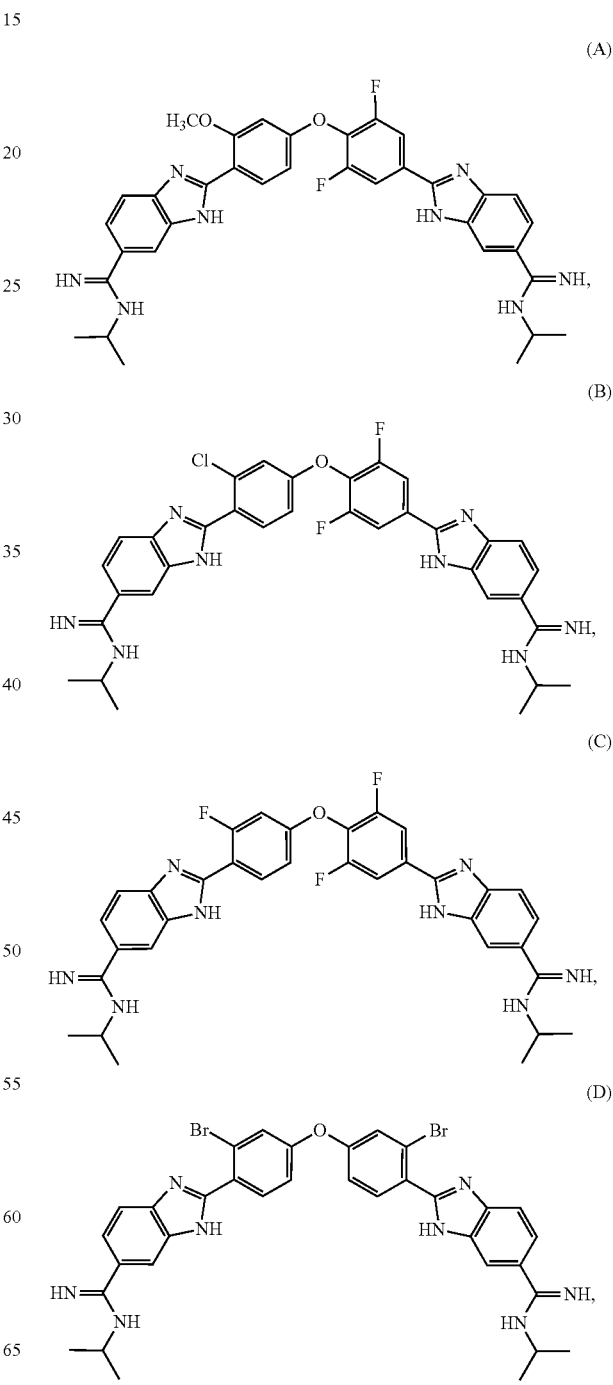

-continued
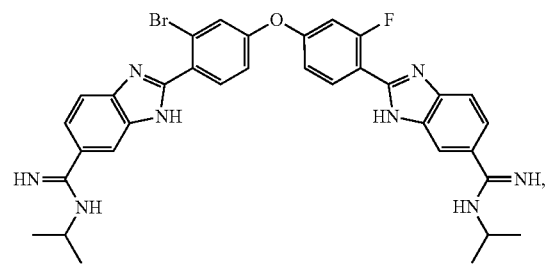
(E)
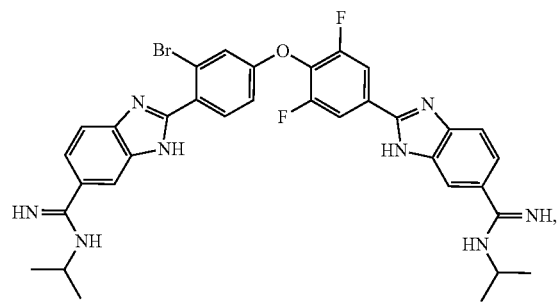
(F)
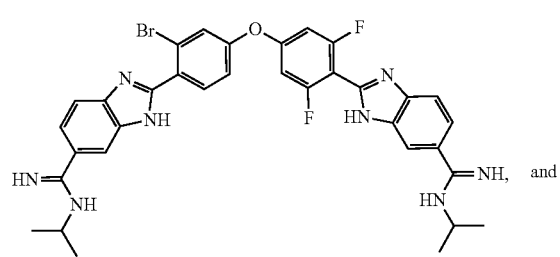
(G)
and
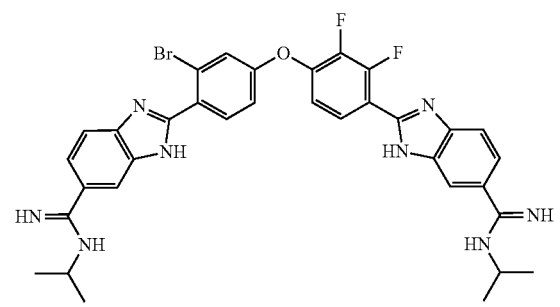
(H)
or a pharmaceutically acceptable salt thereof.
In another aspect, the present invention provides a compound selected from Compound I through Compound R:
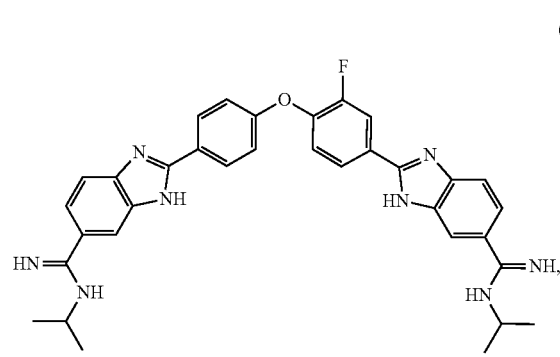
(I)
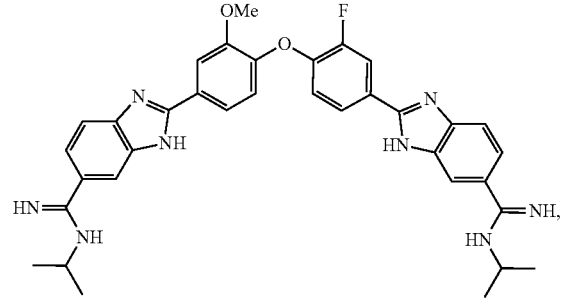
(J)
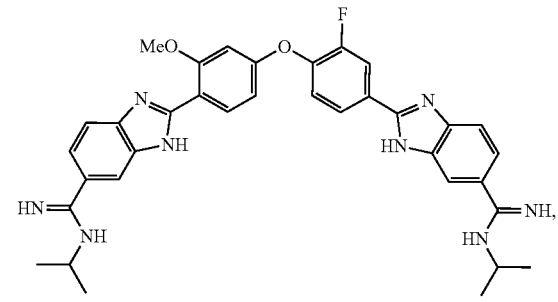
(K)
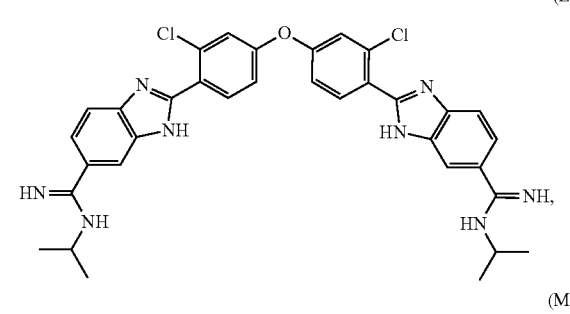
(L)
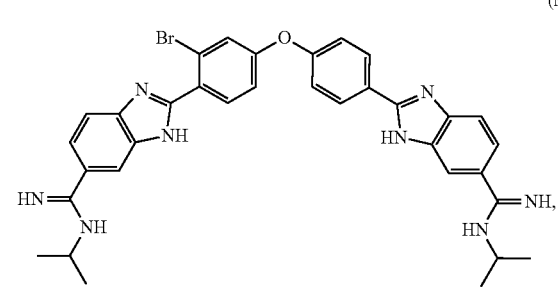
(M)

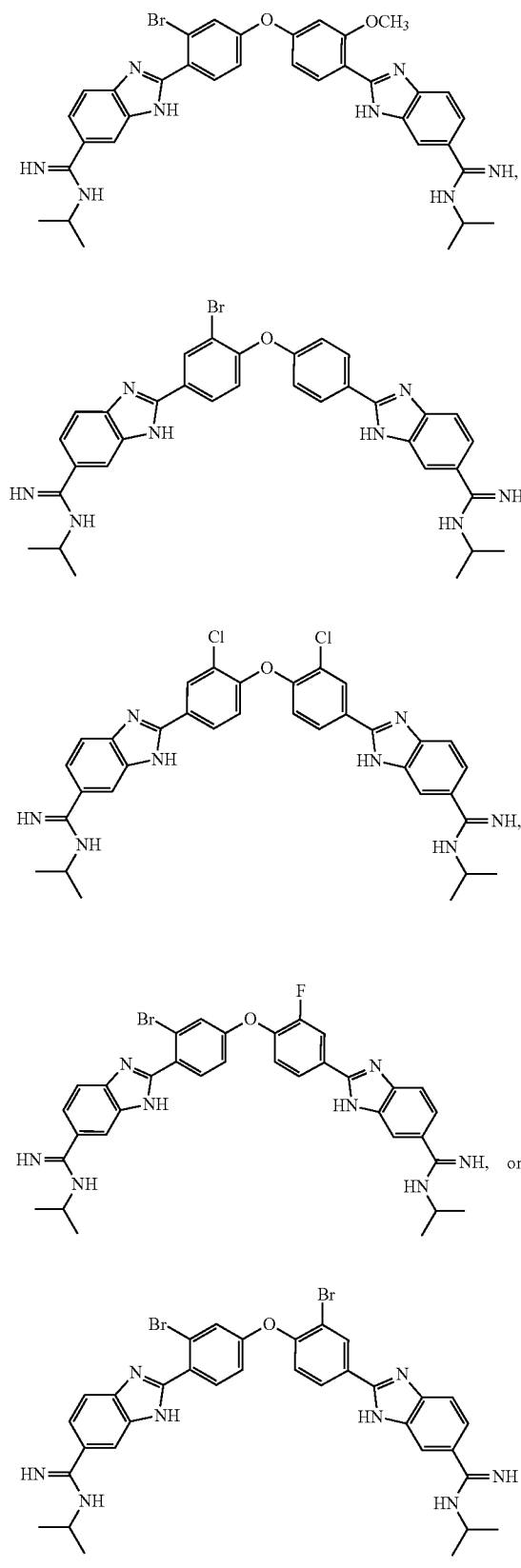
or a pharmaceutically acceptable salt thereof.
In an alternative aspect, the present invention provides a compound selected from Compound U through Compound AF:
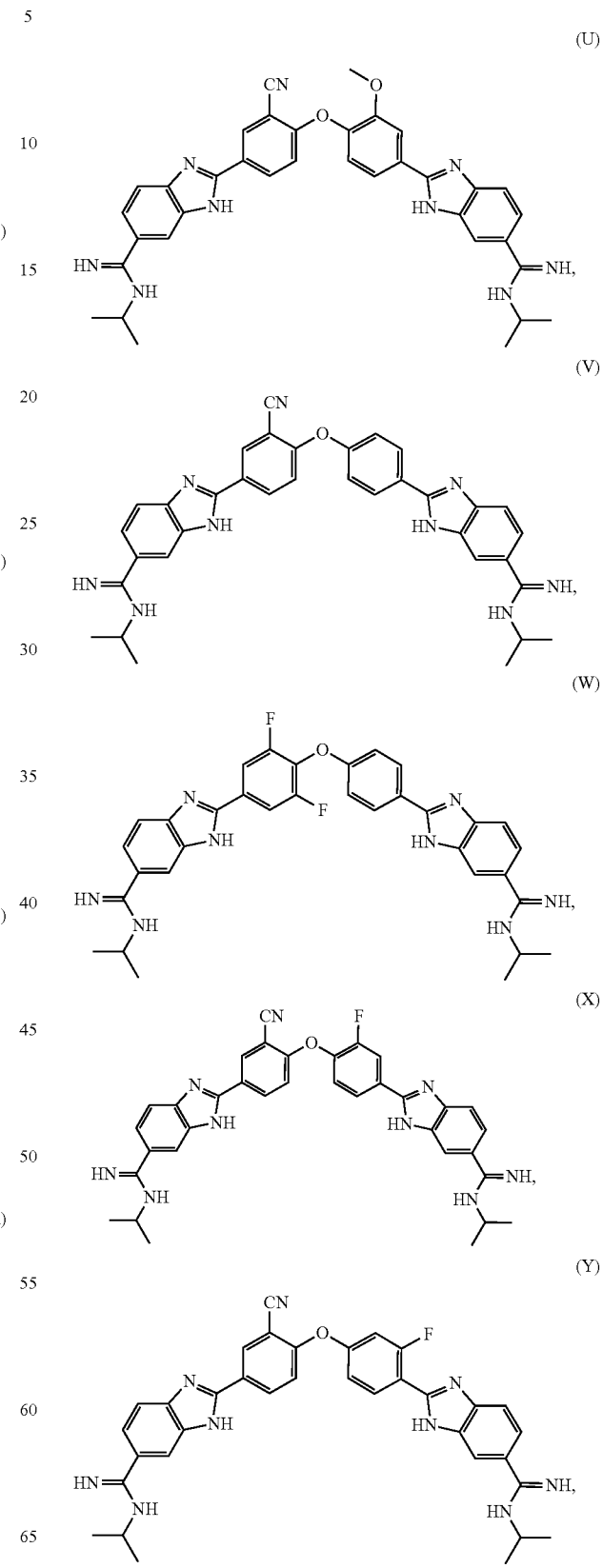

(Z)
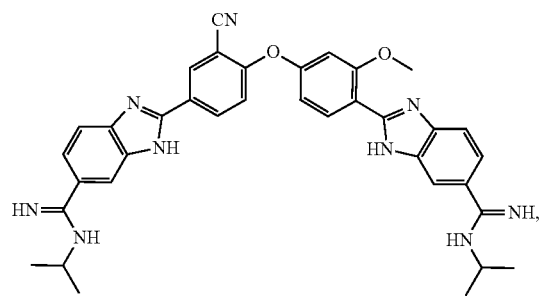
(AA)
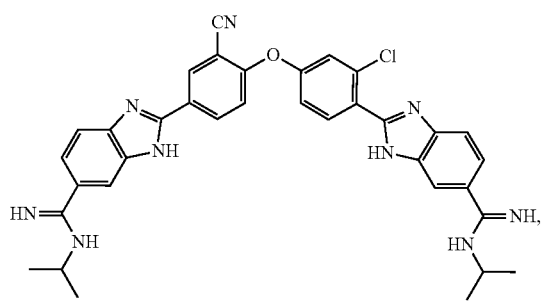
(AB)
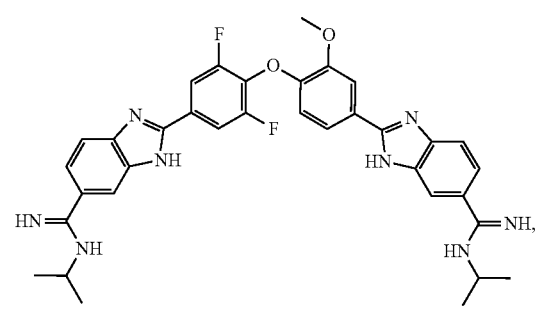
(AC)
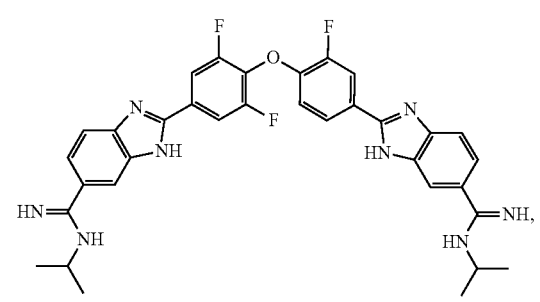
(AD)
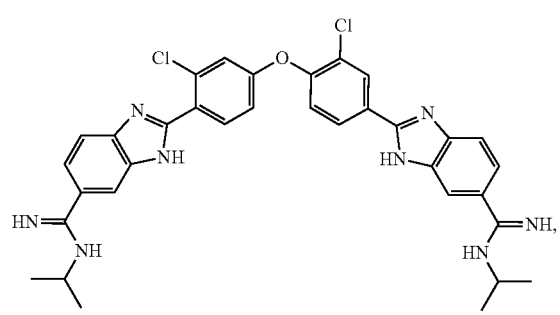
(AE)
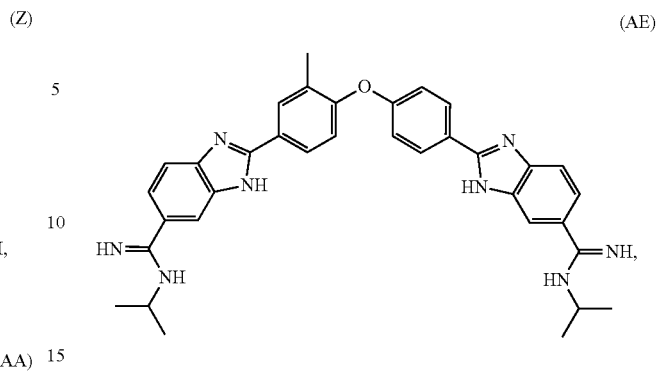
(AF)
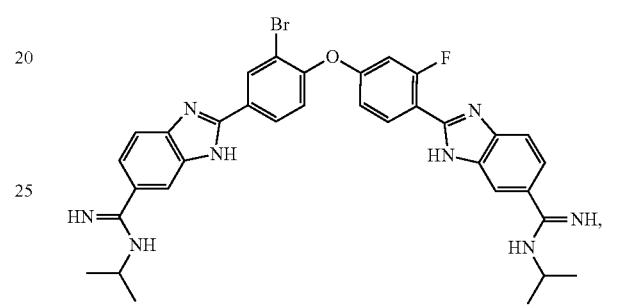
or a pharmaceutically acceptable salt thereof.
In an alternative aspect, the present invention provides a compound selected from Compound AK through Compound AR:
(AK)
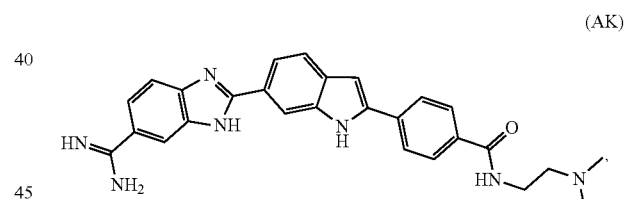
(AL)
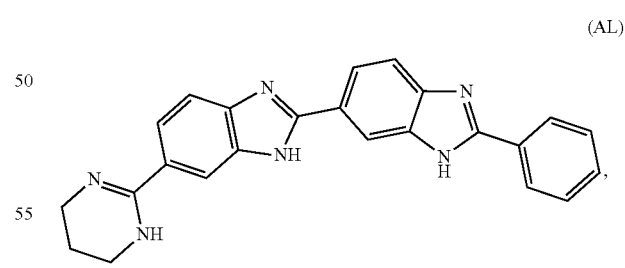
(AM)
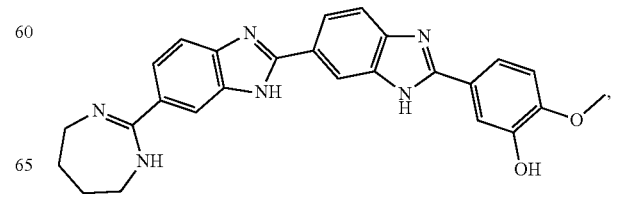

-continued

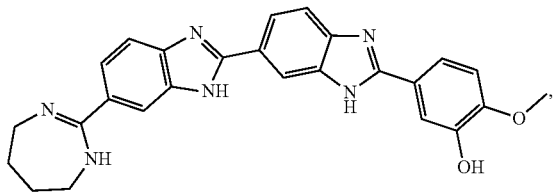 (AN)

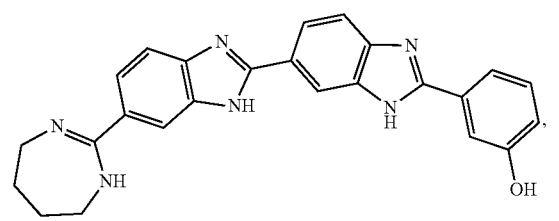 (AO)

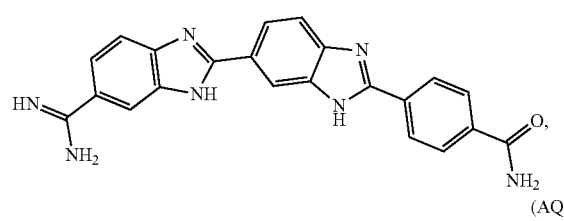 (AP)

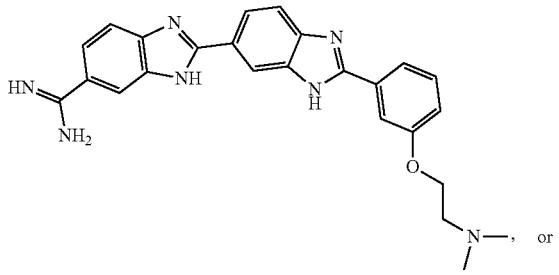 (AQ)

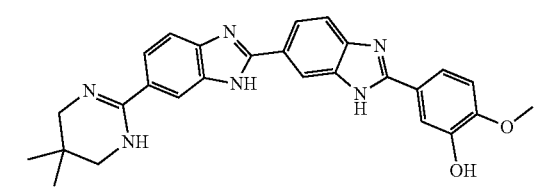 (AR)

or a pharmaceutically acceptable salt thereof.

In one aspect, a pharmaceutical compositions is provided comprising an effective amount of a compound selected from Compound A through Compound R, Compound U through Compound AF, and Compound AK through Compound AR or a pharmaceutically acceptable salt thereof, in a pharmaceutically acceptable carrier.

In one aspect, a method is provided for the treatment of an eye infection caused by one or more *Acanthamoeba* species comprising administering an effective amount of a compound selected from Compound A through Compound R, Compound U through Compound AF, and Compound AK through Compound AR or a pharmaceutically acceptable salt and/or composition to a patient in need thereof. In one embodiment, the eye infection is *Acanthamoeba keratitis*. In some embodiments, the one of more *Acanthamoeba* species are cysts, trophozoites, or both. In typical embodiments, the one or more *Acanthamoeba* species are present as both cysts and trophozoites.

In another aspect, a method is provided for the disinfection of one or more *Acanthamoeba* species from objects, such as solid objects, for example a contact lens or an optical implant, or a liquid or gel, for example a contact lens solution, an ocular solution for reducing reddening, or rewetting eye drops, comprising applying a effective amount of a compound selected from Compound A through Compound R, Compound U through Compound AF, and Compound AK through Compound AR, or a pharmaceutically acceptable salt and/or composition thereof, to the objects or the liquid.

In an alternative aspect, a contact lens care solution is provided that comprises an effective amount of a compound selected from Compound A through Compound R, Compound U through Compound AF, and Compound AK through Compound AR or a pharmaceutically acceptable salt thereof either alone or in combination with another active agent in a suitable aqueous carrier. In some embodiments, the contact lens care solution provided herein comprises an effective amount of a compound described herein, or a pharmaceutically acceptable salt thereof, in combination with at least one other active agent in a suitable aqueous carrier.

In an alternative aspect, a method is provided for the treatment of an infection caused by *Balamuthia mandrillaris* comprising administering an effective amount of a compound selected from Compound A through Compound R, Compound U through Compound AF, and Compound AK through Compound AR, or a pharmaceutically acceptable salt and/or composition to a patient in need thereof.

In an alternative aspect, a method is provided for the treatment of granulomatous amoebic encephalitis (GAE) comprising administering an effective amount of a compound selected from Compound A through Compound R, Compound U through Compound AF, and Compound AK through Compound AR, or a pharmaceutically acceptable salt and/or composition to a patient in need thereof. In an alternative embodiment, the GAE is caused by one or more *Acanthamoeba* species. In another alternative embodiment, the GAE is caused by *Balamuthia mandrillaris*.

In one aspect, a method is provided for the treatment of an eye infection caused by one or more *Acanthamoeba* species comprising administering to a patient in need thereof an effective amount of Compound S or Compound T:

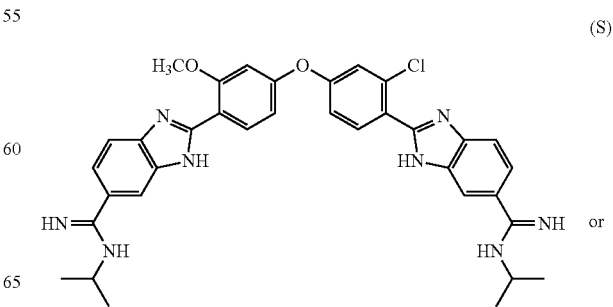 (S)

(T)

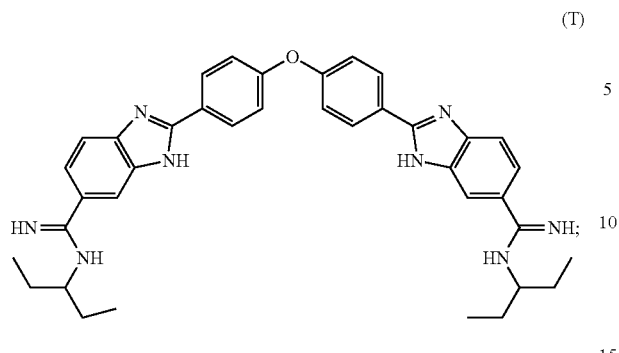

or a pharmaceutically acceptable salt and/or composition thereof.

In an alternative aspect, a method is provided for the treatment of an eye infection caused by one or more *Acanthamoeba* species comprising administering to a patient in need thereof an effective amount of a Compound selected from Compound AH through Compound AJ, and Compound AW through Compound AX:

(AH)

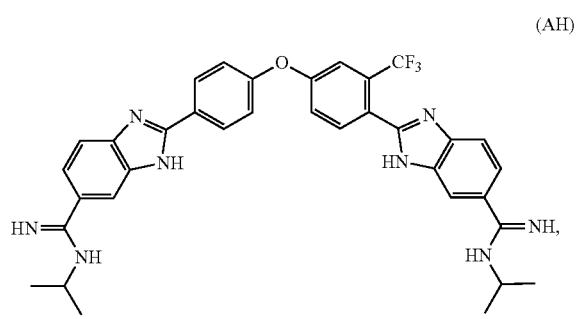

(AI)

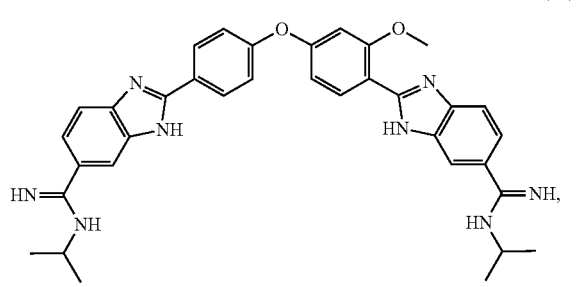

(AJ)

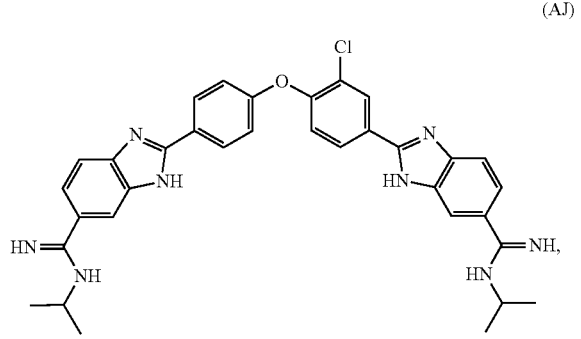

(AW)

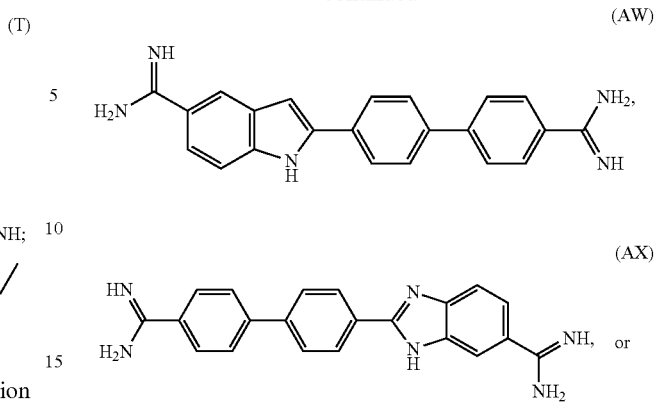

(AX)

or a pharmaceutically acceptable salt and/or composition thereof.

In one aspect, a method is provided for the disinfection of one or more *Acanthamoeba* species from objects, such as solid objects, for example a contact lens or an optical implant, or a liquid or gel, for example a contact lens solution, an ocular solution for reducing reddening, or rewetting eye drops, comprising applying a effective amount of a compound selected from Compound S, Compound T, Compound AH through Compound AJ, and Compound AW through Compound AX, or a pharmaceutically acceptable salt and/or composition thereof, to the objects or the liquid.

In another aspect, a contact lens care solution is provided that comprises an effective amount of a compound selected from Compound S, Compound T, Compound AH through Compound AJ, and Compound AW through Compound AX or a pharmaceutically acceptable salt thereof either alone or in combination with another active agent in a suitable aqueous carrier. In some embodiments, the contact lens care solution provided herein comprises an effective amount of a compound described herein, or a pharmaceutically acceptable salt thereof, in combination with at least one other active agent in a suitable aqueous carrier.

In an alternative aspect, a method is provided for the treatment of an infection caused by *Balamuthia mandrillaris* comprising administering to a patient in need thereof an effective amount of a Compound selected from Compound AH through Compound AJ, and Compound AW through Compound AX.

In an alternative aspect, a method is provided for the treatment of granulomatous amoebic encephalitis (GAE) comprising administering an effective amount of a compound selected from Compound S, Compound T, Compound AH through Compound AJ, and Compound AW through Compound AX, or a pharmaceutically acceptable salt and/or composition to a patient in need thereof. In one embodiment, the GAE is caused by one or more *Acanthamoeba* species. In an alternative embodiment, the GAE is caused by *Balamuthia mandrillaris*.

In an alternative aspect, a method is provided for the treatment of an infection caused by *Balamuthia mandrillaris* comprising administering to a patient in need thereof an effective amount of a Compound selected from Compound AG, Compound AS through Compound AT, Compound AU, Compound AV, Compound AY, Compound AZ, and Compound AB through Compound BH:

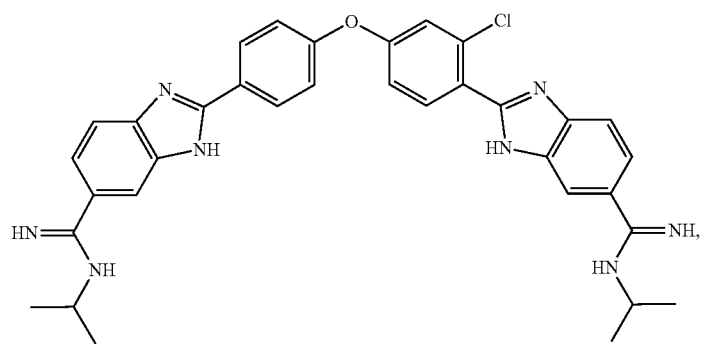
(AG)
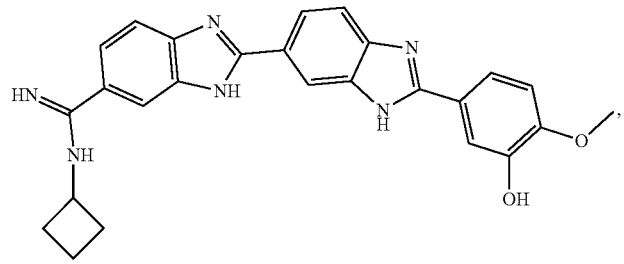
(AS)
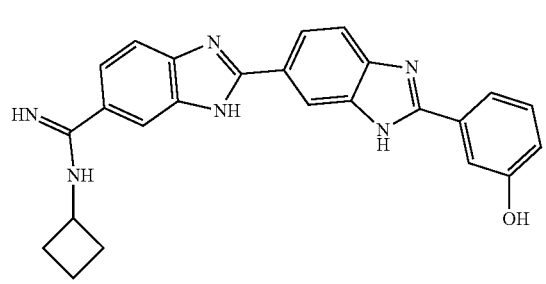
(AT)
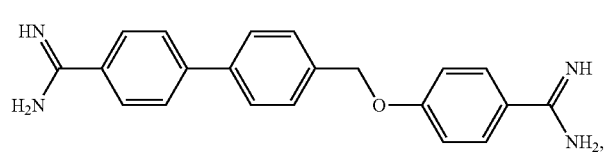
(AU)
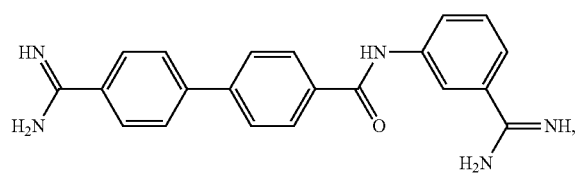
(AV)
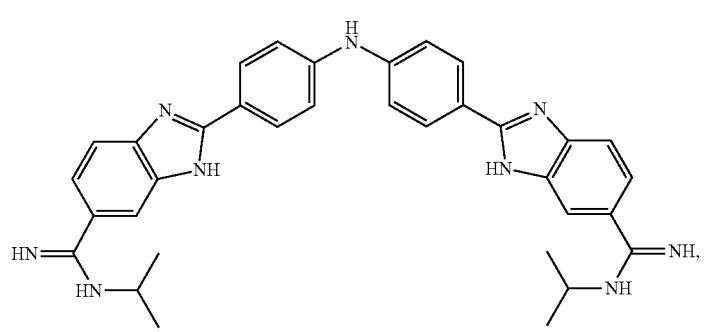
(AY)

(AZ)
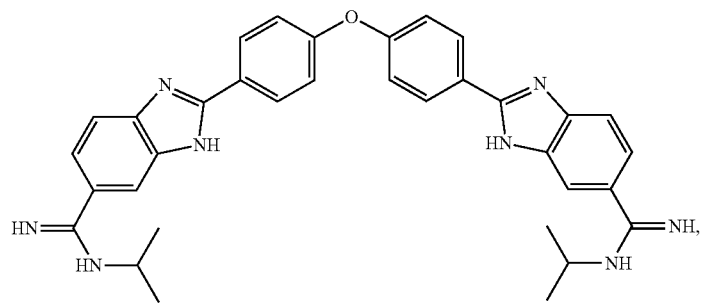
(BA)
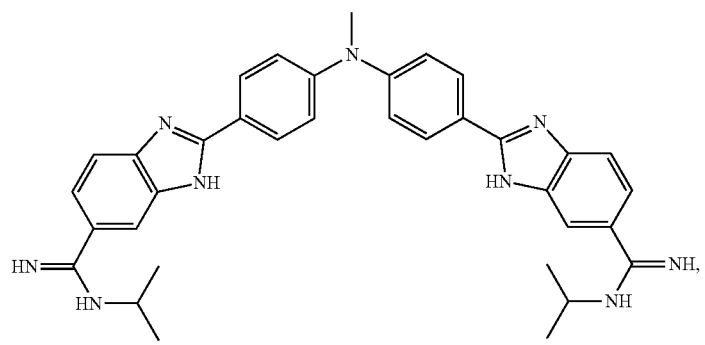
(BB)
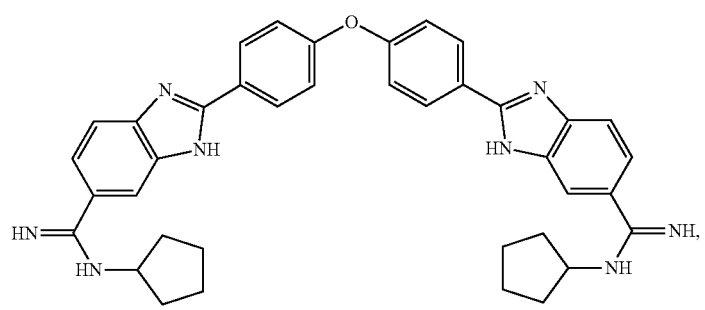
(BC)
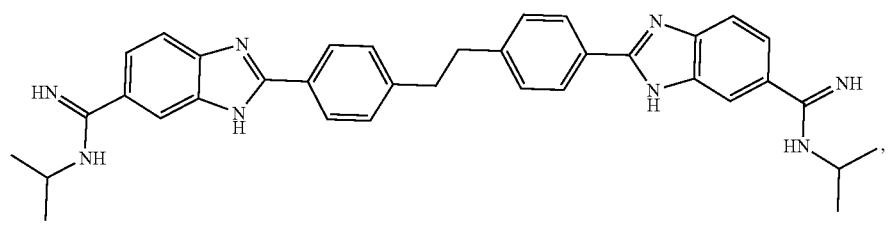
(BD)
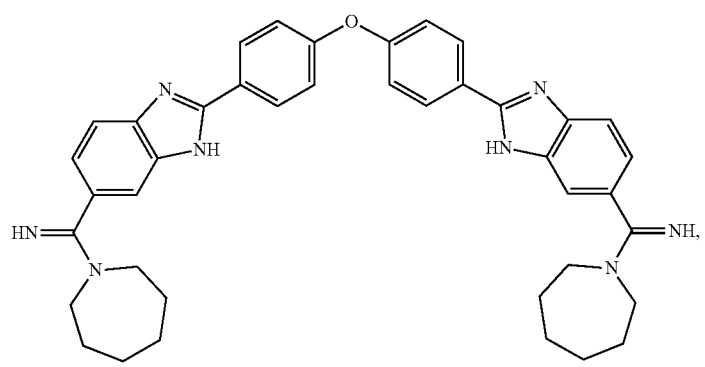

-continued
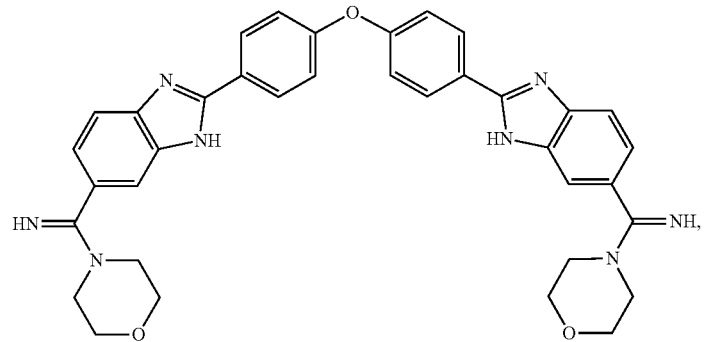
(BE)
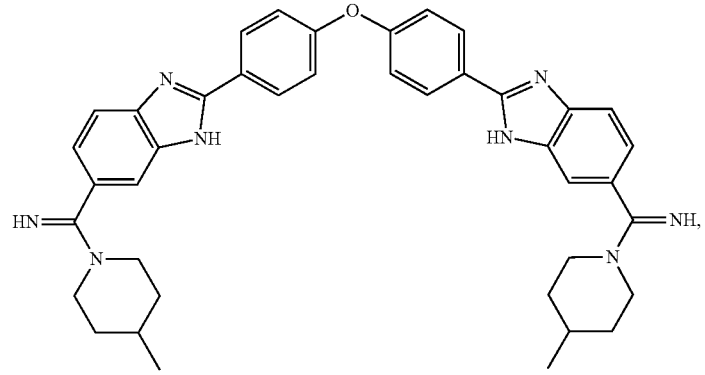
(BF)
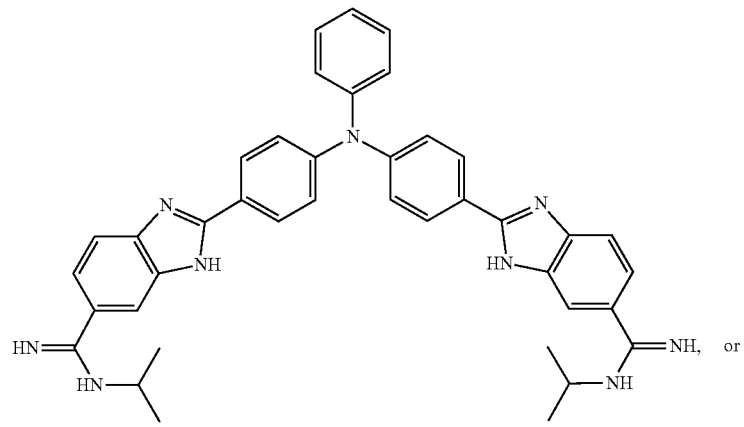
(BG)
or
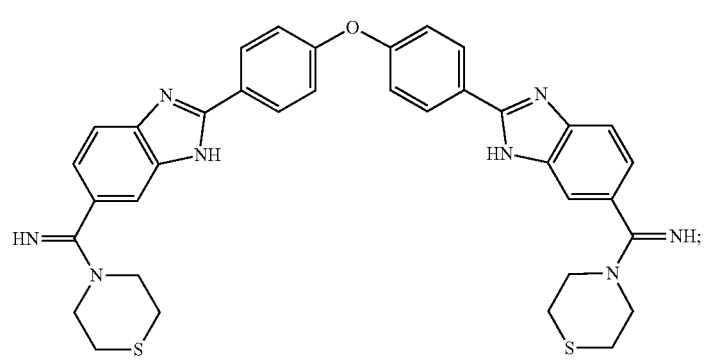
(BH)

In an alternative embodiment, an effective amount of a compound selected from Compound A through Compound BH, or a pharmaceutically accepted salt thereof is used for treatment, or prevention of an infection caused by *Balamuthia mandrillaris*.

In an alternative embodiment, an effective amount of a compound selected from Compound A-Compound BH, or a pharmaceutically accepted salt thereof is provided for the treatment of granulomatous amoebic encephalitis (GAE) caused by *Balamuthia mandrillaris* comprising administering an effective amount of a compound of any one of Formula A through Formula BH, or a pharmaceutically acceptable salt and/or composition to a patient in need thereof.

Thus, the present invention includes at least the following features:

(a) a compound of Formula 2, Formula 3, or Formula 4 or a pharmaceutically acceptable salt thereof;

(b) a pharmaceutical composition comprising an effective amount of a compound of Formula 2 Formula 3, or Formula 4, or a pharmaceutically acceptable salt thereof, in a pharmaceutically acceptable carrier;

(c) a method for the treatment or prevention of an infection caused by one or more *Acanthamoeba* species in the trophozoite and/or cyst life stage comprising administering an effective amount of a compound of Formula 1, Formula 2, Formula 3, Formula 4, or Formula 7 or a pharmaceutically acceptable salt thereof to a host in need thereof;

(d) a method for the disinfection of one or more *Acanthamoeba* species in the trophozoite and/or cyst life stage from objects comprising applying an effective amount of a compound of Formula 1, Formula 2, Formula 3, Formula 4, or Formula 7 or a pharmaceutically acceptable salt thereof, to the objects;

(e) a method for the disinfection of one or more *Acanthamoeba* species in the trophozoite and/or cyst life stage from a liquid or gel, including a liquid or gel intended to be applied to the eye or which comes in contact with the eye, comprising applying an effective amount of a compound of Formula 1, Formula 2, Formula 3, Formula 4, or Formula 7 or a pharmaceutically acceptable salt thereof, to the objects;

(f) a compound of Formula 1, Formula 2, Formula 3, or Formula 4, or Formula 7 or a pharmaceutically acceptable salt thereof for use to treat or prevent of an infection caused by one or more *Acanthamoeba* species in the trophozoite and/or cyst life stage in a host in need thereof;

(g) the use of a compound of Formula 1, Formula 2, Formula 3, or Formula 4, or a pharmaceutically acceptable salt thereof in the manufacture of a medicament for the treatment or prevention of an infection caused by one or more *Acanthamoeba* species in the trophozoite and/or cyst life stage in a host in need thereof;

(h) any one of embodiments (c)-(g), wherein the infection caused by one or more *Acanthamoeba* species is *Acanthamoeba* keratitis;

(i) any one of embodiments (c)-(g), wherein the infection is caused by an *Acanthamoeba* species selected from the group consisting of *A. astronyxis*, *A. byersi*, *A. castellani*, *A. comandoni*, *A. culbertsoni*, *A. divionensis*, *A. grifini*, *A. hatchetti*, *A. healyi*, *A. jacobsi*, *A. lenticulata*, *A. lugdunensis*, *A. mauritaniensis*, *A. palestinensis*, *A. paradivionensis*, *A. pearcei*, *A. polyphaga*, *A. pustulosa*, *A. quina*, *A. rhysodes*, *A. royreba*, *A. stevensoni*, *A. terricola* (renamed *A. castallani* Poussard), *A. triangularis*, and *A. tubiashi*;

(j) any one of embodiments (c)-(g) wherein the infection is granulomatous amoebic encephalitis (GAE) caused by an *Acanthamoeba* species;

(k) any one of embodiments (c)-(j) wherein no excystation of the one or more *Acanthamoeba* species is observed for at least about 5 days, at least about 10 days, at least about 12 days, at least about 15 days, at least about 18 days, at least about 20 days, at least about 22 days, at least about 25 days, at least about 28 days, or at least about 30 days after administration;

(l) any one of embodiments (c) and (f)-(k) wherein the host in need thereof is treated for at least about 1 day, at least about 3 days, at least about 5 days, at least about 10 days, at least about 15 days, at least about 20 days, at least about 25 days, at least about 30 days, at least about 35 days, at least about 40 days, at least about 45 days, or at least about 50 days;

(m) a method for the treatment or prevention of an infection caused by *Balamuthia mandrillaris* in the trophozoite and/or cyst life stage comprising administering an effective amount of a compound of Formula 1 through Formula 7 or a pharmaceutically acceptable salt thereof to a host in need thereof;

(n) a compound of Formula 1 through Formula 7, or a pharmaceutically acceptable salt thereof, for use to treat or prevent of an infection caused by *Balamuthia mandrillaris* in the trophozoite and/or cyst life stage in a host in need thereof;

(o) the use of a compound of Formula 1 through Formula 7 or a pharmaceutically acceptable salt thereof, in the manufacture of a medicament for the treatment of an infection caused by *Balamuthia mandrillaris* in the trophozoite and/or cyst life stage in a host in need thereof;

(p) any one of embodiments (m)-(o) wherein the infection is granulomatous amoebic encephalitis (GAE) caused by *Balamuthia mandrillaris*;

(q) any one of embodiments (m)-(p) wherein no excystation of the one or more *Acanthamoeba* species is observed for at least about 5 days, at least about 10 days, at least about 12 days, at least about 15 days, at least about 18 days, at least about 20 days, at least about 22 days, at least about 25 days, at least about 28 days, or at least about 30 days after administration;

(r) any one of embodiments (m)-(q) wherein the host in need thereof is treated for at least about 1 day, at least about 3 days, at least about 5 days, at least about 10 days, at least about 15 days, at least about 20 days, at least about 25 days, at least about 30 days, at least about 35 days, at least about 40 days, at least about 45 days, or at least about 50 days;

(s) a compound selected from Compound A through Compound R, Compound U through Compound AF, and Compound AK through Compound AR, or a pharmaceutically acceptable salt thereof;

(t) a pharmaceutical composition comprising an effective amount of a compound selected from Compound A through Compound R, Compound U through Compound AF, and Compound AK through Compound AR, or a pharmaceutically acceptable salt thereof, in a pharmaceutically acceptable carrier;

(u) a method for the treatment or prevention of an *Acanthamoeba* infection, comprising administering a compound selected from Compound A through Compound AF, Compound AH through Compound AR, and Compound AW through Compound AX, or a pharmaceutically acceptable salt thereof, to a host in need thereof;
(v) a compound selected from Compound A through Compound AF, Compound AH through Compound AR, and Compound AW through Compound AX, or a pharmaceutically acceptable salt thereof, for use in the treatment or prevention of an *Acanthamoeba* infection;
(w) use of a compound selected from Compound A through Compound AF, Compound AH through Compound AR, and Compound AW through Compound AX, or a pharmaceutically acceptable salt thereof, in the manufacture of a medicament for the treatment or prevention of an *Acanthamoeba* infection;
(x) any of embodiments (u)-(w) wherein the infection caused by one or more *Acanthamoeba* species is *Acanthamoeba* keratitis;
(y) any one of embodiments (u)-(w), wherein the infection is caused by an *Acanthamoeba* species selected from the group consisting of *A. astronyxis, A. byersi, A. castellanii, A. comandoni, A. culbertsoni, A. divionensis, A. griffini, A. hatchetti, A. healyi, A. jacobsi, A. lenticulata, A. lugdunensis, A. mauritaniensis, A. palestinensis, A. paradivionensis, A. pearcei, A. polyphaga, A. pustulosa, A. quina, A. rhysodes, A. royreba, A. stevensoni, A. terricola* (renamed *A. castallani* Poussard), *A. triangularis*, and *A. tubiashi*;
(z) any of embodiments (u)-(w) wherein the infection is granulomatous amoebic encephalitis (GAE) caused by an *Acanthamoeba* species;
(aa) a method for the treatment or prevention of an infection caused by *Balamuthia mandrillaris* in the trophozoite and/or cyst life stage comprising administering an effective amount of a compound selected from Compound A through Compound BH, or a pharmaceutically acceptable salt thereof;
(bb) a compound selected from Compound A through Compound BH, or a pharmaceutically acceptable salt thereof, for use to treat or prevent of an infection caused by *Balamuthia mandrillaris* in the trophozoite and/or cyst life stage;
(cc) the use of a compound selected from Compound A through Compound BH or a pharmaceutically acceptable salt thereof, in the manufacture of a medicament for the treatment of an infection caused by *Balamuthia mandrillaris* in the trophozoite and/or cyst life stage;
(dd) any one of embodiments (aa)-(cc) wherein the infection is granulomatous amoebic encephalitis (GAE) caused by *Balamuthia mandrillaris*;
(ee) a contact lens care solution comprising an effective amount of a compound selected from Compound A through Compound AF, Compound AH through Compound AR, and Compound AW through Compound AX, or a pharmaceutically acceptable salt thereof; in a suitable aqueous carrier optionally in combination with one or more additional agents.
(ff) a disinfection solution comprising an effective amount of a compound selected from Compound A through Compound BH, or a pharmaceutically acceptable salt thereof, in an aqueous carrier
(gg) a disinfection solution comprising an effective amount of a compound of Formula 1, Formula 2 Formula 3, Formula 4, Formula 5, Formula 6, or Formula 7 or a pharmaceutically acceptable salt thereof, in an aqueous carrier;
(hh) a contact lens care solution comprising an effective amount of a compound of Formula 1, Formula 2 Formula 3, Formula 4, Formula 5, Formula 6, or Formula 7 or a pharmaceutically acceptable salt thereof, in a suitable aqueous carrier optionally in combination with one or more additional agents;
(ii) a process for the preparation of a therapeutic product that contains an effective amount of a compound selected from Compound A through Compound BH, or a pharmaceutically acceptable salt thereof;
(jj) a process for the preparation of a therapeutic product that contains an effective amount of a compound of Formula 1, Formula 2, Formula 3, Formula 4, Formula 5, Formula 6, or Formula 7, or a pharmaceutically acceptable salt thereof;
(kk) an assay to determine whether a drug is active against cysts over a cyst phase wherein the cyst phase is at least 30 days.

DETAILED DESCRIPTION OF THE INVENTION

Definitions

Compounds are described using standard nomenclature. Unless defined otherwise, all technical and scientific terms used herein have the same meaning as is commonly understood by one of skill in the art to which the invention belongs.

The terms "a" and "an" do not denote a limitation of quantity, but rather denote the presence of at least one of the referenced item. The term "or" means "and/or". Recitation of ranges of values merely intends to serve as a shorthand method of referring individually to each separate value falling within the range, unless otherwise indicated herein, and each separate value is incorporated into the specification as if it were individually recited herein. The endpoints of all ranges are included within the range and are independently combinable. All methods described herein can be performed in a suitable order unless otherwise indicated herein or otherwise clearly contradicted by context. The use of example, or exemplary language (e.g. "such as"), is intended merely to better illustrate the invention and does not pose a limitation on the scope of the invention unless otherwise claimed.

"Aryl" indicates aromatic groups containing only carbon in the aromatic ring or rings. In one embodiment, the aryl groups contain 1 to 3 separate or fused rings and is 6 to about 14 or 18 ring atoms, without heteroatoms as ring members. When indicated, such aryl groups may be further substituted with carbon or non-carbon atoms or groups. Such substitution may include fusion to a 3 to 7-membered saturated cyclic group that optionally contains 1 or 2 heteroatoms independently chosen from N, O, and S, to form, for example, a 3,4-methylenedioxyphenyl group. Aryl groups include, for example, phenyl and naphthyl, including 1-naphthyl and 2-naphthyl. In one embodiment, aryl groups are pendant. An example of a pendant ring is a phenyl group substituted with a phenyl group. In one embodiment, the aryl group is optionally substituted as described above.

"Alkyl" is a branched or straight chain saturated aliphatic hydrocarbon group. In one non-limiting embodiment, the alkyl group contains from 1 to about 6 carbon atoms, or from 1 to about 4 carbon atoms. In certain embodiments, the alkyl is $C_1$-$C_2$, $C_1$-$C_3$, $C_1$-$C_4$, $C_1$-$C_5$, or $C_1$-$C_6$. For example, the term $C_1$-$C_6$alkyl as used herein indicates a straight chain or branched alkyl group having from 1, 2, 3, 4, 5, or 6 carbon atoms and is intended to mean that each of these are described as an independent species. For example, the term $C_1$-$C_4$alkyl as used herein indicates a straight or branched alkyl group having from 1, 2, 3, or 4 carbon atoms and is intended to mean that each of these is described as an independent species. Examples of alkyl include, but are not limited to, methyl, ethyl, n-propyl, isopropyl, n-butyl, isobutyl, sec-butyl, t-butyl, n-pentyl, isopentyl, tert-pentyl, neopentyl, n-hexyl, 2-methylpentane, 3-methylpentane, 2,2-dimethylbutane, and 2,3-dimethylbutane.

The term "alkyl" also encompasses cycloalkyl or carbocyclic groups. For example, when a term is used that includes "alk" then "cycloalkyl" or "carbocyclic" or "$C_3$-$C_{12}$ cycloalkyl" can be considered part of the definition, unless unambiguously excluded by the context. For example and without limitation, the terms alkyl, alkoxy, haloalkyl, etc. can all be considered to include the cyclic forms of alkyl, unless unambiguously excluded by context.

For example, "cycloalkyl" is an alkyl group that forms or includes a ring. When composed of two or more rings, the rings may be joined together in a fused fashion. Non-limiting examples of typical cycloalkyl groups include cyclopropyl, cyclobutyl, cyclopentyl, cyclohexyl, cycloheptyl, and cyclooctyl.

In one embodiment "alkyl" is a, $C_1$-$C_6$alkyl, $C_1$-$C_5$alkyl, $C_1$-$C_4$alkyl, $C_1$-$C_3$alkyl, or $C_1$-$C_2$alkyl.

In one embodiment "alkyl" has one carbon.
In one embodiment "alkyl" has two carbons.
In one embodiment "alkyl" has three carbons.
In one embodiment "alkyl" has four carbons.
In one embodiment "alkyl" has five carbons.
In one embodiment "alkyl" has six carbons.

Non-limiting examples of "alkyl" include: methyl, ethyl, propyl, butyl, pentyl, and hexyl.

Additional non-limiting examples of "alkyl" include: isopropyl, isobutyl, isopentyl, and isohexyl.

Additional non-limiting examples of "alkyl" include: sec-butyl, sec-pentyl, and sec-hexyl.

Additional non-limiting examples of "alkyl" include: tert-butyl, tert-pentyl, and tert-hexyl.

Additional non-limiting examples of "alkyl" include: neopentyl, 3-pentyl, and active pentyl.

"Alkoxy" is an alkyl group as defined above covalently bound through an oxygen bridge (—O—). Examples of alkoxy include, but are not limited to, methoxy, ethoxy, n-propoxy, i-propoxy, n-butoxy, 2-butoxy, and t-butoxy.

"Halo" and "halogen" refer to fluorine, chlorine, bromine, or iodine.

"Haloalkyl" is a branched or straight-chain alkyl groups substituted with 1 or more halo atoms described above, up to the maximum allowable number of halogen atoms. Examples of haloalkyl groups include, but are not limited to, fluoromethyl, difluoromethyl, trifluoromethyl, chloromethyl, dichloromethyl, trichloromethyl, pentafluoroethyl, heptafluoropropyl, difluorochloromethyl, dichlorofluoromethyl, difluoroethyl, difluoropropyl, dichloroethyl and dichloropropyl. "Perhaloalkyl" means an alkyl group having all hydrogen atoms replaced with halogen atoms. Examples include but are not limited to, trifluoromethyl and pentafluoroethyl.

In one embodiment "haloalkyl" is a $C_1$-$C_4$haloalkyl, $C_1$-$C_3$haloalkyl, or $C_1$-$C_2$haloalkyl.

In one embodiment "haloalkyl" has one carbon.
In one embodiment "haloalkyl" has one carbon and one halogen.
In one embodiment "haloalkyl" has one carbon and two halogens.
In one embodiment "haloalkyl" has one carbon and three halogens.
In one embodiment "haloalkyl" has two carbons.

In one embodiment "haloalkyl" has three carbons.
In one embodiment "haloalkyl" has four carbons.
Non-limiting examples of "haloalkyl" include:

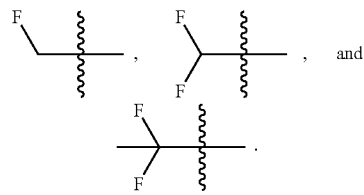

Additional non-limiting examples of "haloalkyl" include:

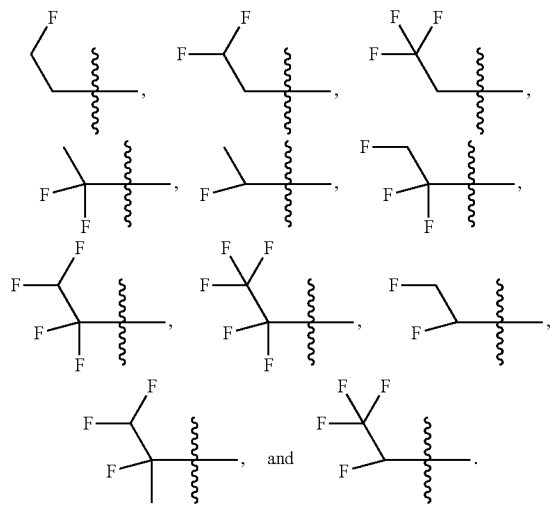

Additional non-limiting examples of "haloalkyl" include

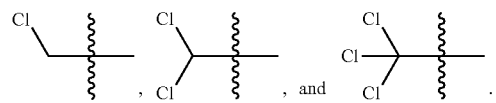

Additional non-limiting examples of "haloalkyl" include:

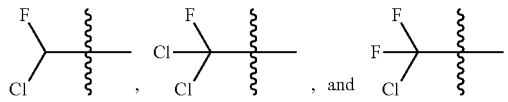

The term "heterocyclyl," or "heterocyclic ring" as used herein refers to a saturated or a partially unsaturated (i.e., having one or more double and/or triple bonds within the ring without aromaticity) carbocyclic radical of 3 to about 12, and more typically 3, 5, 6, 7 to 10 ring atoms in which at least one ring atom is a heteroatom selected from nitrogen, oxygen, phosphorus and sulfur, the remaining ring atoms being C, where one or more ring atoms is optionally substituted independently with one or more substituents described above. A heterocycle may be a monocycle having 3 to 7 ring members (2 to 6 carbon atoms and 1 to 4 heteroatoms selected from N, O, P, and S) or a bicycle having 6 to 10 ring members (4 to 9 carbon atoms and 1 to 6 heteroatoms selected from N, O, P, and S), for example: a bicyclo [4,5], [5,5], [5,6], or [6,6] system. In one embodiment, the only heteroatom is nitrogen. In one embodiment, the only heteroatom is oxygen. In one embodiment, the only heteroatom is sulfur. Heterocycles are described in Paquette, Leo A.; "Principles of Modern Heterocyclic Chemistry" (W. A. Benjamin, New York, 1968), particularly Chapters 1, 3, 4, 6, 7, and 9; "The Chemistry of Heterocyclic Compounds, A series of Monographs" (John Wiley & Sons, New York, 1950 to present), in particular Volumes 13, 14, 16, 19, and 28; and J. Am. Chem. Soc. (1960) 82:5566. Examples of heterocyclic rings include, but are not limited to, pyrrolidinyl, dihydrofuranyl, tetrahydrothienyl, tetrahydropyranyl, dihydropyranyl, tetrahydrothiopyranyl, piperidino, piperidonyl, morpholino, thiomorpholino, thioxanyl, piperazinyl, homopiperazinyl, azetidinyl, oxetanyl, thietanyl, homopiperidinyl, oxepanyl, thiepanyl, oxazepinyl, diazepinyl, thiazepinyl, 2-pyrrolinyl, 3-pyrrolinyl, indolinyl, 2H-pyranyl, 4H-pyranyl, dioxanyl, 1,3-dioxolanyl, pyrazolinyl, dithianyl, dithiolanyl, dihydropyranyl, dihydrothienyl, dihydrofuranyl, dihydroisoquinolinyl, tetrahydroisoquinolinyl, pyrazolidinylimidazolinyl, imidazolidinyl, 2-oxa-5-azabicyclo[2.2.2]octane, 3-oxa-8-azabicyclo[3.2.1]octane, 8-oxa-3-azabicyclo[3.2.1]octane, 6-oxa-3-azabicyclo[3.1.1]heptane, 2-oxa-5-azabicyclo[2.2.1]heptane, 3-azabicyclo[3.1.0]hexanyl, 3-azabicyclo[4.1.0]heptanyl, azabicyclo[2.2.2]hexanyl, 3H-indolyl, quinolizinyl, N-pyridyl ureas, and pyrrolopyrimidine. Spiro moieties are also included within the scope of this definition. Examples of a heterocyclic group wherein 1 or 2 ring carbon atoms are substituted with oxo (=O) moieties are pyrimidinonyl and 1,1-dioxo-thiomorpholinyl. The heterocycle groups herein are optionally substituted independently with one or more substituents described herein.

To "treat" a disease as the term is used herein means to reduce the frequency or severity of at least one sign or symptom of a disease or disorder experienced by a host (i.e. palliative treatment) or to decrease a cause or effect of the disease or disorder (i.e. disease-modifying treatment).

As used herein "treatment" refers to the treatment of an infection caused by one or more *Acanthamoeba* species. In an alternative embodiment, "treatment" refers to the treatment of an infection caused by *Balamuthia mandrillaris*. In an additional alternative embodiment, "treatment" refers to the treatment of granulomatous amoebic encephalitis (GAE) caused by either one or more *Acanthamoeba* species or by *Balamuthia mandrillaris*.

"Prevention" refers to the prevention of an infection caused by one or more *Acanthamoeba* species and/or cysts thereof. In an alternative embodiment, "prevention" refers to the prevention of an infection caused by *Balamuthia mandrillaris*.

As used herein, "pharmaceutical compositions" are compositions comprising at least one active agent and at least one other substance, such as a carrier. "Pharmaceutical combinations" are combinations of at least two active agents which may be combined in a single dosage form or provided together in separate dosage forms with instructions that the active agents are to be used together to treat any disorder described herein.

The term "carrier" applied to pharmaceutical compositions/combinations of the invention refer to a diluent, excipient, or vehicle with which an active compound is provided.

A "patient" or "host" or "subject" is a human or non-human animal in need of treatment or prevention of any of the disorders specifically described herein. Typically, the host is a human. A "host" may alternatively refer to for example, a mammal, primate (e.g. human), cow, sheep, goat, monkey, horse, dog, cat, rabbit, rat, mice, fish, bird, and the like.

A compound of the present invention may form a solvate with solvents (including water). Therefore, in one non-limiting embodiment, the invention includes a solvated form of the compound. The term "solvate" refers to a molecular complex of a compound of the present invention (including a salt thereof) with one or more solvent molecules. Non-limiting examples of solvents are water, ethanol, dimethyl sulfoxide, acetone, and other common organic solvents. The term "hydrate" refers to a molecular complex comprising a compound of the invention and water. Pharmaceutically acceptable solvates in accordance with the invention include those wherein the solvent may be isotopically substituted, e.g. D2O, d6-acetone, and d6-DMSO. A solvate can be in a liquid or solid form.

As used herein, "pharmaceutically acceptable salt" is a derivative of the disclosed compound in which the parent compound is modified by making inorganic or organic, non-toxic, acid or base addition salts thereof. The salts of the present compounds can be synthesized from a parent compound that contains a basic or acidic moiety by conventional chemical methods. Generally, such salts can be prepared by reacting free acid forms of these compounds with a stoichiometric amount of the appropriate base (such as Na, Ca, Mg, or K hydroxide, carbonate, bicarbonate, or the like), or by reactive free base forms of these compounds with a stoichiometric amount of the appropriate acid. Such reactions are typically carrier out in water or in an organic solvent, or in a mixture of the two. Generally, non-aqueous media like ether, ethyl acetate, ethanol, isopropanol, or acetonitrile are typical, where practical. Salts of the present compounds further include solvates of the compound and the compound salts.

Examples of pharmaceutically acceptable salts include, but are not limited to, mineral or organic acid salts of basic residues such as amines; alkali or organic salts of acidic residues such as carboxylic acids; and the like. The pharmaceutically acceptable salts include the conventional non-toxic salts and the quaternary ammonium salts of the parent compound formed, for example, from non-toxic inorganic or organic acids. For example, conventional non-toxic acid salts include those derived from inorganic acids such as hydrochloric, hydrobromic, sulfuric, sulfamic, phosphoric, nitric and the like; and the salts prepared from organic acids such as acetic, propionic, succinic, glycolic, stearic, lactic, malic, tartaric, citric, ascorbic, pamoic, maleic, hydroxymaleic, phenylacetic, glutamic, benzoic, salicylic, mesylic, esylic, besylic, sulfanilic, 2-acetoxybenzoic, fumaric, toluenesulfonic, methanesulfonic, ethane disulfonic, oxalic, isethionic, HOOC—(CH2)n-COOH where n is 0-4, and the like, or using a different acid that produces the same counterion. Lists of additional suitable salts may be found, e.g., in *Remington's Pharmaceutical Sciences*, 17$^{th}$ ed., Mack Publishing Company, Easton, Pa., p. 1418 (1985).

Compounds of the Present Invention

The present invention provides a compound of Formula 2, Formula 3, or Formula 4 or a pharmaceutically acceptable salt thereof, optionally in a carrier to form a pharmaceutical composition. The present invention also provides a compound selected from Compound A-Compound R and Compound U-Compound AR or a pharmaceutically acceptable salt thereof, optionally in a carrier to form a pharmaceutical composition.

The present invention also provides a method for the treatment or prevention of an infection caused by one or more *Acanthamoeba* species or the disinfection of one or more *Acanthamoeba* species from objects comprising administering an effective amount of a compound of Formula 1, Formula 2, Formula 3, Formula 4, or Formula 7 or a pharmaceutically acceptable salt thereof, optionally in a carrier to form a pharmaceutical composition. In an alternative aspect, the present invention provides a method for the treatment or prevention of an infection caused by *B. mandrillaris* comprising administering an effective amount of a compound of Formula 1 through Formula 7 or a pharmaceutically acceptable salt thereof, optionally in a carrier to form a pharmaceutical composition.

The present invention includes compounds of Formula 1 through Formula 7 or a compound selected from Compound A through Compound BH with at least one desired isotopic substitution of an atom, at an amount above the natural abundance of the isotope, i.e., enriched. Isotopes are atoms having the same atomic number but different mass numbers, i.e., the same number of protons but a different number of neutrons.

Examples of isotopes that can be incorporated into compounds of the invention include isotopes of hydrogen, carbon, nitrogen, oxygen, phosphorous, fluorine, chlorine and iodine such as $^{2}H$, $^{3}H$, $^{11}C$, $^{13}C$, $^{14}C$, $^{15}N$, $^{17}O$, $^{18}O$, $^{18}F$ $^{31}P$, $^{32}P$, $^{35}S$, $^{36}Cl$, and $^{125}I$ respectively. In one non-limiting embodiment, isotopically labelled compounds can be used in metabolic studies (with $^{14}C$), reaction kinetic studies (with, for example $^{2}H$ or $^{3}H$), detection or imaging techniques, such as positron emission tomography (PET) or single-photon emission computed tomography (SPECT) including drug or substrate tissue distribution assays, or in radioactive treatment of patients. In particular, an $^{18}F$ labeled compound may be particularly desirable for PET or SPECT studies. Isotopically labeled compounds of this invention and prodrugs thereof can generally be prepared by carrying out the procedures disclosed in the schemes or in the examples and preparations described below by substituting a readily available isotopically labeled reagent for a non-isotopically labeled reagent.

By way of general example and without limitation, isotopes of hydrogen, for example, deuterium ($^{2}H$) and tritium ($^{3}H$) may be used anywhere in described structures that achieves the desired result. Alternatively or in addition, isotopes of carbon, e.g., $^{13}C$ and $^{14}C$, may be used.

Isotopic substitutions, for example deuterium substitutions, can be partial or complete. Partial deuterium substitution means that at least one hydrogen is substituted with deuterium. In certain embodiments, the isotope is 90, 95 or 99% or more enriched in an isotope at any location of interest. In one non-limiting embodiment, deuterium is 90, 95 or 99% enriched at a desired location. In one embodiment, at least one hydrogen within a compound described herein is replaced with a deuterium. In one aspect, the deuterium is at a location of metabolism.

In one non-limiting embodiment, the substitution of one or more hydrogen atoms for a deuterium atoms can be provided in any of Formula 1 through Formula 7 and a compound selected from Compound A through Compound BH. In one non-limiting embodiment, the substitution of a hydrogen atom for a deuterium atom occurs within a group selected from any of $R^1$, $R^2$, $R^3$, $R^4$, $R^5$, $R^6$, $R^7$, $R^8$, $R^9$, $R^{10}$, $R^A$, $R^B$, $R^X$, and $R^Y$. For example, when any of the groups are, or contain for example through substitution, methyl, ethyl, or methoxy, the alkyl residue may be deuterated (in non-limiting embodiments, $CDH_2$, $CD_2H$, $CD_3$, $CH_2CD_3$, $CD_2CD_3$, $CHDCH_2D$, $CH_2CD_3$, $CHDCHD_2$, $OCDH_2$, $OCD_2H$, or $OCD_3$ etc.). In certain other embodiments, when two substituents are combined to form a cycle the unsubstituted carbons may be deuterated.

In one aspect, a compound is provided of Formula 1 for use in the treatment or prevention of an infection by one or more *Acanthamoeba* species:

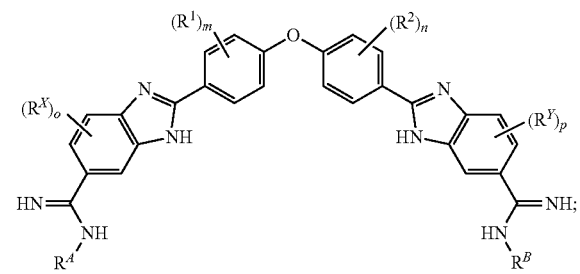

(1)

or a pharmaceutically acceptable salt thereof;
wherein $R^1$, $R^2$, $R^A$, $R^B$, $R^X$, $R^Y$, m, n, o and p are defined as above.

In an alternative aspect, a compound is provided of Formula 1 for use in the treatment of an infection caused by *Balamuthia mandrillaris*. In one embodiment, the infection caused by either one or more *Acanthamoeba* species or *Balamuthia mandrillaris* is granulomatous amoebic encephalitis (GAE)

In one aspect, a compound of Formula 2 is provided:

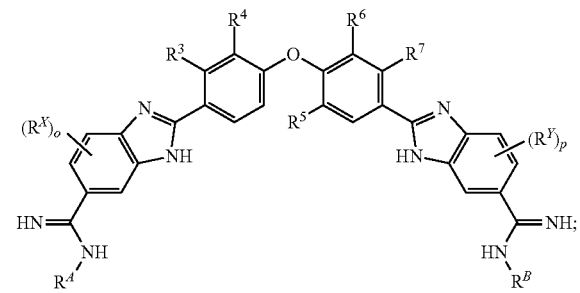

(2)

or a pharmaceutically acceptable salt thereof;
wherein $R^3$, $R^4$, $R^5$, $R^6$, $R^7$, $R^A$, $R^B$, $R^X$, $R^Y$, o and p are defined as above.

In one aspect, a compound of Formula 3 is provided:

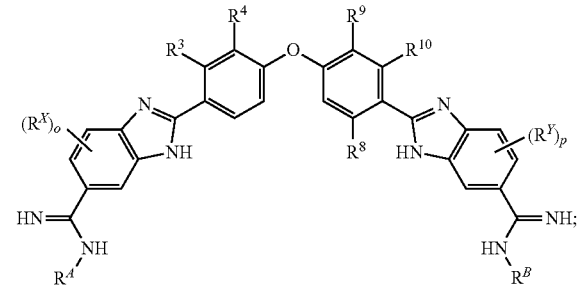

(3)

or a pharmaceutically acceptable salt thereof;

wherein $R^3$, $R^4$, $R^8$, $R^9$, $R^{10}$, $R^A$, $R^B$, $R^X$, $R^Y$, o and p are defined as above.

In one embodiment of Formula 1, m is 0. In one embodiment of Formula 1, m is 1. In one embodiment of Formula 1, m is 2. In one embodiment of Formula 1, m is 3. In one embodiment of Formula 1, m is 4.

In one embodiment of Formula 1, n is 0. In one embodiment of Formula 1, n is 1. In one embodiment of Formula 1, n is 2. In one embodiment of Formula 1, n is 3. In one embodiment of Formula 1, n is 4.

In one embodiment of any one of Formula 1, Formula 2, or Formula 3, o is 0. In one embodiment of any one of Formula 1, Formula 2, or Formula 3, o is 1. In one embodiment of any one of Formula 1, Formula 2, or Formula 3, o is 2. In one embodiment of any one of Formula 1, Formula 2, or Formula 3, o is 3.

In one embodiment of any one of Formula 1, Formula 2, or Formula 3, p is 0. In one embodiment of any one of Formula 1, Formula 2, or Formula 3, p is 1. In one embodiment of any one of Formula 1, Formula 2, or Formula 3, p is 2. In one embodiment of any one of Formula 1, Formula 2, or Formula 3, p is 3.

In one embodiment of Formula 1, $R^1$ is fluoro. In one embodiment of Formula 1, $R^1$ is chloro. In one embodiment of Formula 1, $R^1$ is methoxy. In one embodiment of Formula 1, $R^1$ is ethoxy. In one embodiment of Formula 1, $R^1$ is propoxy. In one embodiment of Formula 1, $R^1$ is isopropoxy. In one embodiment of Formula 1, $R^1$ is butoxy. In one embodiment of Formula 1, $R^1$ is tert-butoxy. In one embodiment of Formula 1, $R^1$ is trifluoromethyl. In one embodiment of Formula 1, $R^1$ is trichloromethyl. In one embodiment of Formula 1, $R^1$ is trifluoroethyl. In one embodiment of Formula 1, $R^1$ is trichloroethyl. In one embodiment of Formula 1, $R^1$ is hexafluoroisopropyl.

In one embodiment of Formula 1, $R^2$ is fluoro. In one embodiment of Formula 1, $R^2$ is chloro. In one embodiment of Formula 1, $R^2$ is methoxy. In one embodiment of Formula 1, $R^2$ is ethoxy. In one embodiment of Formula 1, $R^2$ is propoxy. In one embodiment of Formula 1, $R^2$ is isopropoxy. In one embodiment of Formula 1, $R^2$ is butoxy. In one embodiment of Formula 1, $R^2$ is tert-butoxy. In one embodiment of Formula 1, $R^2$ is trifluoromethyl. In one embodiment of Formula 1, $R^2$ is trichloromethyl. In one embodiment of Formula 1, $R^2$ is trifluoroethyl. In one embodiment of Formula 1, $R^2$ is trichloroethyl. In one embodiment of Formula 1, $R^2$ is hexafluoroisopropyl.

In one embodiment of any one of Formula 1, Formula 2, or Formula 3, $R^X$ is fluoro. In one embodiment of any one of Formula 1, Formula 2, or Formula 3, $R^X$ is chloro. In one embodiment of any one of Formula 1, Formula 2, or Formula 3, $R^X$ is methoxy. In one embodiment of any one of Formula 1, Formula 2, or Formula 3, $R^X$ is ethoxy. In one embodiment of any one of Formula 1, Formula 2, or Formula 3, $R^X$ is propoxy. In one embodiment of any one of Formula 1, Formula 2, or Formula 3, $R^X$ is isopropoxy. In one embodiment of any one of Formula 1, Formula 2, or Formula 3, $R^X$ is butoxy. In one embodiment of any one of Formula 1, Formula 2, or Formula 3, $R^X$ is tert-butoxy. In one embodiment of any one of Formula 1, Formula 2, or Formula 3, $R^X$ is trifluoromethyl. In one embodiment of any one of Formula 1, Formula 2, or Formula 3, $R^X$ is trichloromethyl. In one embodiment of any one of Formula 1, Formula 2, or Formula 3, $R^X$ is trifluoroethyl. In one embodiment of any one of Formula 1, Formula 2, or Formula 3, $R^X$ is trichloroethyl. In one embodiment of any one of Formula 1, Formula 2, or Formula 3, $R^X$ is hexafluoroisopropyl.

In one embodiment of any one of Formula 1, Formula 2, or Formula 3, $R^Y$ is fluoro. In one embodiment of any one of Formula 1, Formula 2, or Formula 3, R is chloro. In one embodiment of any one of Formula 1, Formula 2, or Formula 3, $R^Y$ is methoxy. In one embodiment of any one of Formula 1, Formula 2, or Formula 3, $R^Y$ is ethoxy. In one embodiment of any one of Formula 1, Formula 2, or Formula 3, $R^Y$ is propoxy. In one embodiment of any one of Formula 1, Formula 2, or Formula 3, $R^Y$ is isopropoxy. In one embodiment of any one of Formula 1, Formula 2, or Formula 3, $R^Y$ is butoxy. In one embodiment of any one of Formula 1, Formula 2, or Formula 3, $R^Y$ is tert-butoxy. In one embodiment of any one of Formula 1, Formula 2, or Formula 3, $R^Y$ is trifluoromethyl. In one embodiment of any one of Formula 1, Formula 2, or Formula 3, $R^Y$ is trichloromethyl. In one embodiment of any one of Formula 1, Formula 2, or Formula 3, $R^Y$ is trifluoroethyl. In one embodiment of any one of Formula 1, Formula 2, or Formula 3, $R^Y$ is trichloroethyl. In one embodiment of any one of Formula 1, Formula 2, or Formula 3, $R^Y$ is hexafluoroisopropyl.

In one embodiment of any one of Formula 1, Formula 2, or Formula 3, $R^A$ is methyl. In one embodiment of any one of Formula 1, Formula 2, or Formula 3, $R^A$ is ethyl. In one embodiment of any one of Formula 1, Formula 2, or Formula 3, $R^A$ is propyl. In one embodiment of any one of Formula 1, Formula 2, or Formula 3, $R^A$ is isopropyl. In one embodiment of any one of Formula 1, Formula 2, or Formula 3, $R^A$ is butyl. In one embodiment of any one of Formula 1, Formula 2, or Formula 3, $R^A$ is tert-butyl. In one embodiment of any one of Formula 1, Formula 2, or Formula 3, $R^A$ is pentyl. In one embodiment of any one of Formula 1, Formula 2, or Formula 3, $R^A$ is 2-pentyl. In one embodiment of any one of Formula 1, Formula 2, or Formula 3, $R^A$ is 3-pentyl. In one embodiment of any one of Formula 1, Formula 2, or Formula 3, $R^A$ is hexyl.

In one embodiment of any one of Formula 1, Formula 2, or Formula 3, $R^B$ is methyl. In one embodiment of any one of Formula 1, Formula 2, or Formula 3, $R^B$ is ethyl. In one embodiment of any one of Formula 1, Formula 2, or Formula 3, $R^B$ is propyl. In one embodiment of any one of Formula 1, Formula 2, or Formula 3, $R^B$ is isopropyl. In one embodiment of any one of Formula 1, Formula 2, or Formula 3, $R^B$ is butyl. In one embodiment of any one of Formula 1, Formula 2, or Formula 3, $R^B$ is tert-butyl. In one embodiment of any one of Formula 1, Formula 2, or Formula 3, $R^B$ is pentyl. In one embodiment of any one of Formula 1, Formula 2, or Formula 3, $R^B$ is 2-pentyl. In one embodiment of any one of Formula 1, Formula 2, or Formula 3, $R^B$ is 3-pentyl. In one embodiment of any one of Formula 1, Formula 2, or Formula 3, $R^B$ is hexyl.

In one embodiment of any one of Formula 2 or Formula 3, $R^3$ is hydrogen. In one embodiment of any one of Formula 2 or Formula 3, $R^3$ is fluoro. In one embodiment of any one of Formula 2 or Formula 3, $R^3$ is chloro. In one embodiment of any one of Formula 2 or Formula 3, $R^3$ is methoxy. In one embodiment of any one of Formula 2 or Formula 3, $R^3$ is ethoxy. In one embodiment of any one of Formula 2 or Formula 3, $R^3$ is propoxy. In one embodiment of any one of Formula 2 or Formula 3, $R^3$ is isopropoxy. In one embodiment of any one of Formula 2 or Formula 3, $R^3$ is butoxy. In one embodiment of any one of Formula 2 or Formula 3, $R^3$ is tert-butoxy. In one embodiment of any one of Formula 2 or Formula 3, $R^3$ is trifluoromethyl. In one embodiment of any one of Formula 2 or Formula 3, $R^3$ is trichloromethyl. In one embodiment of any one of Formula 2 or Formula 3, $R^3$ is trifluoroethyl. In one embodiment of any one of Formula 2 or Formula 3, $R^3$ is trichloroethyl. In one embodiment of any one of Formula 2 or Formula 3, $R^3$ is hexafluoroisopropyl.

In one embodiment of any one of Formula 2 or Formula 3, $R^4$ is hydrogen. In one embodiment of any one of Formula 2 or Formula 3, $R^4$ is fluoro. In one embodiment of any one of Formula 2 or Formula 3, $R^4$ is chloro. In one embodiment of any one of Formula 2 or Formula 3, $R^4$ is methoxy. In one embodiment of any one of Formula 2 or Formula 3, $R^4$ is ethoxy. In one embodiment of any one of Formula 2 or Formula 3, $R^4$ is propoxy. In one embodiment of any one of Formula 2 or Formula 3, $R^4$ is isopropoxy. In one embodiment of any one of Formula 2 or Formula 3, $R^4$ is butoxy. In one embodiment of any one of Formula 2 or Formula 3, $R^4$ is tert-butoxy. In one embodiment of any one of Formula 2 or Formula 3, $R^4$ is trifluoromethyl. In one embodiment of any one of Formula 2 or Formula 3, $R^4$ is trichloromethyl. In one embodiment of any one of Formula 2 or Formula 3, $R^4$ is trifluoroethyl. In one embodiment of any one of Formula 2 or Formula 3, $R^4$ is trichloroethyl. In one embodiment of any one of Formula 2 or Formula 3, $R^4$ is hexafluoroisopropyl.

In one embodiment of Formula 2, $R^5$ is fluoro. In one embodiment of Formula 2, $R^5$ is chloro. In one embodiment of Formula 2, $R^5$ is methoxy. In one embodiment of Formula 2, $R^5$ is ethoxy. In one embodiment of Formula 2, $R^5$ is propoxy. In one embodiment of Formula 2, $R^5$ is isopropoxy. In one embodiment of Formula 2, $R^5$ is butoxy. In one embodiment of Formula 2, $R^5$ is tert-butoxy. In one embodiment of Formula 2, $R^5$ is trifluoromethyl. In one embodiment of Formula 2, $R^5$ is trichloromethyl. In one embodiment of Formula 2, $R^5$ is trifluoroethyl. In one embodiment of Formula 2, $R^5$ is trichloroethyl. In one embodiment of Formula 2, $R^5$ is hexafluoroisopropyl.

In one embodiment of Formula 2, $R^6$ is hydrogen and $R^7$ is not hydrogen. In one embodiment of Formula 2, $R^6$ is fluoro. In one embodiment of Formula 2, $R^6$ is chloro. In one embodiment of Formula 2, $R^6$ is methoxy. In one embodiment of Formula 2, $R^6$ is ethoxy. In one embodiment of Formula 2, $R^6$ is propoxy. In one embodiment of Formula 2, $R^6$ is isopropoxy. In one embodiment of Formula 2, $R^6$ is butoxy. In one embodiment of Formula 2, $R^6$ is tert-butoxy. In one embodiment of Formula 2, $R^6$ is trifluoromethyl. In one embodiment of Formula 2, $R^6$ is trichloromethyl. In one embodiment of Formula 2, $R^6$ is trifluoroethyl. In one embodiment of Formula 2, $R^6$ is trichloroethyl. In one embodiment of Formula 2, $R^6$ is hexafluoroisopropyl.

In one embodiment of Formula 2, $R^7$ is hydrogen and $R^6$ is not hydrogen. In one embodiment of Formula 2, $R^6$ is fluoro. In one embodiment of Formula 2, $R^7$ is chloro. In one embodiment of Formula 2, $R^7$ is methoxy. In one embodiment of Formula 2, $R^7$ is ethoxy. In one embodiment of Formula 2, $R^7$ is propoxy. In one embodiment of Formula 2, R is isopropoxy. In one embodiment of Formula 2, $R^7$ is butoxy. In one embodiment of Formula 2, $R^7$ is tert-butoxy. In one embodiment of Formula 2, $R^7$ is trifluoromethyl. In one embodiment of Formula 2, $R^7$ is trichloromethyl. In one embodiment of Formula 2, $R^7$ is trifluoroethyl. In one embodiment of Formula 2, $R^7$ is trichloroethyl. In one embodiment of Formula 2, $R^7$ is hexafluoroisopropyl.

In one embodiment of Formula 3, $R^8$ is fluoro. In one embodiment of Formula 3, $R^8$ is chloro. In one embodiment of Formula 3, $R^8$ is methoxy. In one embodiment of Formula 3, $R^8$ is ethoxy. In one embodiment of Formula 3, $R^8$ is propoxy. In one embodiment of Formula 3, $R^8$ is isopropoxy. In one embodiment of Formula 3, $R^8$ is butoxy. In one embodiment of Formula 3, $R^8$ is tert-butoxy. In one embodiment of Formula 3, $R^8$ is trifluoromethyl. In one embodiment of Formula 3, $R^8$ is trichloromethyl. In one embodiment of Formula 3, $R^8$ is trifluoroethyl. In one embodiment of Formula 3, $R^8$ is trichloroethyl. In one embodiment of Formula 3, $R^8$ is hexafluoroisopropyl.

In one embodiment of Formula 3, $R^9$ is hydrogen and $R^{10}$ is not hydrogen. In one embodiment of Formula 3, $R^9$ is fluoro. In one embodiment of Formula 3, $R^9$ is chloro. In one embodiment of Formula 3, $R^9$ is methoxy. In one embodiment of Formula 3, $R^9$ is ethoxy. In one embodiment of Formula 3, $R^6$ is propoxy. In one embodiment of Formula 3, $R^9$ is isopropoxy. In one embodiment of Formula 3, $R^9$ is butoxy. In one embodiment of Formula 3, $R^9$ is tert-butoxy. In one embodiment of Formula 3, $R^9$ is trifluoromethyl. In one embodiment of Formula 3, $R^9$ is trichloromethyl. In one embodiment of Formula 3, $R^9$ is trifluoroethyl. In one embodiment of Formula 3, $R^9$ is trichloroethyl. In one embodiment of Formula 3, $R^9$ is hexafluoroisopropyl.

In one embodiment of Formula 3, $R^{10}$ is hydrogen and $R^9$ is not hydrogen. In one embodiment of Formula 3, $R^{10}$ is fluoro. In one embodiment of Formula 3, $R^{10}$ is chloro. In one embodiment of Formula 3, $R^{10}$ is methoxy. In one embodiment of Formula 3, $R^{10}$ is ethoxy. In one embodiment of Formula 3, $R^{10}$ is propoxy. In one embodiment of Formula 3, $R^{10}$ is isopropoxy. In one embodiment of Formula 3, $R^{10}$ is butoxy. In one embodiment of Formula 3, $R^{10}$ is tert-butoxy. In one embodiment of Formula 3, $R^{10}$ is trifluoromethyl. In one embodiment of Formula 3, $R^{10}$ is trichloromethyl. In one embodiment of Formula 3, $R^{10}$ is trifluoroethyl. In one embodiment of Formula 3, $R^{10}$ is trichloroethyl. In one embodiment of Formula 3, $R^{10}$ is hexafluoroisopropyl.

In one embodiment of Formula 1,

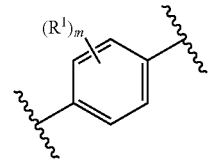

is selected from:

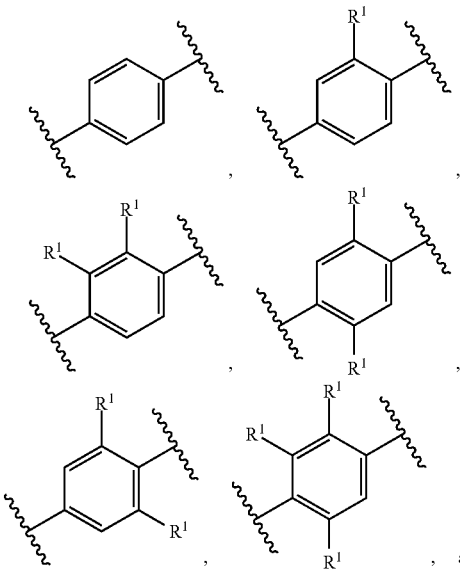

, and

-continued
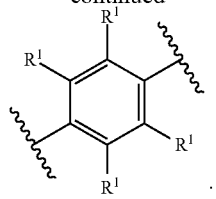
In one embodiment of Formula 1,
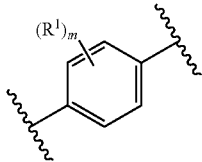
is selected from:
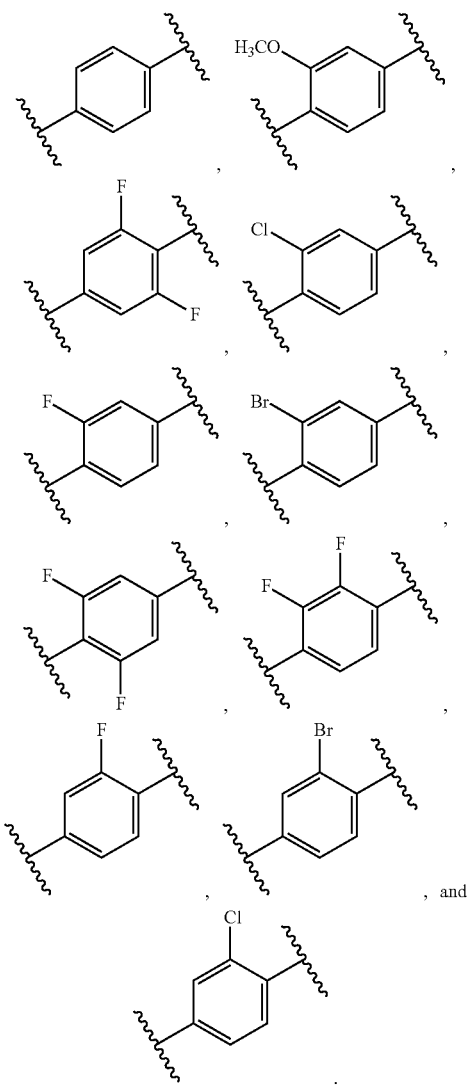
, and
In one embodiment of Formula 1,
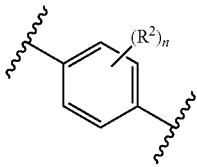
is selected from:
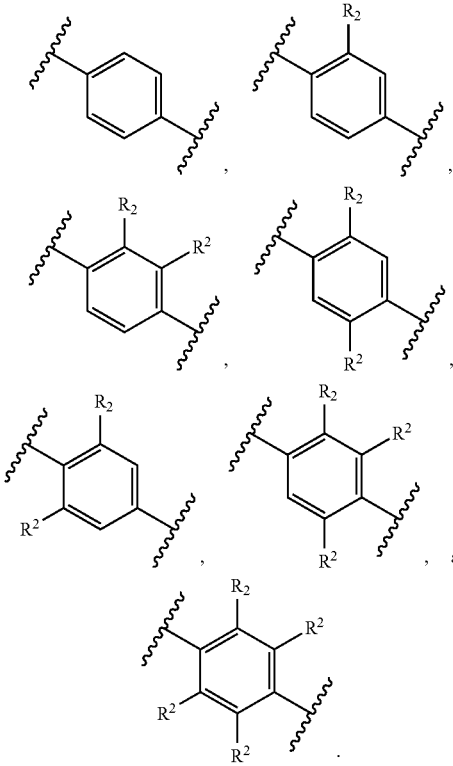
, and
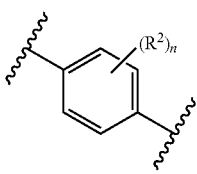
In one embodiment of Formula 1,
is selected from:
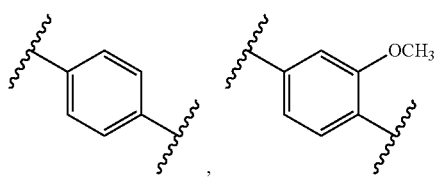
,

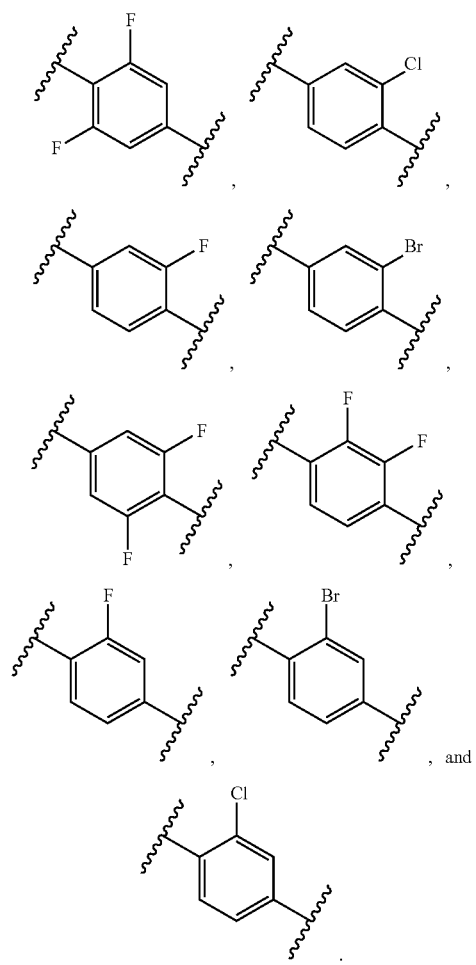
In one embodiment of any one Formula 1, Formula 2, or Formula 3,
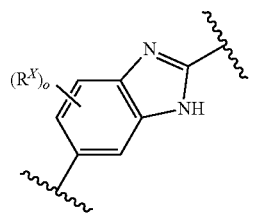
is selected from:
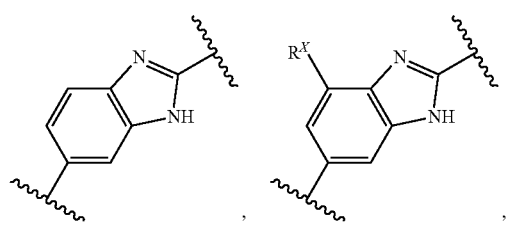
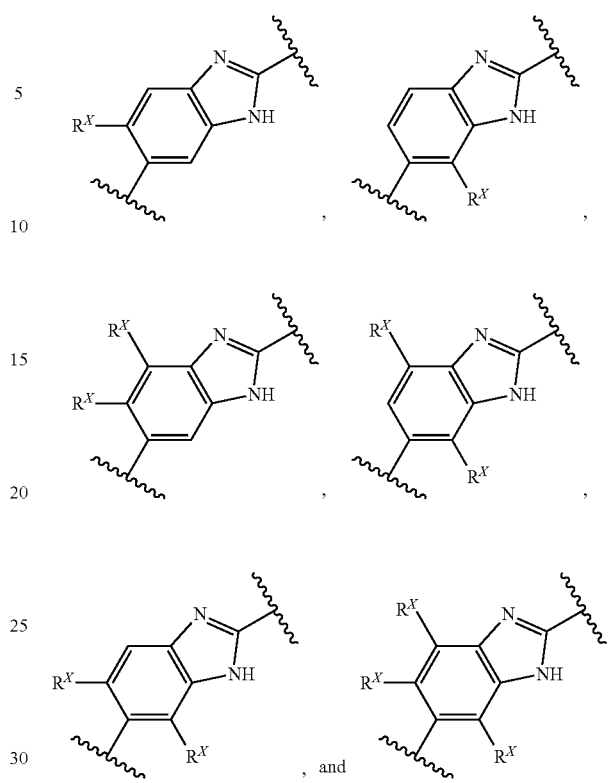
In one embodiment of any one Formula 1, Formula 2, or Formula 3,
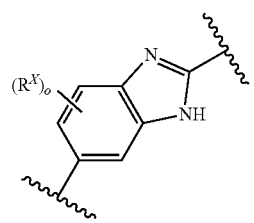
is selected from:
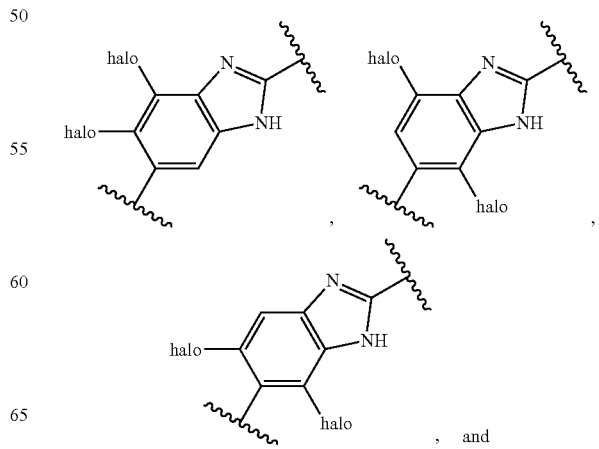

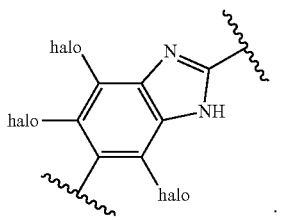
In one embodiment of any one Formula 1, Formula 2, or Formula 3,
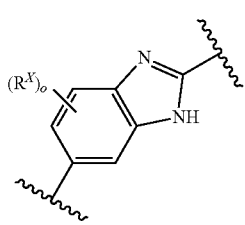
is selected from:
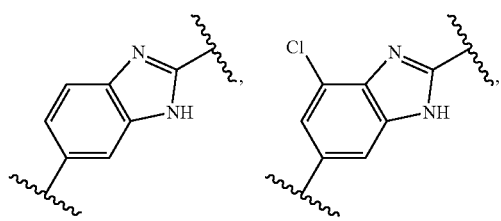
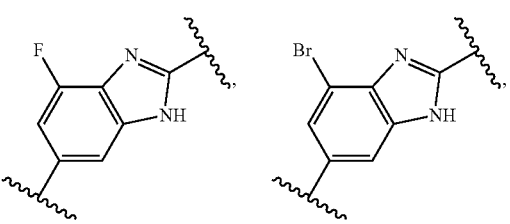
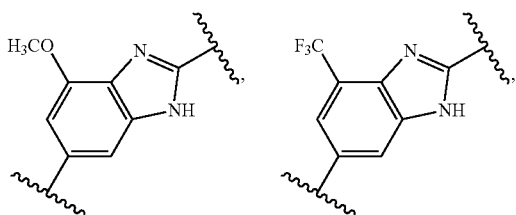
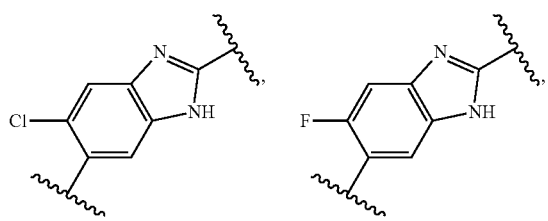
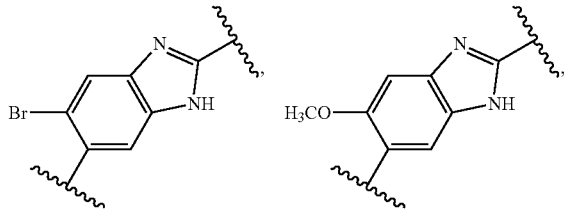
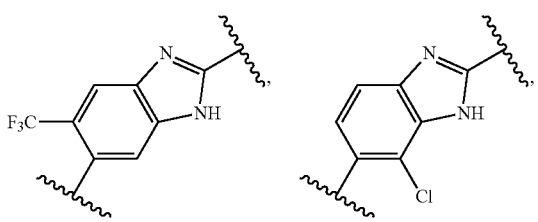
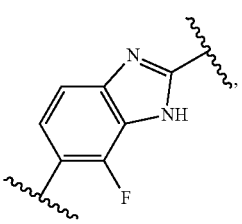 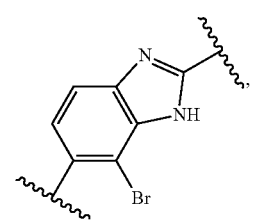
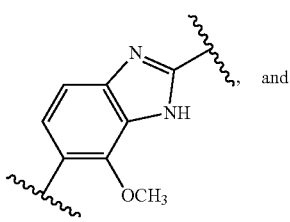
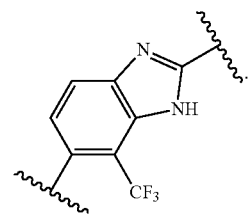
In one embodiment of any one Formula 1, Formula 2, or Formula 3,
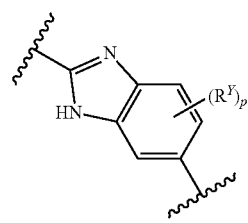

is selected from:
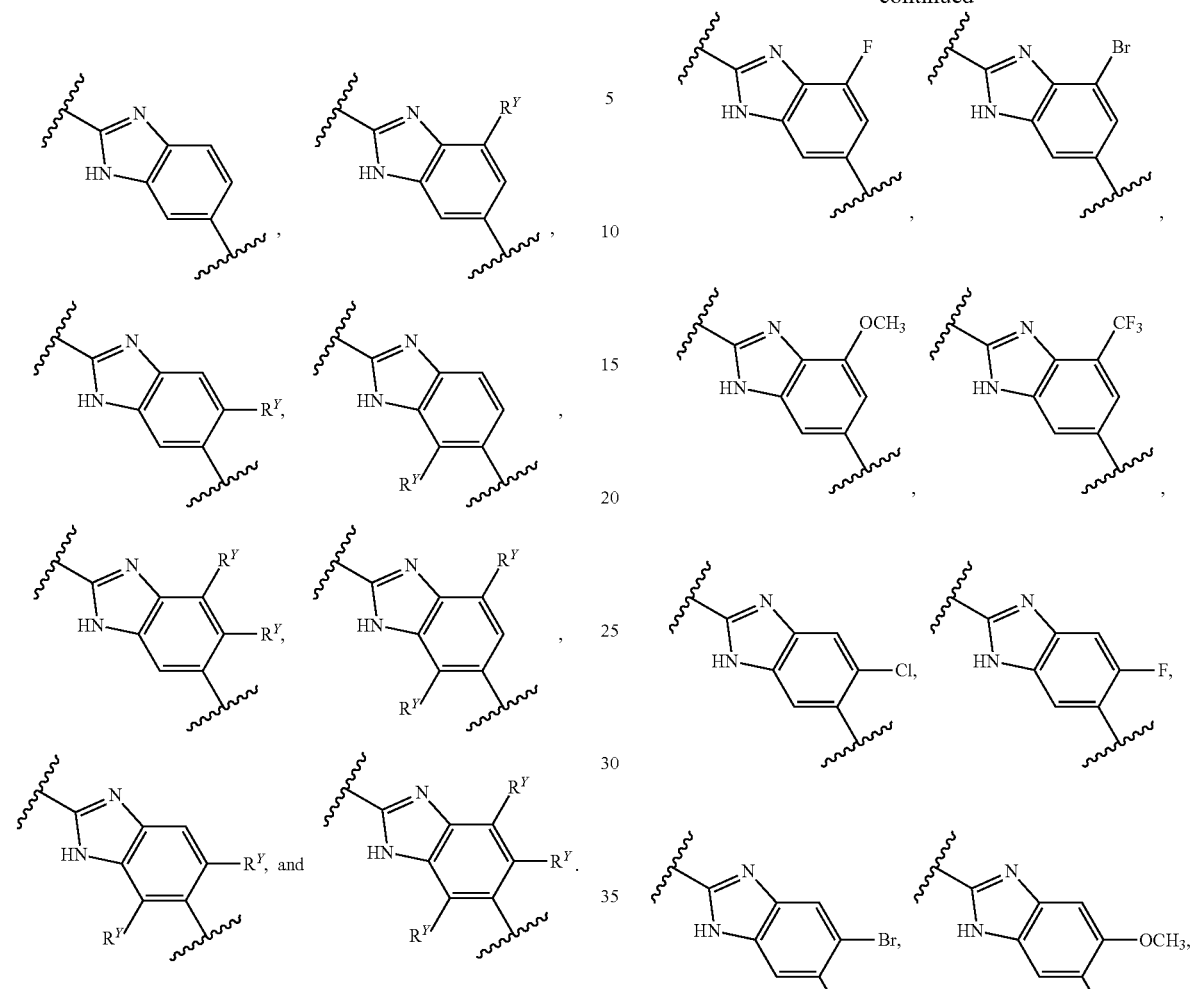
In one embodiment of any one Formula 1, Formula 2, or Formula 3,
is selected from:
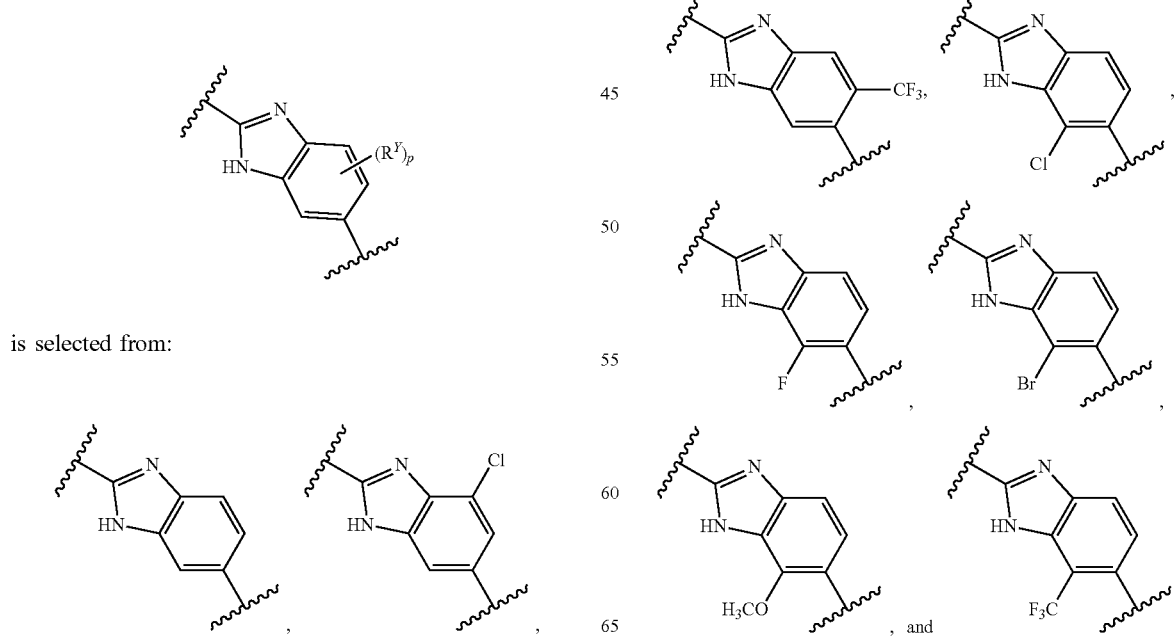

In one embodiment of any one Formula 1, Formula 2, or Formula 3,
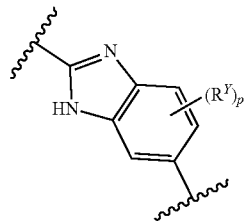
is selected from.
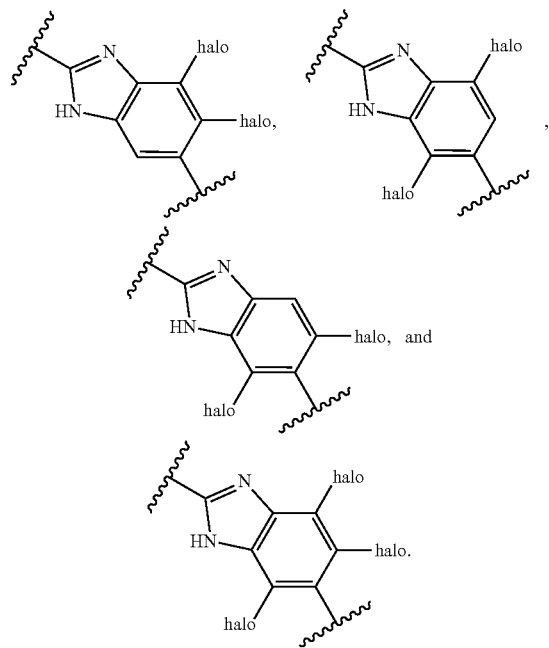
In one embodiment, the compound of Formula 1 is selected from:
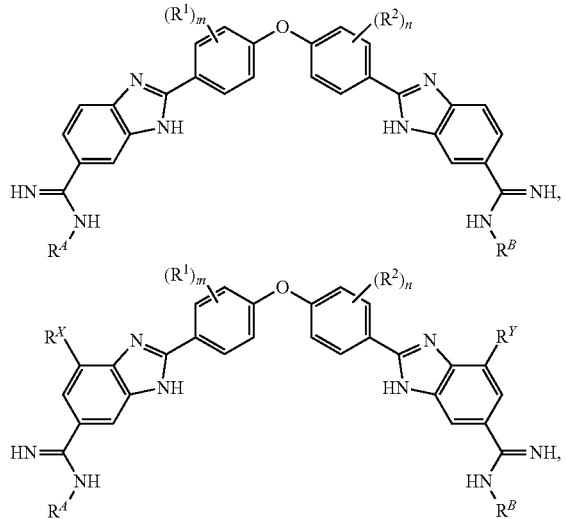
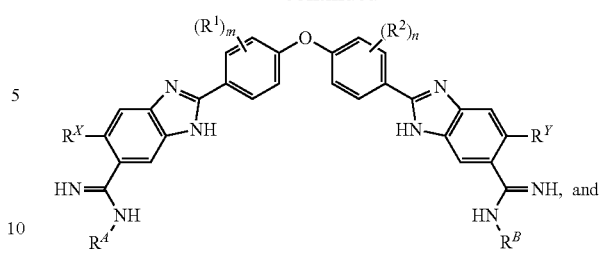
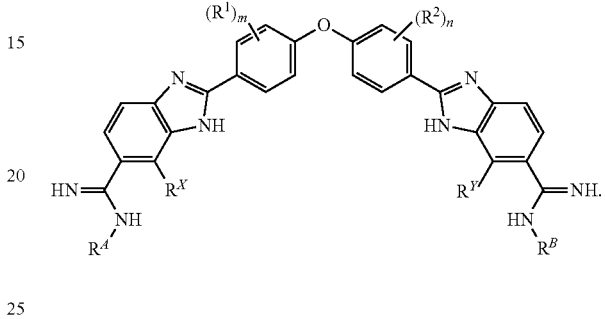
In one embodiment, the compound of Formula 2 is selected from:
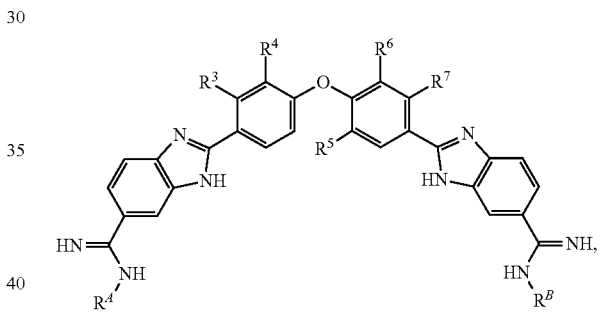
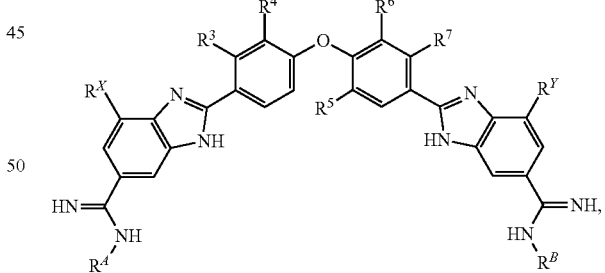
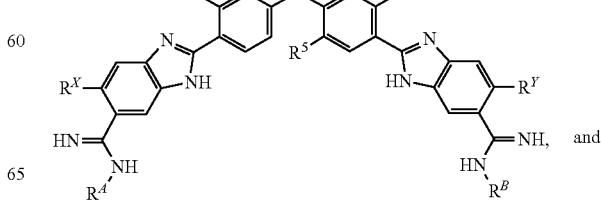

-continued

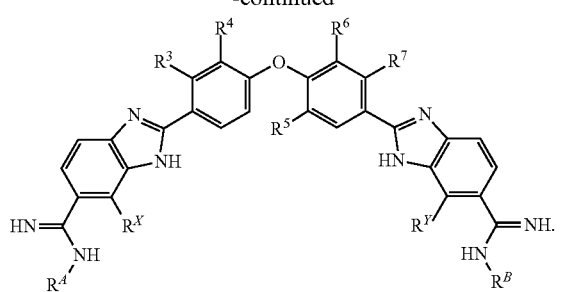

In one embodiment of Formula 3, the compound is selected from:

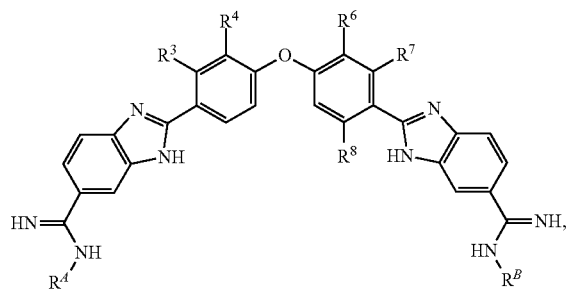

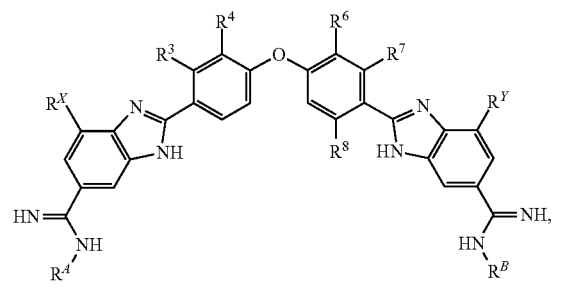

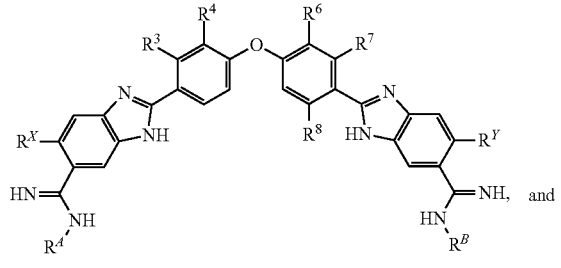, and

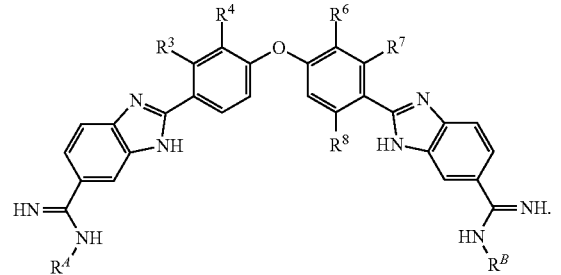

In an alternative aspect of the present invention, compound of Formula 4 is provided:

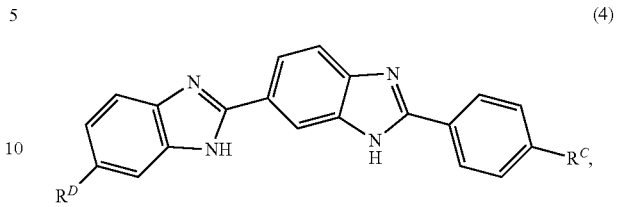

(4)

or a pharmaceutically acceptable salt thereof;
wherein $R^C$ and $R^D$ are defined as above.

In one embodiment, $R^C$ is selected from:

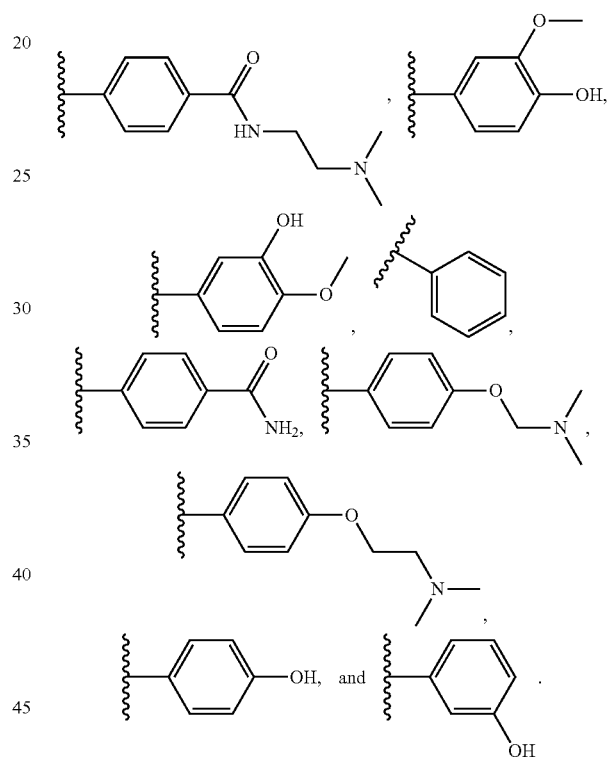

In one embodiment, $R^D$ is selected from

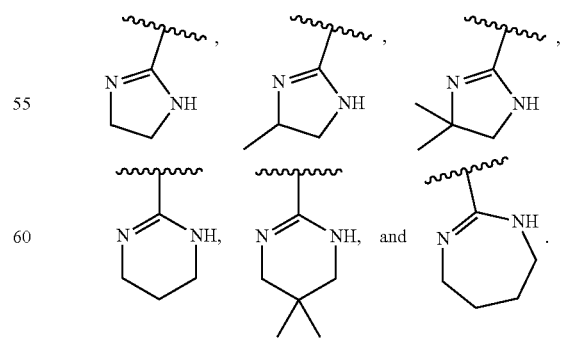

In one embodiment, a is 1, 2, 3 or 4.
In one embodiment, a is 1, 2 or 3.

In one embodiment, $R^{11}$ and $R^{12}$ are independently at each occurrence selected from hydrogen, halogen, hydroxyl, $C_1$-$C_6$alkyl, $C_1$-$C_4$alkoxy, cycloalkyl and $C_1$-$C_4$haloalkyl.

In one embodiment, $R^{11}$ and $R^{12}$ are both hydrogen.

In one embodiment, $R^{11}$ and $R^{12}$ are independently at each occurrence selected from hydrogen, $C_1$-$C_6$alkyl, and cycloalkyl.

In one embodiment, $R^D$ is

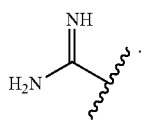

In one embodiment, $R^5$ is independently at each occurrence selected from hydrogen, $C_1$-$C_6$alkyl, $C_1$-$C_4$alkoxy, $C_3$cycloalkyl, $C_5$-$C_8$cycloalkyl, and $C_1$-$C_4$haloalkyl.

In one embodiment, $R^5$ is hydrogen, cycloalkyl or $C_1$-$C_6$alkyl.

In an alternative aspect of the present invention, a compound of Formula 5 is provided for the treatment or prevention of an infection caused by *B. mandrillaris*:

(5)

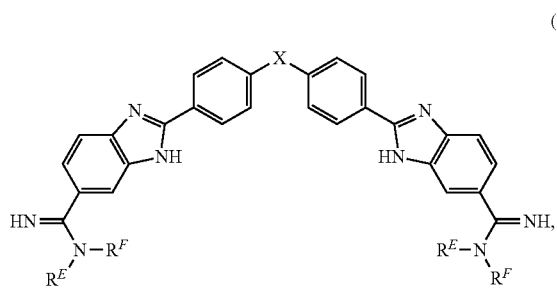

or a pharmaceutically acceptable salt thereof;
wherein X, $R^E$ and $R^F$ are defined as above.

In one embodiment, X is NH, $NR^{16}$, O or $C_1$-$C_3$alkyl.

In one embodiment, X is NH.

In one embodiment, X is $NR^{16}$ wherein $R^{16}$ is hydrogen, $C_1$-$C_6$alkyl, or aryl.

In one embodiment, X is $NR^{16}$, wherein $R^{16}$ is hydrogen.

In one embodiment, X is $NR^{16}$, wherein $R^{16}$ is aryl.

In one embodiment, X is $NR^{16}$, where $R^{16}$ is a $C_1$-$C_6$alkyl.

In one embodiment, X is O.

In one embodiment, X is $C_1$-$C_3$alkyl.

In one embodiment, $R^E$ and $R^F$ are each independently $C_1$-$C_6$alkyl.

In one embodiment, $R^E$ and $R^F$ are each independently $C_3$-$C_8$cycloalkyl.

In one embodiment, $R^E$ and $R^F$ are each independently a heterocyclyl wherein the heterocyclyl is a 3 to 7 ring members (2 to 6 carbon atoms and 1 to 4 heteroatoms selected from N, O, and S).

In one embodiment, $R^E$ and $R^F$ are independently joined together to form a heterocyclyl wherein the heterocyclyl is a 3 to 7 ring members (2 to 6 carbon atoms and 1 to 4 heteroatoms selected from N, O, and S).

In an alternative aspect of the present invention, a compound of Formula 6 is provided for the treatment or prevention of an infection caused b *B. mandrillaris*:

(6)

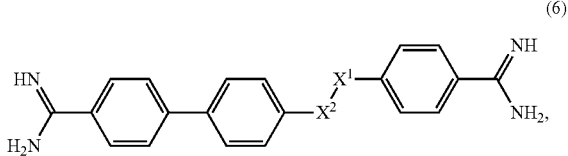

or a pharmaceutically acceptable salt thereof;
wherein
$X^1$ and $X^2$ are defined as above.

In one embodiment, $X^2$ is CO or $CH_2$; and $X^1$ is O, NH or N(alkyl).

In one embodiment, $X^1$ is CO or $CH_2$; and $X^2$ is O, NH or N(alkyl).

In an alternative aspect of the present invention, a compound of Formula 7 is provided for the treatment or prevention of an infection caused by *B. mandrillaris* or one or more *Acanthamoeba* species or the disinfection of one or more *Acanthamoeba* species from objects:

(7)

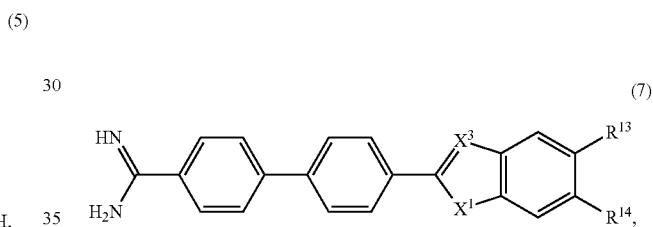

or a pharmaceutically acceptable salt thereof;
wherein $X^1$, $R^{13}$ and $R^{14}$ are defined above.

In one embodiment, $X^1$ is NH or N(alkyl).

In one embodiment, $X^3$ is CH or N.

In one embodiment, $X^3$ is N.

In one embodiment, $X^3$ is CH.

In one embodiment, $R^3$ is $R^{13}$ is

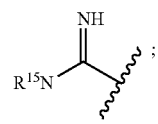

and $R^{14}$ is hydrogen.

In one embodiment, $R^{13}$ is hydrogen and $R^{14}$ is

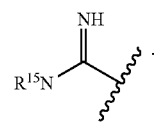

In some embodiments, the compound is selected from Compound A through Compound H in Table 1 below:

TABLE 1

Compound A-Compound H

| Formula | Name | Structure |
|---|---|---|
| A | 2-(3,5-Difluoro-4-(4-(6-(N-isopropylcarbamimidoyl)-1H-benzo[d]imidazol-2-yl)-3-methoxyphenoxy)phenyl)-N-isopropyl-1H-benzo[d]imidazole-6-carboximidamide | |
| B | 2-(2-Chloro-4-(2,6-difluoro-4-(6-(N-isopropylcarbamimidoyl)-1H-benzo[d]imidazol-2-yl)phenoxy)phenyl)-N-isopropyl-1H-benzo[d]imidazole-6-carboximidamide | |
| C | 2-(3,5-Difluoro-4-(3-fluoro-4-(6-(N-isopropylcarbamimidoyl)-1H-benzo[d]imidazol-2-yl)phenoxy)phenyl)-N-isopropyl-1H-benzo[d]imidazole-6-carboximidamide | |
| D | 2,2'-(Oxybis(2-bromo-4,1-phenylene))bis(N-isopropyl-1H-benzo[d]imidazole-6-carboximidamide) | |

TABLE 1-continued

Compound A-Compound H

| Formula | Name | Structure |
|---|---|---|
| E | 2-(2-Bromo-4-(3-fluoro-4-(6-(N-isopropylcarbamimidoyl)-1H-benzo[d]imidazol-2-yl)phenoxy)phenyl)-N-isopropyl-1H-benzo[d]imidazole-6-carboximidamide | |
| F | 2-(2-Bromo-4-(2,6-difluoro-4-(6-(N-isopropylcarbamimidoyl)-1H-benzo[d]imidazol-2-yl)phenoxy)phenyl)-N-isopropyl-1H-benzo[d]imidazole-6-carboximidamide | |
| G | 2-(2-Bromo-4-(3,5-difluoro-4-(6-(N-isopropylcarbamimidoyl)-1H-benzo[d]imidazol-2-yl)phenoxy)phenyl)-N-isopropyl-1H-benzo[d]imidazole-6-carboximidamide | |
| H | 2-(2-Bromo-4-(2,3-difluoro-4-(6-(N-isopropylcarbamimidoyl)-1H-benzo[d]imidazol-2-yl)phenoxy)phenyl)-N-isopropyl-1H-benzo[d]imidazole-6-carboximidamide | |

In some embodiments, the compound is selected from Compound I-Compound R in Table 2 below:

TABLE 2

Compound I-Compound R

| Formula | Name | Structure |
|---|---|---|
| I | 2-(3-Fluoro-4-(4-(6-(N-isopropylcarbamimidoyl)-1H-benzo[d]imidazol-2-yl)phenoxy)phenyl)-N-isopropyl-1H-benzo[d]imidazole-6-carboximidamide | |
| J | 2-(3-Fluoro-4-(4-(6-(N-isopropylcarbamimidoyl)-1H-benzo[d]imidazol-2-yl)-2-methoxyphenoxy)phenyl)-N-isopropyl-1H-benzo[d]imidazole-6-carboximidamide | |
| K | 2-(3-Fluoro-4-(4-(6-(N-isopropylcarbamimidoyl)-1H-benzo[d]imidazol-2-yl)-3-methoxyphenoxy)phenyl)-N-isopropyl-1H-benzo[d]imidazole-6-carboximidamide | |
| L | 2-2'-(Oxybis(2-chloro-4,1-phenylene))bis(N-isopropyl-3H-benzo[d]imidazole-6-carboximidamide) | |

TABLE 2-continued

Compound I-Compound R

| Formula | Name | Structure |
|---|---|---|
| M | 2-(2-Bromo-4-(4-(6-(N-isopropylcarbamimidoyl)-1H-benzo[d]imidazol-2-yl)phenoxy)phenyl)-N-isopropyl-1H-benzo[d]imidazole-6-carboximidamide | |
| N | 2-(2-Bromo-4-(4-(6-(N-isopropylcarbamimidoyl)-1H-benzo[d]imidazol-2-yl)-3-methoxyphenoxy)phenyl)-N-isopropyl-1H-benzo[d]imidazole-6-carboximidamide | |
| O | 2-(3-Bromo-4-(4-(6-(N-isopropylcarbamimidoyl)-1H-benzo[d]imidazol-2-yl)phenoxy)phenyl)-N-isopropyl-1H-benzo[d]imidazole-6-carboximidamide | |
| P | 2,2'-(Oxybis(3-chloro-4,1-phenylene))bis(N-isopropyl-1H-benzo[d]imidazole-6-carboximidamide) | |

TABLE 2-continued

Compound I-Compound R

| Formula | Name | Structure |
|---|---|---|
| Q | 2-(2-Bromo-4-(2-fluoro-4-(6-(N-isopropylcarbamimidoyl)-1H-benzo[d]imidazol-2-yl)phenoxy)phenyl)-N-isopropyl-1H-benzo[d]imidazole-6-carboximidamide | |
| R | 2-(2-Bromo-4-(2-bromo-4-(6-(N-isopropylcarbamimidoyl)-1H-benzo[d]imidazol-2-yl)phenoxy)phenyl)-N-isopropyl-1H-benzo[d]imidazole-6-carboximidamide | |

In some alternate embodiments, the compound is selected from Compound U-Compound AF in Table 3 below:

TABLE 3

Compound U-Compound AF

| Formula | Name | Structure |
|---|---|---|
| U | 2-(3-Cyano-4-(4-(6-(N-isopropylcarbamimidoyl)-1H-benzo[d]imidazol-2-yl)-2-methoxyphenoxy)phenyl)-N-isopropyl-1H-benzo[d]imidazole-6-carboximidamide | |

TABLE 3-continued

Compound U-Compound AF

| Formula | Name | Structure |
|---|---|---|
| V | 2-(3-Cyano-4-(4-(6-(N-isopropylcarbamimidoyl)-1H-benzo[d]imidazol-2-yl)phenoxy)phenyl)-N-isopropyl-1H-benzo[d]imidazole-6-carboximidamide | |
| W | 2-(3,5-Difluoro-4-(4-(6-(N-isopropylcarbamimidoyl)-1H-benzo[d]imidazol-2-yl)phenoxy)phenyl)-N-isopropyl-1H-benzo[d]imidazole-6-carboximidamide | |
| X | 2-(3-Cyano-4-(2-fluoro-4-(6-(N-isopropylcarbamimidoyl)-1H-benzo[d]imidazol-2-yl)phenoxy)phenyl)-N-isopropyl-1H-benzo[d]imidazole-6-carboximidamide | |
| Y | 2-(3-Cyano-4-(3-fluoro-4-(6-(N-isopropylcarbamimidoyl)-1H-benzo[d]imidazol-2-yl)phenoxy)phenyl)-N-isopropyl-1H-benzo[d]imidazole-6-carboximidamide | |

TABLE 3-continued

Compound U-Compound AF

| Formula | Name | Structure |
|---|---|---|
| Z | 2-(3-Cyano-4-(4-(6-(N-isopropylcarbamimidoyl)-1H-benzo[d]imidazol-2-yl)-3-methoxyphenoxy)phenyl)-N-isopropyl-1H-benzo[d]imidazole-6-carboximidamide | |
| AA | 2-(2-Chloro-4-(2-cyano-4-(6-(N-isopropylcarbamimidoyl)-1H-benzo[d]imidazol-2-yl)phenoxy)phenyl)-N-isopropyl-1H-benzo[d]imidazole-6-carboximidamide | |
| AB | 2-(3,5-Difluoro-4-(4-(6-(N-isopropylcarbamimidoyl)-1H-benzo[d]imidazol-2-yl)-2-methoxyphenoxy)phenyl)-N-isopropyl-1H-benzo[d]imidazole-6-carboximidamide | |
| AC | 2-(3,5-Difluoro-4-(2-fluoro-4-(6-(N-isopropylcarbamimidoyl)-1H-benzo[d]imidazol-2-yl)phenoxy)phenyl)-N-isopropyl-1H-benzo[d]imidazole-6-carboximidamide | |

TABLE 3-continued

Compound U-Compound AF

| Formula | Name | Structure |
|---|---|---|
| AD | 2-(2-Chloro-4-(2-chloro-4-(6-(N-isopropylcarbamimidoyl)-1H-benzo[d]imidazol-2-yl)phenoxy)phenyl)-N-isopropyl-1H-benzo[d]imidazole-6-carboximidamide | |
| AE | 2-(3-Iodo-4-(4-(6-(N-isopropylcarbamimidoyl)-1H-benzo[d]imidazol-2-yl)phenoxy)phenyl)-N-isopropyl-1H-benzo[d]imidazole-6-carboximidamide | |
| AF | 2-(3-Bromo-4-(3-fluoro-4-(6-(N-isopropylcarbamimidoyl)-1H-benzo[d]imidazol-2-yl)phenoxy)phenyl)-N-isopropyl-1H-benzo[d]imidazole-6-carboximidamide | |

In some alternate embodiments, the compound is selected from Compound AK-Compound AR in Table 4 below:

TABLE 4

Compound AK-Compound AR

| Formula | Name | Structure |
| --- | --- | --- |
| AK | 4-(6-carbamimidoyl-1H,3'H-[2,5'-bibenzo[d]imidazol]-2'-yl)-N-(2-(dimethylamino)ethyl)benzamide | |
| AL | (2'-phenyl-1H,3'H-[2,5'-bibenzo[d]imidazol]-6-yl)(1,4,5,6-tetrahydropyrimidin-2-yl)methanimine | |
| AM | 2-methoxy-5-(6-(4,5,6,7-tetrahydro-1H-1,3-diazepin-2-yl)-1H,3'H-[2,5'-bibenzo[d]imidazol]-2'-yl)phenol | |
| AN | 5-(6-(imino(1,4,5,6-tetrahydropyrimidin-2-yl)methyl)-1H,3'H-[2,5'-bibenzo[d]imidazol]-2'-yl)-2-methoxyphenol | |
| AO | 3-(6-(4,5,6,7-tetrahydro-1H-1,3-diazepin-2-yl)-1H,3'H-[2,5'-bibenzo[d]imidazol]-2'-yl)phenol | |
| AP | 4-(6-carbamimidoyl-1H,3'H-[2,5'-bibenzo[d]imidazol]-2'-yl)benzamide | |

TABLE 4-continued

Compound AK-Compound AR

| Formula | Name | Structure |
|---|---|---|
| AQ | 2'-(3-(2-(dimethylamino)ethoxy)phenyl)-1H,3'H-[2,5-bibenzo[d]imidazole]-6-carboximidamide | |
| AR | 5-(6-(5,5-dimethyl-1,4,5,6-tetrahydropyrimidin-2-yl)-1H,3'H-[2,5'-bibenzo[d]imidazol]-2'-yl)-2-methoxyphenol | |

Pharmaceutical Compositions

The compounds of the present invention described herein can be administered to a host in need thereof as the neat chemical, but are more typically administered as a pharmaceutical composition that includes an effective amount for a host, typically a human, in need of such treatment of an active compound as described herein or its pharmaceutically acceptable salt thereof. Thus, in one embodiment, the disclosure provides pharmaceutical compositions comprising an effective amount of a compound or pharmaceutically acceptable salt thereof together with at least one pharmaceutically acceptable carrier for any of the uses described herein. The pharmaceutical composition may contain a compound or salt as the only active agent, or, in an alternative embodiment, the compound and at least one additional active agent.

An effective amount of an active compound as described herein, or the active compound described herein in codismbination or alternation with, or preceded by, concomitant with or followed by another active agent, can be used in an amount sufficient to (a) inhibit the progression of an *Acanthamoeba* infection; (b) cause a regression of an *Acanthamoeba* infection; (c) cause a cure of an *Acanthamoeba* infection; or (d) inhibit or prevent the development of an *Acanthamoeba* infection.

In an alternative embodiment, an effective amount of an active compound as described herein, or the active compound described herein in combination or alternation with, or preceded by, concomitant with or followed by another active agent, can be used in an amount sufficient to (a) inhibit the progression of an infection caused by *B. mandrillaris*; (b) cause a regression of an infection caused by *B. mandrillaris*; (c) cause a cure of an infection caused by *B. mandrillaris*; or (d) inhibit or prevent the development of an infection caused by *B. mandrillaris*.

The exact amount of the active compound or pharmaceutical composition described herein to be delivered to the host, typically a human, in need thereof will be determined by the health care provider to achieve the desired clinical benefit.

In certain embodiments the pharmaceutical composition is in a dosage form that contains from about 0.1 mg to about 2000 mg, from about 10 mg to about 1000 mg, from about 100 mg to about 800 mg, or from about 200 mg to about 600 mg of the active compound and optionally from about 0.1 mg to about 2000 mg, from about 10 mg to about 1000 mg, from about 100 mg to about 800 mg, or from about 200 mg to about 600 mg of an additional active agent in a unit dosage form. Examples are dosage forms with at least about 0.1, 0.2, 0.25, 0.5, 1, 1.5, 2, 2.5, 3, 3.5, 4, 4.5, 5, 10, 15, 20, 25, 50, 75, 100, 150, 200, 250, 300, 350, 400, 450, 500, 550, 600, 650, 700, 750, 800, 900, 1000, 1100, 1200, 1250, 1300, 1400, 1500, or 1600 mg of active compound or its salt. In one embodiment, the dosage form has at least about 1 mg, 5 mg, 10 mg, 25 mg, 50 mg, 75 mg, 100 mg, 200 mg, 400 mg, 500 mg, 600 mg, 1000 mg, 1200 mg, or 1600 mg of active compound or its salt.

The amount of active compound in the dosage form is calculated without reference to the salt. The dosage form can be administered, for example, once a day (q.d.), twice a day (b.i.d.), three times a day (t.i.d.), four times a day (q.i.d.), once every other day (Q2d), once every third day (Q3d), as needed, or any dosage schedule that provides treatment of a disorder described herein.

The pharmaceutical composition may for example include any molar ratio of the active compound and an additional active agent that achieves the desired result.

Compounds or their pharmaceutically acceptable salts as disclosed or used herein can be delivered by any method known for therapeutic delivery. Methods include but are not limited to: conventional methods (solution, suspension, emulsion, ointment, inserts and gels): vesicular methods (liposomes, niosomes, discomes and pharmacosomes); particulates (microparticles and nanoparticles); advanced materials (scleral plugs, gene delivery, siRNA and stem cells);

and controlled release systems (implants, hydrogels, dendrimers, collagen shields, polymeric solutions, therapeutic contact lenses, cyclodextrins carriers, microneedles and microemulsions).

When used for ocular treatment, the compounds disclosed herein or used as described herein are typically administered, for example, as a solution, suspension, or other formulation via intravitreal, intrastromal, intracameral, sub-tenon, sub-retinal, retro-bulbar, peribulbar, suprachorodial, subchorodial, chorodial, conjunctival, subconjunctival, episcleral, periocular, transscleral, retrobulbar, posterior juxtascleral, circumcorneal, or tear duct injections, or through a mucus, mucin, or a mucosal barrier, in an immediate or controlled release fashion or via an ocular device, injection, or topically administered formulation, for example a solution or suspension provided as an eye drop.

The pharmaceutical compositions contemplated here can optionally include a carrier. Carriers must be of sufficiently high purity and sufficiently low toxicity to render them suitable for administration to the patient being treated. The carrier can be inert or it can possess pharmaceutical benefits of its own. The amount of carrier employed in conjunction with the compound is sufficient to provide a practical quantity of material for administration per unit dose of the compound. Representative carriers include solvents, diluents, pH modifying agents, preservatives, antioxidants, suspending agents, wetting agent, viscosity agents, tonicity agents, stabilizing agents, and combinations thereof. In some embodiments, the carrier is an aqueous carrier. Examples of aqueous carries include, but are not limited to, an aqueous solution or suspension, such as saline, plasma, bone marrow aspirate, buffers, such as Hank's Buffered Salt Solution (HBSS), HEPES (4-(2-hydroxyethyl)-1-piperazineethanesulfonic acid), Ringers buffer, ProVisc®, diluted ProVisc®, Provisc® diluted with PBS, Krebs buffer, Dulbecco's PBS, normal PBS, sodium hyaluronate solution (HA, 5 mg/mL in PBS), simulated body fluids including simulated tears, plasma platelet concentrate and tissue culture medium or an aqueous solution or suspension comprising an organic solvent. Pharmaceutical formulations for ocular administration are preferably in the form of a sterile aqueous solution. Acceptable solutions include, for example, water, Ringer's solution, phosphate buffered saline (PBS), and isotonic sodium chloride solutions. The formulation may also be a sterile solution, suspension, or emulsion in a non-toxic diluent or solvent such as 1,3-butanediol.

In some instances, the composition is distributed or packaged in a liquid form. Alternatively, formulations for ocular administration can be packaged as a solid, obtained, for example by lyophilization of a suitable liquid formulation. The solid can be reconstituted with an appropriate carrier or diluent prior to administration.

Viscosity agents may be added to the pharmaceutical composition to increase the viscosity of the composition as desired. Examples of useful viscosity agents include, but are not limited to, hyaluronic acid, sodium hyaluronate, carbomers, polyacrylic acid, cellulosic derivatives, polycarbophil, polyvinylpyrrolidone, gelatin, dextin, polysaccharides, polyacrylamide, polyvinyl alcohol (including partially hydrolyzed polyvinyl acetate), polyvinyl acetate, derivatives thereof and mixtures thereof.

Solutions, suspensions, or emulsions for administration may be buffered with an effective amount of buffer necessary to maintain a pH suitable for the selected administration. Suitable buffers are well known by those skilled in the art. Some examples of useful buffers are acetate, borate, carbonate, citrate, and phosphate buffers.

Solutions, suspensions, or emulsions for topical, for example, ocular administration may also contain one or more tonicity agents to adjust the isotonic range of the formulation. Suitable tonicity agents are well known in the art. Some examples include glycerin, mannitol, sorbitol, sodium chloride, and other electrolytes.

Acanthamoeba Infections

Members of the *Acanthamoeba* genus are organized into 20 groups (T1-T20) based upon their 18S rDNA sequence, with most disease-causing *Acanthamoeba* strains, but not necessarily all, belonging to type T4. Details about the phylogenetic organization of the *Acanthamoeba* genus are provided in Fuerst, P. A. et al. The Journal of Eukaryotic Microbiology, 2015, 62:69-84, incorporated herein by reference in its entirety. Non-limiting examples of *Acanthamoeba* species that may be treated using the compounds of the present invention either alone or in combination with another therapeutic agent include *A. astronyxis, A. byersi, A. castellanii, A. comandoni, A. culbertsoni, A. divionensis, A. griffini, A. hatchetti, A. healyi, A. jacobsi, A. lenticulata, A. lugdunensis, A. mauritaniensis, A. palestinensis, A. paradivionensis, A. pearcei, A. polyphaga, A. pustulosa, A. quina, A. rhysodes, A. royreba, A. stevensoni, A. terricola* (renamed *A. castallani* Poussard), *A. triangularis,* and *A. tubiashi.*

Representative examples of *Acanthamoeba* subtypes identified by their 18S rDNA sequence that may be treated using compounds of the present invention either alone or in combination with another therapeutic agent include T4A-Liu-E1 (AF019055), T4A-AC30 *castellanii* (U07413), T4B-Diamond *culbertsoni* (AF019057), T4B-Ma *castellanii* (U07414), t4A-RAWDON (U07416), T4-Neff (U07416), T4F-tri5024 *triangularis* (AF346662), T4C-Fernandez (U07409), T4E02AX1 *hatchetti* (AF019060), T4E-Page-23 *polyphaga* (AF019061), T4D-PAT06 (EF429131), T4D-Singh *rhysodes* (AY351644), T4F-Amaur1652 *mauritaniensis* (AY351647), T3-S-7 *griffini* (U07412), T3-205-15 *pearcei* (AF019053), T11-BH-2 *hatchetti* (AF019068), T11-RB-F-1 stevensoni (AF019069), T5-Jc-1 *lenticulata* (U94739), T5-72/2 *lenticulata* (U94732), T1-V006 *castellani* (U07400), T20-OSU 04-020 (DQ451161), T12-V013 *healyi* (AF019070), T12-Asp 38.1 (EU686716), T10-A-1 *culbertsoni* (AF019067), T10-Ac P4 (GU808320), T14-PN13 (AF333609), T14-PN15 (AF333607), T2-GE3a *pustulosa* (AF019050), T2-Reich *palestinensis* (U07411), T6-11DS *hatchetti* (AF251939), T6-2802 *palestinensis* (AF019063), T26b-E 5C (AB425955), T26b-OB3b 3A (AB425945), T26c-OX-1 *polyphaga* (AF019051), T26c-WR (HM159368), T26a-SE2 6F (AB425949), T26a-ATCC-30872 *polyphaga* (AY026244), T13a-UWC9 (AF132134), T13-UWET39 (AF132136), T16-U/HC1 (AY026245), T16-cvX (GQ380408), T99 EF023745 Amb 18S 1183 (EF023745), T99 EF023774 Amb 18S 1215 (EF023774), T8-*tubiashi* (AF019065), T7-*astronyxis* (AF019064), T7-EFW5 (DQ992178), T18-CDC:V621 (KC822461), T17-Ac E1a (GU808277), and T9-*comandoni* (AF019066).

In one embodiment, an effective amount of a compound of Formula 1, Formula 2, Formula 3, Formula 4, or Formula 7 or its salt and/or composition as described herein is used to treat or prevent an infection that is caused one or more *Acanthamoeba* species selected from the group consisting of *A. astronyxis, A. byersi, A. castellanii, A. comandoni, A. culbertsoni, A. divionensis, A. grifini, A. hatchetti, A. healyi, A. jacobsi, A. lenticulata, A. lugdunensis, A. mauritaniensis, A. palestinensis, A. paradivionensis, A. pearcei, A. polyphaga, A. pustulosa, A. quina, A. rhysodes, A. royreba, A. stevensoni, A. terricola* (renamed *A. castallani* Poussard), *A. triangularis,* and *A. tubiashi.*

In one embodiment, the infection is a medical disorder of the eye. In one embodiment, the infection is a central nervous system infection, such as a brain infection. In one embodiment, the infection is a cutaneous infection. In some embodiments, the one or more *Acanthamoeba* species is a cyst, a trophozoite, or both.

The eye disorder, for example *Acanthamoeba keratitis*, as treated herein is caused by one or more *Acanthamoeba* species. In one embodiment, an effective amount of a compound of Formula 1, Formula 2, Formula 3, Formula 4, or Formula 7 or its salt and/or composition thereof as described herein is used to treat or prevent a medical disorder of the eye, for example an infection that is caused by one or more *Acanthamoeba* species, for example the eye disorder *Acanthamoeba keratitis*.

In some embodiments, a method for the treatment of an eye infection caused by one or more *Acanthamoeba* species in a host is provided comprising administering an effective amount of a compound selected from Compound A through Compound AF, Compound AH through Compound AR, and Compound AW through Compound AX or a pharmaceutically acceptable salt and/or composition thereof.

In an alternative embodiment, a method for the treatment of a cutaneous infection caused by one or more pathogenic *Acanthamoeba* species is provided comprising administering an effective amount of a compound of Formula 1, Formula 2, Formula 3, Formula 4, or Formula 7 or its salt and/or composition thereof or a compound selected from Compound A through Compound AF, Compound AH through Compound AR, and Compound AW through Compound AX or a pharmaceutically acceptable salt and/or composition thereof.

In an alternative embodiment, a method for the treatment of a central nervous system infection, such as a brain infection, caused by one or more pathogenic *Acanthamoeba* species is provided comprising administering an effective amount of a compound of Formula 1, Formula 2, Formula 3, Formula 4, or Formula 7 or its salt and/or composition thereof or a compound selected from Compound A through Compound AF, Compound AH through Compound AR, and Compound AW through Compound AX or a pharmaceutically acceptable salt and/or composition thereof.

In an alternative embodiment, a method for the treatment of granulomatous amoebic encephalitis (GAE) caused by one or more pathogenic *Acanthamoeba* species is provided comprising administering an effective amount of a compound of Formula 1, Formula 2, Formula 3, Formula 4, or Formula 7 or its salt and/or composition thereof or a compound selected from Compound A through Compound AF, Compound AH through Compound AR, and Compound AW through Compound AX or a pharmaceutically acceptable salt and/or composition thereof.

The compounds of the present invention are diamidine-containing compounds. The infections of the brain described here can cause swelling and other pathologies and/or structural damage to tissues that can result in the breakdown of the blood brain barrier, allowing access to the selected active compounds described herein. Further, the compounds can be administered via intrathecal injection directly into the brain. Therefore, the compounds of the present invention can be administered systemically or directly to the brain or central nervous system generally to the effectuate treatment.

Disinfecting Solutions

In one aspect, the invention provides a disinfecting solution comprising a compound of Formula 1, Formula 2, Formula 3, Formula 4, Formula 5, Formula 6, or Formula 7, or a pharmaceutically acceptable salt thereof, in a suitable aqueous carrier.

In alternate embodiments, the invention provides a disinfecting solution comprising a compound selected from Compound A through Compound BH or a pharmaceutically acceptable salt thereof, in a suitable aqueous carrier.

The disinfecting solution can be used to decrease or eliminate the presence of one or more *Acanthamoeba* species from objects to which it is applied.

In another aspect, the disinfecting solution may further comprise a second disinfectant that may be used to either synergistically decrease or eliminate the presence of one or more *Acanthamoeba* species or alternatively to have decrease or eliminate the presence of another infectious agent such as a bacterium or a fungus.

In one embodiment, the disinfecting solution further comprises one or more additional disinfectants. Representative examples of additional disinfectants that may be used in the present invention include polyhexamethylene biguanidine hydrogen chloride (PHMB), alexidine dihydrochloride, polyaminopropylbiguanide ("Dymed"), polyhexanide hydrochloride, myristamidopropyl dimethylamine (MAPD or "Aldox"), polyquaternium-1 (PQ-1 or "Polyquad"), and combinations thereof.

In one embodiment, the disinfecting solution may be a contact lens care solution. The contact lens care solution may be formulated solely to disinfect the contact lens or may further be formulated to clean or condition the lens as desired, i.e. formulated as a multi-purpose contact lens solution. The multi-purpose contact lens solution may further comprise additional agents as described herein for the purpose of cleaning and conditioning the contact lens as desired. Additional agents may also be added to aid in the suitability of the contact lens care solution for the eye. In some embodiments, the contact lens solution may comprise one or more additional disinfectants as described herein.

In some embodiments, the contact lens care solution further comprises a surfactant. Surfactants are typically present in contact lens solutions in an amount effective in cleaning, i.e. in an amount at least to facilitate removing, and preferably effective to remove debris and deposit material from a contact lens when contact with the contact lens care solution. Non-limiting examples of surfactants for use in the contact lens care solution described herein include polysorbates, for example polysorbate 20 (Tween 20), 4-(1,1,3,3-tetramethylbutyl)phenol/polyoxyethylene polymers (for example tyloxapol), polyoxyethylene/polyoxypropylene block copolymers (pluronics), glycolic esters of fatty acids, or combinations thereof. Additional examples of suitable surfactants include the poloxamers such as poloxamer 108, poloxamer 188, poloxamer 237, poloxamer 238, poloxamer 288, and poloxamer 237.

In some embodiments, the contact lens care solution further comprises a comfort/conditioning agent. In some embodiments, the comfort/conditioning agent is a viscosity enhancing agent. Viscosity enhancing agents are typically added to enhance or prolong the cleaning and wetting activity of other additives such as surfactants, to condition the lens surface to make it more hydrophilic, and to act as a demulcent on the eye. Increasing the solution viscosity of the contact lens care solution may lead to formation of a film on the contact lens that would facilitate comfortable wear, cushioning the lens during insertion and alleviating any eye irritation. Non-limiting examples of viscosity enhancing agents that may be used include: water-soluble natural gums such as guar gum, gum tragacanth, and the like; cellulose derived polymers such as hydroxypropylcellulose, hydoxymethylcellulose, carboxymethylcellulose, methylcellulose, hydroxyethylcellulose, and the like; and polyvinyl alcohol. In some embodiments, the comfort/conditioning agent is a wetting agent. Wetting agents decrease the wetting angle of the lens material. Typical examples of wetting agents are surfactants such as tetronics.

In some embodiments, the comfort/conditioning agent is a lubricant. Lubricants are typically added to contact lens care solutions to attract moisture to the surface of the lens. Non-limiting examples of lubricants include hydoxypropyl methylcellulose, hyaluronic acid, carboxymethylcellulose, hydroxypropyl guar, tetronics, dexpanthenol, sorbitol, and poloxamines.

In some embodiments, the contact lens solution further comprises a chelating agent. Chelating agents are typically added to contact lens care solutions to enhance the effectiveness of the antimicrobial component and to complex with metal ions that may hinder cleaning or adhere to the lens. Non-limiting examples of chelating agents that may be used include nitrilotriacetic acid, diethyletriaminepentacetic acid, hydroxyethylenediamine tetraacetic acid, 1,2-diaminocyclohexane tetraacetic acid, hydroxyethylaminodiacetic acid, ethylenediamine tetraacetic acid and its salts, polyphosphates, citric acid and its salts, tartaric acid and its salts, and mixtures thereof. Ethylenediamine tetraacetic acid (EDTA) and its alkali metal salts, such as the disodium salt of EDTA (disodium edetate), are typically preferred.

In some embodiments, the contact lens solution further comprises a buffer. Suitable buffers include, but are not limited to, borate, phosphate, nitrate, bicarbonate, and citrate buffers, or combinations thereof.

In some embodiments, the contact lens solution further comprises a tonicity agent. Typical tonicity agents include sodium chloride, potassium chloride, or combinations thereof. The amount of tonicity agent included is effective to provide the desired degree of tonicity to the solution, for example from about 0.4% to about 1.5% (w/v) of the solution. If a combination of sodium chloride and potassium chloride is used, it is preferred that they are used in a weight ratio of sodium chloride from about 3:1 to about 8:1.

In another aspect, a method for disinfecting objects of one or more *Acanthamoeba* species is provided comprising applying to the objects an effective amount of a disinfecting solution formulated with a compound as described herein.

In some embodiments, a method for disinfecting contact lenses of one or more *Acanthamoeba* species is provided comprising applying to the contact lenses an effective amount of a contact lens care solution formulated with a compound as described herein.

In some embodiments, a method for disinfecting objects of one or more *Acanthamoeba* species is provided comprising applying to the objects an effective amount of a disinfecting solution formulated with a compound of Formula 1, Formula 2, Formula 3, Formula 4, Formula 5, Formula 6, Formula 7, or a pharmaceutically acceptable salt thereof.

In some embodiments, a method for disinfecting objects of one or more *Acanthamoeba* species is provided comprising applying to the objects an effective amount of a disinfecting solution formulated with a compound selected from Compound A through Compound BH or a pharmaceutically acceptable salt thereof.

In some embodiments, a method for disinfecting contact lenses of one or more *Acanthamoeba* species is provided comprising applying to the contact lenses an effective amount of a contact lens care solution formulated with a compound of Formula 1, Formula 2, Formula 3, Formula 4, Formula 5, Formula 6, Formula 7, or a pharmaceutically acceptable salt thereof.

In some embodiments, a method for disinfecting contact lenses of one or more *Acanthamoeba* species is provided comprising applying to the contact lenses an effective amount of a contact lens care solution formulated with a compound selected from Compound A through Compound BH, or a pharmaceutically acceptable salt thereof Administration of the compounds and compositions of the present invention for the treatment of an infection caused by one or more *Acanthamoeba* species may range from continuous (intravenous drip) to several oral or intranasal administrations per day (for example, Q.I.D.). In an alternative embodiment, the route of administration includes oral, topical, parenteral, intramuscular, intravenous, sub cutaneous, transdermal (which may include a penetration enhancement agent), buccal, nasogastric, intrathecal, and suppository administration, among other routes of administration. Enteric coated oral tablets may also be used to enhance bioavailability of the compounds for an oral route of administration. The most effective dosage form will depend upon the bioavailability/pharmacokinetics of the particular agent chosen as well as the severity of disease in the patient. Intravenous dosage forms are particularly preferred. In one embodiment, the compounds or compositions of the present invention are administered at least once a day, at least twice a day, at least three times a day, at least four times a day, at least five times a day, or more.

In one embodiment, for the combination of a compound described herein and a therapeutic agent, the host is a human.

*Balamuthia mandrillaris* Infections

In some embodiments, an effective amount of an active compound or its salt and/or composition thereof as described herein is used to treat an infection caused by *Balamuthia mandrillaris*. In one embodiment, the infection is a central nervous system infection, such as a brain infection. In one embodiment, the infection is a cutaneous infection. In some embodiments, the *Balamuthia mandrillaris* is a cyst, a trophozoite, or both.

In one embodiment, an effective amount of an active compound or its salt and/or composition as described herein is used to treat granulomatous amoebic encephalitis (GAE) caused by *Balamuthia mandrillaris* in a host in need thereof, typically a human.

In one embodiment, a method for the treatment of an infection, including a central nervous system infection or a skin infection, caused by *Balamuthia mandrillaris* in a host is provided comprising administering an effective amount of a compound of Formula 1, Formula 2, Formula 3, Formula 4, Formula 5, Formula 6, or Formula 7, or a pharmaceutically acceptable salt and/or composition thereof.

In one embodiment, a method for the treatment of granulomatous amoebic encephalitis (GAE) caused by *Balamuthia mandrillaris* in a host is provided comprising administering an effective amount of a compound of Formula 1, Formula 2, Formula 3, Formula 4, Formula 5, Formula 6, or Formula 7, or a pharmaceutically acceptable salt and/or composition thereof.

In one embodiment, a method for the treatment of an infection, including a central nervous system infection or a skin infection, caused by *Balamuthia mandrillaris* in a host is provided comprising administering an effective amount of Compound A through Compound BH, or a pharmaceutically acceptable salt and/or composition thereof.

In one embodiment, a method for the treatment of granulomatous amoebic encephalitis (GAE) caused by *Balamuthia mandrillaris* in a host is provided comprising administering an effective amount of a compound selected from Formula 1, Formula 2, Formula 3, Formula 4, Formula 5, Formula 6, or Formula 7, or a pharmaceutically acceptable salt and/or composition thereof.

In one embodiment, a method for the treatment of an infection caused by *Balamuthia mandrillaris* in a host is provided comprising administering to the host an effective amount of a compound selected from Compound A through Compound BH or a pharmaceutically acceptable salt and/or composition in combination with an additional therapeutic agent.

In one embodiment, compounds disclosed herein or used as described herein for the treatment of granulomatous amoebic encephalitis (GAE) may be administered orally, intravenously, topically, parenterally, by inhalation or spray, sublingually, via implant, including ocular implant, transdermally, via buccal administration, rectally, as an ophthalmic solution, injection, including ocular injection, intravenous, intrathecal, nasogastrically, intra-aortal, intracranial, subdermal, intraperitoneal, subcutaneous, transnasal, sublingual, intrathecal, or rectal or by other means, in dosage unit formulations containing conventional pharmaceutically acceptable carriers.

The pharmaceutical composition may be formulated as any pharmaceutically useful form, e.g., as an aerosol, a cream, a gel, a gel cap, a pill, a microparticle, a nanoparticle, an injection or infusion solution, a capsule, a tablet, a syrup, a transdermal patch, a subcutaneous patch, a dry powder, an inhalation formulation, in a medical device, suppository, buccal, or sublingual formulation, parenteral formulation, or an ophthalmic solution or suspension. Some dosage forms, such as tablets and capsules, are subdivided into suitably sized unit doses containing appropriate quantities of the active components, e.g., an effective amount to achieve the desired purpose.

Administration of an active compound for the treatment of granulomatous amoebic encephalitis (GAE) may range from continuous (intravenous drip) to several oral or intranasal administrations per day (for example, Q.I.D.) or transdermal administration and may include oral, topical, parenteral, intramuscular, intravenous, sub-cutaneous, transdermal (which may include a penetration enhancement agent), buccal, nasogastric, and suppository administration, among other routes of administration. Enteric coated oral tablets may also be used to enhance bioavailability of the compounds for an oral route of administration. The most effective dosage form will depend upon the bioavailability/pharmacokinetics of the particular agent chosen as well as the severity of disease in the patient. In one embodiment, the compounds or compositions of the present invention are administered at least once a day, at least twice a day, at least three times a day, at least four times a day, at least five times a day, or more.

To prepare the pharmaceutical compositions according to the present invention, a therapeutically effective amount of one or more of the compounds according to the present invention is often intimately admixed with a pharmaceutically acceptable carrier according to conventional pharmaceutical compounding techniques to produce a dose. A carrier may take a wide variety of forms depending on the form of preparation desired for administration, e.g., oral or parenteral. In preparing pharmaceutical compositions in oral dosage form, any of the usual pharmaceutical media may be used. Thus, for liquid oral preparations such as suspensions, elixirs, and solutions, suitable carriers and additives including water, glycols, oils, alcohols, flavoring agents, preservatives, coloring agents, and the like may be used. For solid oral preparations such as powders, tablets, capsules, and for solid preparations such as suppositories, suitable carriers and additives including starches, sugar carriers, such as dextrose, manifold, lactose, and related carriers, diluents, granulating agents, lubricants, binders, disintegrating agents, and the like may be used. If desired, the tablets or capsules may be enteric-coated or sustained release by standard techniques. The use of these dosage forms may significantly enhance the bioavailability of the compounds in the patient.

For parenteral formulations, the carrier will usually comprise sterile water or aqueous sodium chloride solution, though other ingredients, including those which aid dispersion, also may be included. Of course, where sterile water is to be used and maintained as sterile, the compositions and carriers must also be sterilized. Injectable suspensions may also be prepared, in which case appropriate liquid carriers, suspending agents, and the like may be employed.

Combination Therapy

In some embodiments, a method is provided for the treatment of an infection caused by one or more *Acanthamoeba* species or an infection caused by *Balamuthia mandrillaris* comprising administering a compound described herein, or its pharmaceutically acceptable salt and/or composition, in combination with at least one additional therapeutic agent. Non-limiting examples of additional therapeutic agents include, but are not limited to, alexidine, chlorhexidine, polyhexamethylene biguanide (PHMB), propamidine isethionate, hexamidine isethionate, natamycin, neomycin, ketoconazole, itraconazole, polymyxin B, gramicidin, voriconazole, miconazole nitrate, or combinations thereof. Alternative non-limiting examples of the additional therapeutic agent include pentamidine, octamidine, fluconazole, miltefosine, diminazene acetate, stilbamidine, clotrimazole, artesunate, flucytosine, amphotericin B, azithromycin, and clarithromycin.

In one embodiment, the additional therapeutic is alexidine. Alexidine is a biguanide antiseptic having the chemical structure:

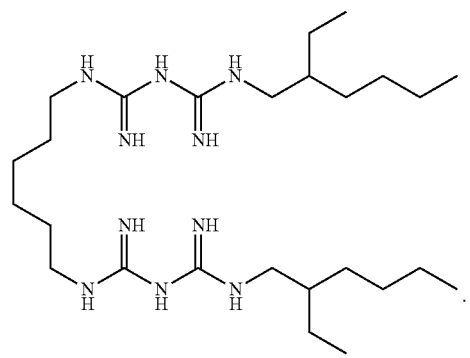 [SMILES: CCCCC(CC)CNC(=N)NC(=N)NCCCCCCNC(=N)NC(=N)NCC(CC)CCCC]

In one embodiment, the additional therapeutic agent is chlorhexidine. Chlorhexidine is a biguanide antiseptic having the chemical structure:

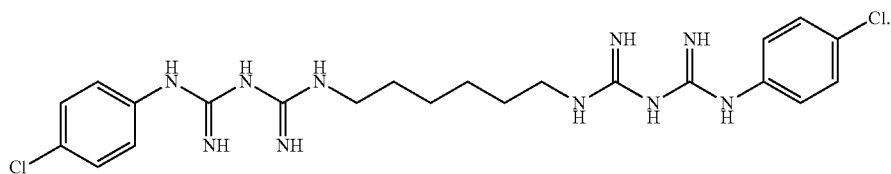 [SMILES: N=C(NCCCCCCNC(=N)NC(=N)Nc1ccc(Cl)cc1)NC(=N)Nc1ccc(Cl)cc1]

In one embodiment, the additional therapeutic agent is polyhexamethylene biguanide (PHMB). PHMB, also referred to as polyhexanide, is a polymeric biguanide antiseptic having the chemical structure:

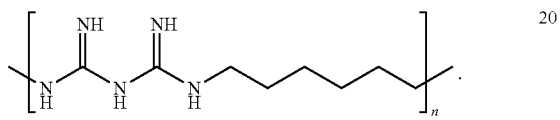

In one embodiment, the additional therapeutic agent is propamidine isethionate (Brolene). Propamidine isethionate is a diamidine antiseptic having the chemical structure:

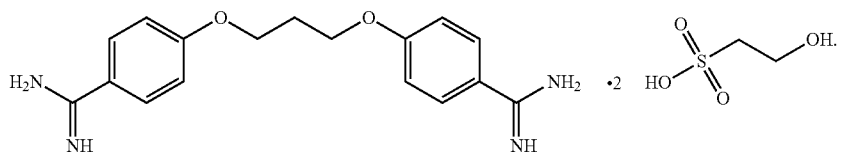 [SMILES: N=C(N)c1ccc(OCCCOc2ccc(C(=N)N)cc2)cc1 ; O=S(=O)(O)CCO]

In one embodiment, the additional therapeutic agent is hexamidine isethionate (Hexomedine or Desmodine). Hexamidine isethionate is a diamidine antiseptic having the chemical structure:

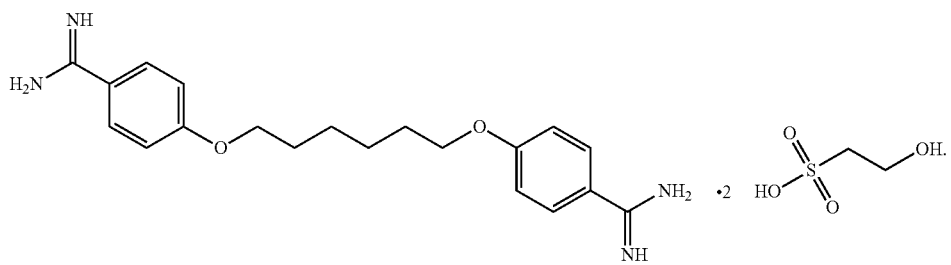 [SMILES: N=C(N)c1ccc(OCCCCCCOc2ccc(C(=N)N)cc2)cc1 ; O=S(=O)(O)CCO]

In one embodiment, the additional therapeutic agent is natamycin (pimaricin). Natamycin is an antifungal macrolide polyene having the chemical structure:

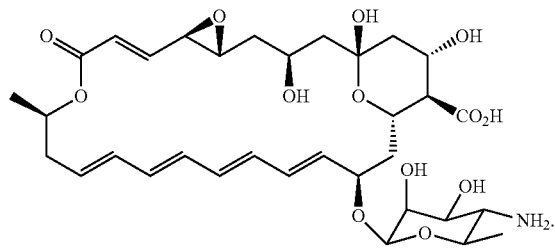 [SMILES: CC1OC(O[C@H]2/C=C/C=C/C=C/C=C/C[C@@H](C)OC(=O)/C=C/[C@H]3O[C@@H]3C[C@H](O)C[C@]3(O)C[C@H](O)[C@@H](C(=O)O)[C@H](C2)O3)C(O)C(O)C1N]

In one embodiment, the additional therapeutic agent is neomycin. Neomycin is an aminoglycoside antibiotic composed of a mixture of neomycin B and neomycin C, each having the chemical structure:

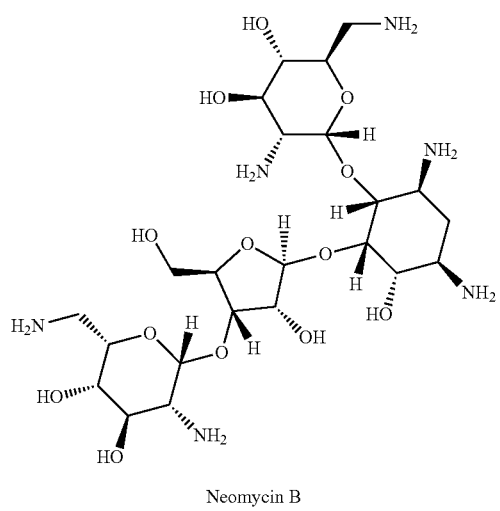

Neomycin B

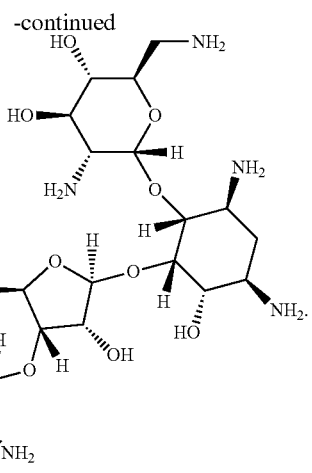

Neomycin C

In one embodiment, the additional therapeutic agent is ketoconazole. Ketoconazole is an imidazole antifungal compound having the racemic chemical structure:

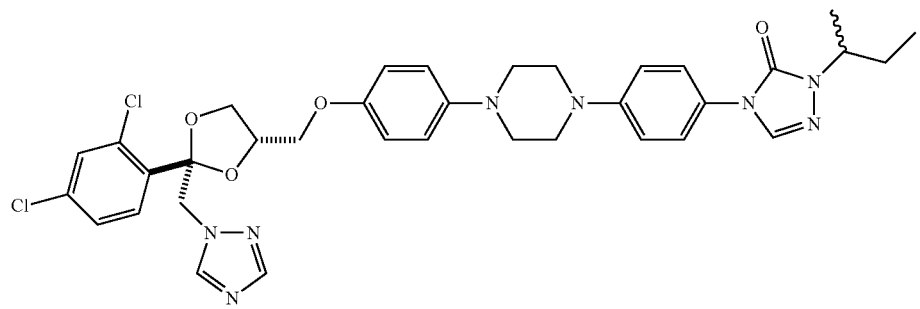

In one embodiment, the additional therapeutic agent is itraconazole. Itraconazole is a triazole antifungal having the racemic chemical structure:

In one embodiment, the additional therapeutic agent is polymyxin B. Polymyxin B is a antibiotic composed of a mixture of related compounds. The two main components polymyxin B1 and polymyxin B2 have the chemical structures:

In one embodiment, the additional therapeutic agent is gramicidin. Gramicidin is a mixture of linear pentadecapeptides used as an antibiotic. Gramicidin is composed of a mixture of gramicidins A, B, and C having the chemical structure:

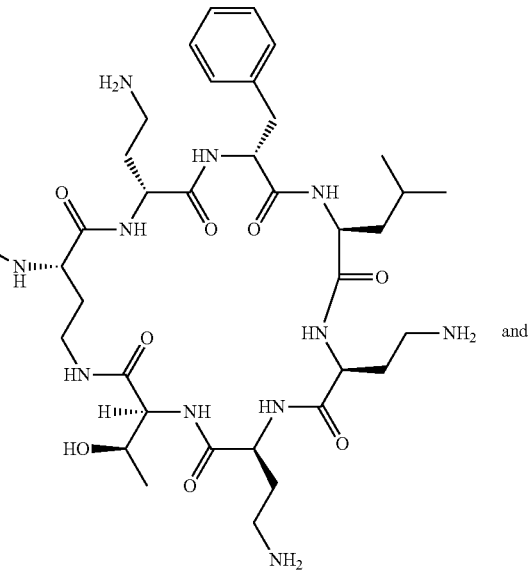

polymyxin B1

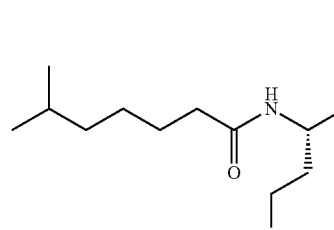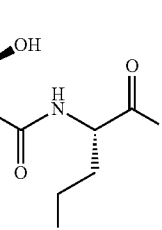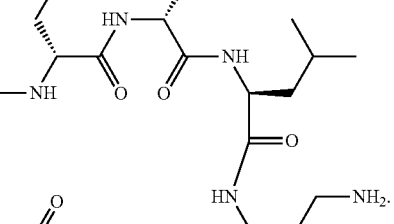

polymyxin B2

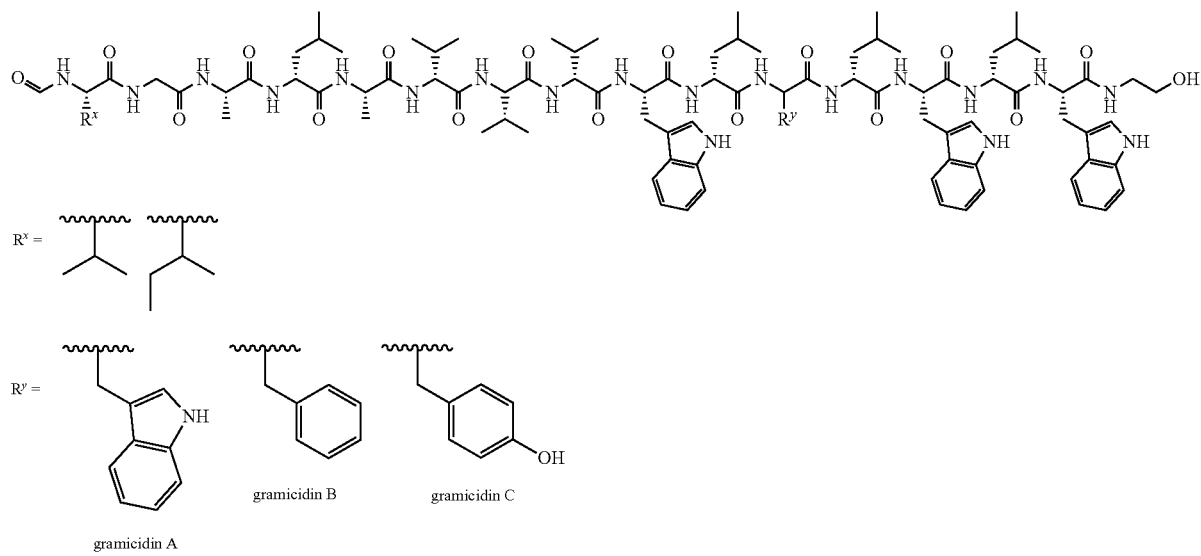

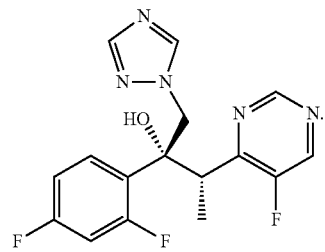 [SMILES: C[C@@H](c1ncncc1F)[C@](O)(Cn1cncn1)c1ccc(F)cc1F]

gramicidin A gramicidin B    gramicidin C

In one embodiment, the additional therapeutic agent is voriconazole. Voriconazole is a triazole antifungal compound having the structure:

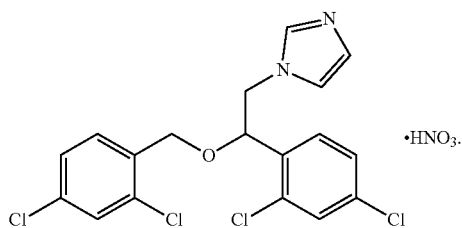 [SMILES: Clc1ccc(COC(Cn2ccnc2)c2ccc(Cl)cc2Cl)c(Cl)c1]

In one embodiment, the additional therapeutic agent is miconazole nitrate. Miconazole nitrate is an imidazole antifungal compound having the chemical structure:

In an alternative embodiment, the additional therapeutic agent is pentamidine or a pharmaceutically acceptable salt thereof. Pentamidine is an antiprotozoal agent having the chemical structure:

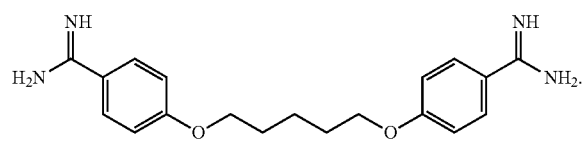 [SMILES: N=C(N)c1ccc(OCCCCCOc2ccc(C(=N)N)cc2)cc1]

In an alternative embodiment, the additional therapeutic agent is octamidine or a pharmaceutically acceptable salt thereof. Octamidine has the chemical structure:

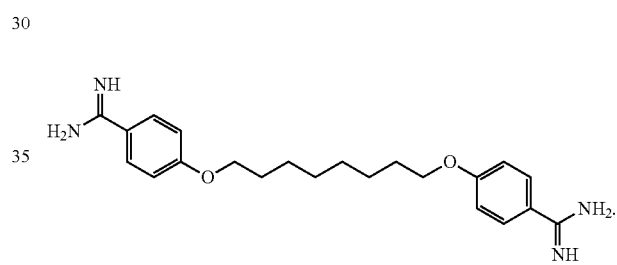

In an alternative embodiment, the additional therapeutic agent is fluconazole or a pharmaceutically acceptable salt thereof. Fluconazole is an antifungal agent having the chemical structure:

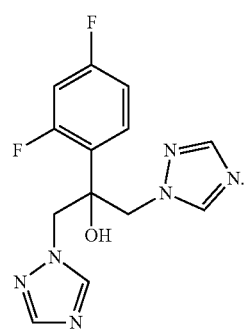 [SMILES: OC(Cn1cncn1)(Cn1cncn1)c1ccc(F)cc1F]

In an alternative embodiment, the additional therapeutic agent is miltefosine or a pharmaceutically acceptable salt thereof. Miltefosine is an antimicrobial agent having the chemical structure:

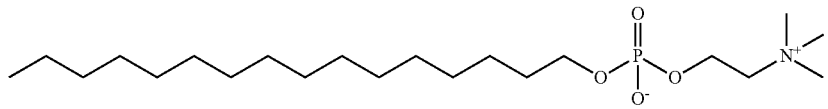

In some embodiments, a method for the treatment of an infection caused by one or more *Acanthamoeba* species in a host in need thereof is provided comprising administering to the host an effective amount of a compound of Formula 1, Formula 2, Formula 3, Formula 4, or Formula 7, or its pharmaceutically acceptable salt and/or composition in combination with at least one additional therapeutic agent. In one embodiment the infection is a disorder of the eye. In one embodiment, the infection is a central nervous system infection, such as a brain infection. In one embodiment, the infection is a cutaneous infection. In one embodiment, the infection is granulomatous amoebic encephalitis (GAE).

In some embodiments, a method for the treatment of *Acanthamoeba* keratitis in a host in need thereof is provided comprising administering to the host an effective amount of a compound of Formula 1, Formula 2, Formula 3, Formula 4, or Formula 7, or its pharmaceutically acceptable salt and/or composition in combination with at least one additional therapeutic agent.

In other embodiments, a method for the treatment of an eye infection caused by one or more *Acanthamoeba* species in a host is provided comprising administering an effective amount of a compound of Formula 1, Formula 2, Formula 3, Formula 4, or Formula 7, its pharmaceutically acceptable salt and/or composition in combination with at least one additional therapeutic agent.

In some embodiments, a method for the treatment of *Acanthamoeba keratitis* in a host is provided comprising administering to the host an effective amount of a compound selected from Compound A through Compound AF, Compound AH through Compound AR, and Compound AW through Compound AX or a pharmaceutically acceptable salt and/or composition in combination with at least one additional therapeutic agent.

In other embodiments, a method for the treatment of an eye infection caused by one or more *Acanthamoeba* species in a host is provided comprising administering an effective amount a compound selected from Compound A through Compound AF, Compound AH through Compound AR, and Compound AW through Compound AX or its pharmaceutically acceptable salt and/or composition in combination with at least one additional therapeutic agent.

In some embodiments, a method for the treatment of an infection caused by *Balamuthia mandrillaris* in a host in need thereof is provided comprising administering to the host an effective amount of a compound of Formula 1, Formula 2, Formula 3, Formula 4, Formula 5, Formula 6, or Formula 7, or its pharmaceutically acceptable salt and/or composition in combination with at least one additional therapeutic agent. In one embodiment, the infection is a central nervous system infection, such as a brain infection. In one embodiment, the infection is a cutaneous infection. In one embodiment, the infection is granulomatous amoebic encephalitis (GAE).

In some embodiments, a method for the treatment of an infection caused by *Balamuthia mandrillaris* in a host in need thereof is provided comprising administering to the host an effective amount of a compound selected from Compound A-Compound BH, or its pharmaceutically acceptable salt and/or composition in combination with at least one additional therapeutic agent. In one embodiment, the infection is a central nervous system infection, such as a brain infection. In one embodiment, the infection is a cutaneous infection. In one embodiment, the infection is granulomatous amoebic encephalitis (GAE).

In one embodiment the additional therapeutic agent is selected from alexidine, chlorhexidine, polyhexamethylene biguanide (PHMB), propamidine, hexamidine, natamycin, neomycin, ketoconazole, itraconazole, polymyxin B, gramicidin, voriconazole, and miconazole or a pharmaceutically acceptable salt thereof. In an alternative embodiment, the additional therapeutic agent is selected from pentamidine, octamidine, fluconazole, miltefosine, diminazene acetate, stilbamidine, clotrimazole, artesunate, flucytosine, amphotericin B, azithromycin, and clarithromycin or a pharmaceutically acceptable salt thereof.

In one embodiments, a method for the treatment of granulomatous amoebic encephalitis (GAE) in a host is provided comprising administering to the host an effective amount of a compound described herein or a pharmaceutically acceptable salt and/or composition in combination with an additional therapeutic agent. It may be useful to administer a compound described herein to a host in need thereof in combination with one or more compounds, for example, (1) an antimicrobial medication such as pentamidine isethionate or miltefosine;

(2) an antifungal medication such as amphotericin B, flucytosine, or an azole antifungal (fluconazole, miconazole, ketoconazole, albendazole, clotrimazole, voriconazole, or itraconazole);

(3) an antibiotic such as sulfadiazine, trimethoprim-sulfamethoxazole (TMP-SMX), or a macrolide antibiotic (azithromycin or clarithromycin);

(4) an antibacterial such as diminazene or a pharmaceutically acceptable salt thereof, (5) an antipsychotic such as trifluoperazine or thioridazine;

(6) an antiseptic such as propamidine; or (7) an additional therapeutic selected from artesunate, stilbamidine, hexamidine, or octamidine.

EXPERIMENTAL EXAMPLES OF THE PRESENT INVENTION

A. Synthesis of Compounds of Formulas A-H

The compounds of Formulas A-H of the present invention were synthesized using the general synthetic route provided below:

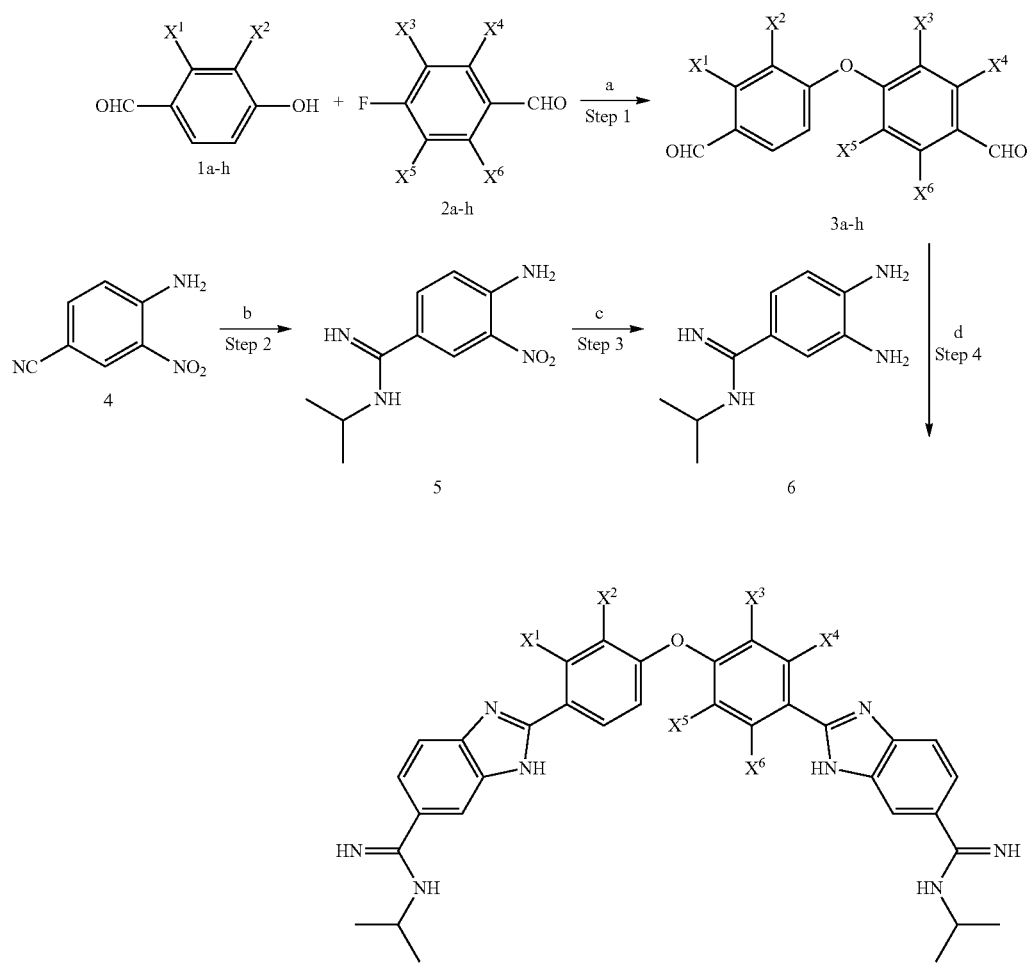

Formula A-H

Reagents and Conditions: a) Cs₂CO₃, DMA; b) i-EtOH/HCl, ii-isopropylamine/EtOH c) Pd(C), MeOH/H₂O, H₂ d) Na₂S₂O₅, EtOH/H₂O.

Step 1. Synthesis of Bis-Aldehyde Intermediates 3a-h by General Procedure 1

Bis-aldehyde intermediates 3a-h were synthesized according to the following general procedure:

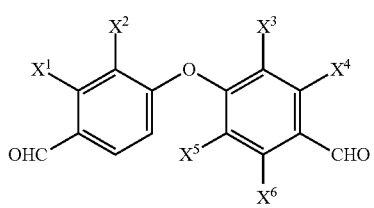

Cesium carbonate (3.25 g, 10 mmol) was added to a solution of the hydroxy benzaldehyde derivatives 1a-h (10 mmol) in dimethylacetamide (10 ml). The reaction mixture was stirred at room temperature under nitrogen for 1 h then the fluoro benzaldehyde derivatives 2a-h were added to the reaction mixture and stirred for 24 h until the starting materials were consumed as indicated by the TLC. If the reaction was incomplete after 24 h, the reaction mixture was heated for an additional 3 h at 80° C. Ice water was added, and the mixture was extracted with ethyl acetate, dried (Na₂SO₄) and evaporated under vacuum. The product was chromatographed on silica gel using hexanes/ethyl acetate as solvent to provide the desired bis-aldehyde products 3a-h.

Example 1. Synthesis of 3,5-Difluoro-4-(4-formyl-3-methoxyphenoxy)benzaldehyde (3a)

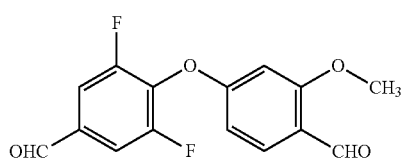 [SMILES: COc1cc(Oc2c(F)cc(C=O)cc2F)ccc1C=O]

Compound 3a was prepared using general procedure 1.

White solid (0.6 g, 20%), mp 132-133° C.; ¹HNMR (DMSO-d₆): δ 10.23 (s, 1H), 10.00 (s, 1H), 7.93 (m, 2H), 7.71 (d, J=8.4 Hz, 1H), 6.99 (d, J=2 Hz, 1H), 6.60 (d, J=8.4 Hz, 1H), 3.91 (s, 3H); ESI-HRMS: m/z calculated for $C_{15}H_{11}F_2O_4$: 293.0620, found: 293.0612 (M⁺+1).

Example 2. Synthesis of 4-(3-Chloro-4-formylphenoxy)-3,5-difluorobenzaldehyde (3b)

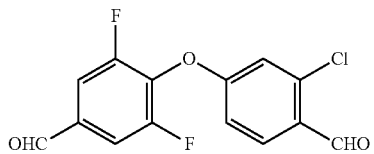 [SMILES: O=Cc1cc(F)c(Oc2ccc(C=O)c(Cl)c2)c(F)c1]

Compound 3b was prepared using general procedure 1.
White solid (1.1 g, 37%), mp 117-118° C.; $^1$HNMR (DMSO-d$_6$): δ 10.24 (s, 1H), 10.00 (s, 1H), 7.93 (m, 3H), 7.43 (s, 1H), 7.22 (d, J=6.8 Hz, 1H); ESI-HRMS: m/z calculated for $C_{14}H_8ClF_2O_3$: 297.0125, found: 297.0112 (M$^+$+1).

Example 3. Synthesis of 3,5-Difluoro-4-(3-fluoro-4-formylphenoxy)benzaldehyde (3c)

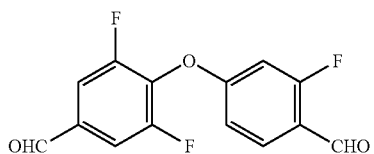

Compound 3c was prepared using general procedure 1.
White solid (1 g, 35%), mp 87-88° C.; $^1$HNMR (DMSO-d$_6$): δ 10.12 (s, 1H), 10.01 (s, 1H), 7.94 (m, 2H), 7.88 (m, 1H), 7.26 (d, J=11.6 Hz, 1H), 7.08 (d, J=8 Hz, 1H); ESI-HRMS: m/z calculated for $C_{14}H_{18}F_3O_3$: 281.0420, found: 281.0409 (M$^+$+1).

Example 4. Synthesis of 4,4'-Oxybis(2-bromobenzaldehyde) (3d)

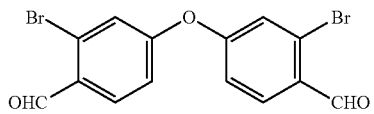 [SMILES: O=Cc1ccc(Oc2ccc(C=O)c(Br)c2)cc1Br]

Compound 3d was prepared using general procedure 1.
White solid (0.6 g, 16%), mp 131-132° C.; $^1$HNMR (DMSO-d$_6$): δ 10.15 (s, 1H), 10.00 (s, 1H), 8.33 (br s, 1H), 8.00 (d, J=8.4 Hz, 1H), 7.91 (d, J=8.4 Hz, 1H), 7.47 (m, 2H), 7.17 (d, J=8.4 Hz, 1H); ESI-HRMS: m/z calculated for $C_{14}H_9Br_2O_3$: 384.8870, found: 384.8879 (M$^+$+1).

Example 5. Synthesis of 2-Bromo-4-(3-fluoro-4-formylphenoxy)benzaldehyde (3e)

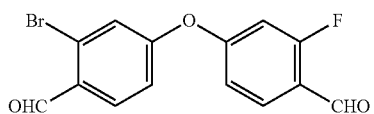 [SMILES: O=Cc1ccc(Oc2ccc(C=O)c(Br)c2)cc1F]

Compound 3e was prepared using general procedure 1.
White solid (0.95 g, 29%), mp 89-90° C.; $^1$HNMR (DMSO-d$_6$): δ 10.17 (s, 1H), 10.16 (s, 1H), 7.92 (m, 2H), 7.59 (d, J=2.4 Hz, 1H), 7.31 (dd, J=2.4, 8.8 Hz, 1H), 7.27 (dd, J=2.4, 7.6 Hz, 1H), 7.12 (dd, J=2, 8.8 Hz, 1H); ESI-HRMS: m/z calculated for $C_{14}H_9BrFO$: 322.9714, found: 322.9705 (M$^+$+1).

Example 6. Synthesis of 4-(2-Bromo-4-formylphenoxy)-2-fluorobenzaldehyde (3f)

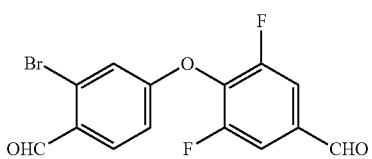 [SMILES: O=Cc1cc(F)c(Oc2ccc(C=O)c(Br)c2)c(F)c1]

Compound 3f was prepared using general procedure 1.
White solid (0.5 g, 15%), mp 124-125° C.; $^1$HNMR (DMSO-d$_6$): δ 10.19 (s, 1H), 10.14 (s, 1H), 7.95 (d, J=8.4 Hz, 2H), 7.67 (d, J=2.4 Hz, 1H), 7.58 (br s, 1H), 7.26 (d, J=7.6 Hz, 1H); ESI-HRMS: m/z calculated for $C_{14}H_8BrF_2O_3$: 340.9619, found: 340.9609 (M$^+$+1).

Example 7. Synthesis of 4-(3-Bromo-4-formylphenoxy)-2,6-difluorobenzaldehyde (3g)

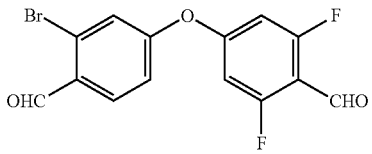 [SMILES: O=Cc1ccc(Oc2cc(F)c(C=O)c(F)c2)cc1Br]

Compound 3g was prepared using general procedure 1.
White solid (0.6 g, 18%), mp 130-131° C.; $^1$HNMR (DMSO-d$_6$): δ 10.19 (s, 1H), 10.14 (s, 1H), 7.95 (d, J=8.4 Hz, 1H), 7.67 (d, J=2.4 Hz, 1H), 7.37 (dd, J=2.4, 8.4 Hz, 1H), 7.12 (m, 2H); ESI-HRMS: m/z calculated for $C_{14}H_8BrF_2O_3$: 340.9619, found: 340.9609 (M$^+$+1).

Example 8. Synthesis of 4-(3-Bromo-4-formylphenoxy)-2,3-difluorobenzaldehyde (3h)

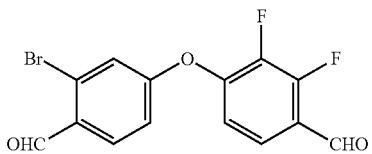 [SMILES: O=Cc1ccc(Oc2ccc(C=O)c(F)c2F)cc1Br]

Compound 3h was prepared using general procedure 1.
White solid (0.02 g, 5%), mp 98-99° C.; $^1$HNMR (DMSO-d$_6$): δ 10.16 (br s, 2H), 7.92 (d, J=8.8 Hz, 1H), 7.75 (m, 1H), 7.63 (d, J=1.6 Hz, 1H), 7.34 (d, J=8.4 Hz, 1H), 7.28 (m, 1H); ESI-HRMS: m/z calculated for $C_{14}H_8BrF_2O_3$: 340.9619, found: 340.9603 (M$^+$+1).

Step 2

Example 9. Synthesis of 4-Amino-N-isopropyl-3-nitrobenzimidamide (5)

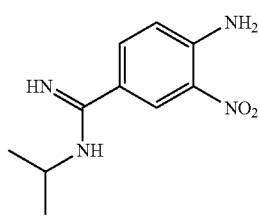

4-amino-3-nitrobenzonitrile (2.44 g, 15 mmol) was suspended in dry ethanol (20 ml) and cooled in an ice bath. HCl gas was bubbled through the reaction for 30 min, and the reaction flask was tightly sealed and stirred at room temperature for 7 days. The yellow precipitate which formed was filtered, washed with dry ethanol and anhydrous ether, and dried under vacuum at room temperature for 3 h. The ethyl 4-amino-3-nitrobenzimidate hydrochloride intermediate (3 g, 12.2 mmol) was suspended in dry ethanol and cooled in an ice bath. Isopropylamine (2.15 g, 36.6 mmol) was added, and the reaction flask was tightly sealed and stirred at room temperature for 2 days. The yellow precipitate was filtered, washed with dry ethanol and anhydrous ether, and dried under vacuum at 100° C. for 12 h to provide 4-amino-N-isopropyl-3-nitrobenzimidamide. Yellow solid (2.23 g, 71%), mp 278-280° C. (Lit. mp 274-276° C.)[1]. $^1$HNMR (DMSO-$d_6$): δ 9.35 (br s, 2H), 8.45 (d, J=7 Hz, 1H), 8.11 (br s, 2H), 7.75 (d, J=7 Hz, 1H), 7.19 (d, J=9 Hz, 1H), 4.09 (m, 1H), 1.25 (d, J=6.5 Hz, 6H); ESI-HRMS: m/z calculated for $C_{10}H_{15}N_4O_2$: 223.1190, found: 223.1189 ($M^+$+1).

Step 3

Example 10. Synthesis of 3,4-Diamino-N-isopropylbenzimidamide (6)

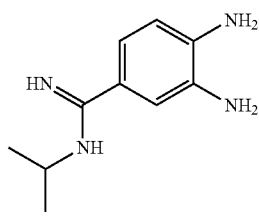

Pd/C (10%) (0.6 g) was added to a degassed solution of 4-amino-N-isopropyl-3-nitrobenzimidamide (6 g, 27 mmol) in a water/methanol (80 ml: 40 ml) mixture. The mixture was shaken in a Parr hydrogenator under 50 psi until the uptake of hydrogen ceased and consumption of hydrogen gave a clear solution. The solution was filtered through celite and acidified with concentrated HCl (2 ml), and the filtrate was concentrated under reduced pressure to 20 ml volume, filtered and dried at 100° C. for 5 h to provide 3,4-diamino-N-isopropylbenzimidamide hydrochloride.

Yellow solid (6.9 g, 96%), mp 241-243° C. (Lit. mp 228° C.)[1]. $^1$HNMR (DMSO-$d_6$): δ 9.40 (d, J=8 Hz, 1H), 9.26 (s, 1H), 8.96 (s, 1H), 7.58 (s, 1H), 7.41 (d, J=8.6 Hz, 1H), 6.99 (d, J=8.6 Hz, 1H), 6.2 (m, 4H), 4.07 (m, 1H), 1.25 (d, J=6.5 Hz, 6H); ESI-HRMS: m/z calculated for $C_{10}H_{17}N_4$: 193.1448, found: 193.1453 ($M^+$+1).

Step 4. Synthesis of Compounds A-H Using General Procedure 2

The compounds of Formulas A-H were synthesized from bis-aldehyde intermediates 3a-h and 3,4-diamino-N-isopropylbenzimidamide (6) using the following general procedure:

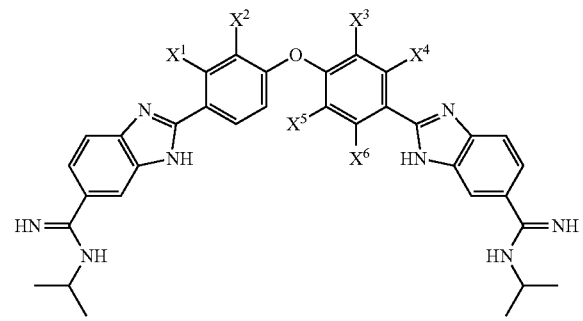

Sodium metabisulphite (0.38 g, 1.8 mmol) solution in water (2 ml) was added to a stirred solution of the bis-aldehyde intermediate 3a-h (0.9 mmol) in ethanol (40 mL), and stirring was continued for 1 h. 3,4-diamino-N-isopropylbenzimidamide hydrochloride (0.41 g, 1.8 mmol) was added to the reaction mixture, and the mixture was heated at reflux for 24 h. The reaction mixture was concentrated under reduced pressure and filtered. The precipitate obtained was suspended in water, neutralized with sodium hydroxide solution (2 M), filtered, and dried under vacuum at room temperature. The free base was dissolved in methanol (40 ml) and filtered. Finally, ethanolic HCl was added to the filtrate and stirred for 24 h. The solution was concentrated to 5 ml, acetone was added and the precipitate which formed was filtered, washed with acetone and dried at 100° C. for 24 h to provide the desired compounds A-H.

Example 11. Synthesis of 2-(3,5-Difluoro-4-(4-(6-(N-isopropylcarbamimidoyl)-1H-benzo[d]imidazol-2-yl)-3-methoxyphenoxy)phenyl)-N-isopropyl-1H-benzo[d]imidazole-6-carboximidamide tetrahydrochloride. (A)

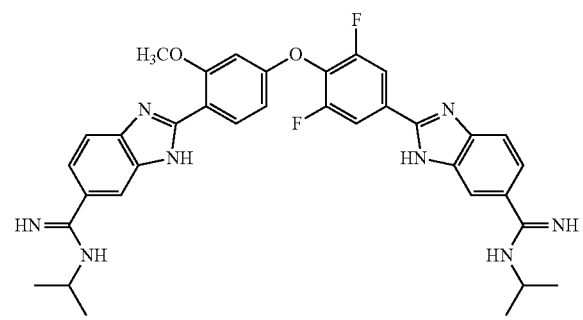 [SMILES: COc1cc(Oc2c(F)cc(-c3nc4ccc(C(=N)NC(C)C)cc4[nH]3)cc2F)ccc1-c1nc2ccc(C(=N)NC(C)C)cc2[nH]1]

Compound A was synthesis from bis-aldehyde 3a and compound 6 using general procedure 2.

White solid (0.230 g, 33%), mp>300° C. ¹HNMR (DMSO-d₆): δ 9.78 (d, J=6 Hz, 1H), 9.61 (m, 2H), 9.48 (s, 1H), 9.22 (s, 1H), 9.09 (s, 1H), 8.49 (d, J=9.2 Hz, 1H), 8.40 (d, J=9.2 Hz, 2H), 8.18 (s, 1H), 8.11 (s, 1H), 7.99 (d, J=8.4 Hz, 1H), 7.85 (d, J=8.4 Hz, 1H), 7.76 (d, J=8.8 Hz, 1H), 7.63 (d, J=8.4 Hz, 1H), 7.22 (s, 1H), 6.90 (d, J=8.4 Hz, 1H), 4.13 (m, 2H), 4.09 (s, 3H), 1.32 (d, J=5.6 Hz, 12H); ESI-HRMS: m/z calculated for $C_{31}H_{36}F_2N_8O_2$: 319.1459, found: 319.1449 (double charged amidine base M⁺+2); Anal. Calcd. For $C_{35}H_{34}F_2N_8O_2$-4HCl-0.5H₂O: C, 53.21; H, 4.98; N, 14.19. Found: C, 53.33; H, 5.17; N, 14.02.

Example 12. Synthesis of 2-(2-Chloro-4-(2,6-difluoro-4-(6-(N-isopropylcarbamimidoyl)-1H-benzo[d]imidazol-2-yl)phenoxy)phenyl)-N-isopropyl-1H-benzo[d]imidazole-6-carboximidamide tetrahydrochloride. (B)

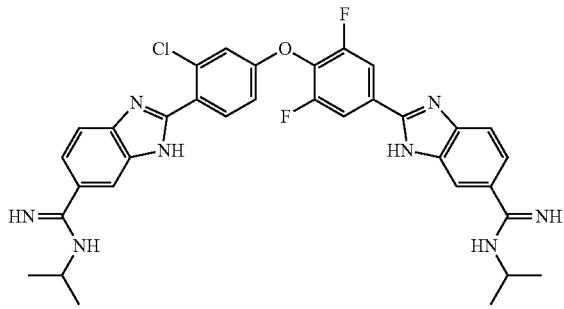 [SMILES: CC(C)NC(=N)c1ccc2nc(-c3cc(F)c(Oc4ccc(-c5nc6ccc(C(=N)NC(C)C)cc6[nH]5)c(Cl)c4)c(F)c3)[nH]c2c1]

Compound B was synthesis from bis-aldehyde 3b and compound 6 using general procedure 2.

White solid (0.280 g, 38%), mp>300° C. ¹HNMR (DMSO-d₆): δ 9.74 (d, J=8 Hz, 1H), 9.69 (d, J=8 Hz, 1H), 9.60 (s, 1H), 9.56 (s, 1H), 9.29 (s, 1H), 9.24 (s, 1H), 8.52 (d, J=8.8 Hz, 2H), 8.18 (s, 1H), 8.12 (s, 1H), 8.04 (d, J=8.8 Hz, 1H), 7.92 (d, J=8.4 Hz, 1H), 7.85 (d, J=8.8 Hz, 1H), 7.73 (d, J=8.4 Hz, 1H), 7.67 (d, J=8.8 Hz, 1H), 7.61 (m, 1H), 7.36 (m, 1H), 4.17 (m, 2H), 1.31 (d, J=6 Hz, 12H); ESI-HRMS: m/z calculated for $C_{34}H_{33}ClF_2N_8O$: 321.1211, found: 321.1202 (double charged amidine base M⁺+2), Anal. Calcd. For $C_{34}H_{31}ClF_2N_8O$-4HCl-1.5H₂O: C, 50.29; H, 4.72; N, 13.81. Found: C, 50.13; H, 5.03; N, 13.61.

Example 13. Synthesis of 2-(3,5-Difluoro-4-(3-fluoro-4-(6-(N-isopropylcarbamimidoyl)-1H-benzo[d]imidazol-2-yl)phenoxy)phenyl)-N-isopropyl-1H-benzo[d]imidazole-6-carboximidamide tetrahydrochloride. (C)

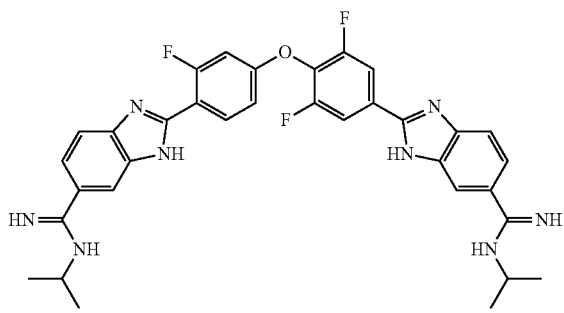 [SMILES: CC(C)NC(=N)c1ccc2nc(-c3cc(F)c(Oc4ccc(-c5nc6ccc(C(=N)NC(C)C)cc6[nH]5)c(F)c4)c(F)c3)[nH]c2c1]

Compound C was synthesis from bis-aldehyde 3c and compound 6 using general procedure 2.

White solid (0.150 g, 20%), mp>300° C. ¹HNMR (DMSO-d₆): δ 9.66 (m, 2H), 9.53 (m, 2H), 9.18 (m, 2H), 8.44 (d, J=8.8 Hz, 2H), 8.37 (m, 1H), 8.11 (br s, 2H), 7.85 (m, 2H), 7.65 (m, 2H), 7.44 (m, 1H), 7.23 (d, J=8.8 Hz, 1H), 4.15 (m, 2H), 1.32 (d, J=2.4 Hz, 12H); ESI-HRMS: m/z calculated for $C_{34}H_{33}F_3N_8O$: 313.1359, found: 313.1349 (double charged amidine base M⁺+2); Anal. Calcd. For $C_{34}H_{31}F_3N_8O$-4HCl-2.25H₂O: C, 50.45; H, 4.92; N, 13.85. Found: C, 50.29; H, 4.96; N, 13.81.

Example 14. Synthesis of 2,2'-(Oxybis(2-bromo-4,1-phenylene))bis(N-isopropyl-1H-benzo[d]imidazole-6-carboximidamide) tetrahydrochloride. (D)

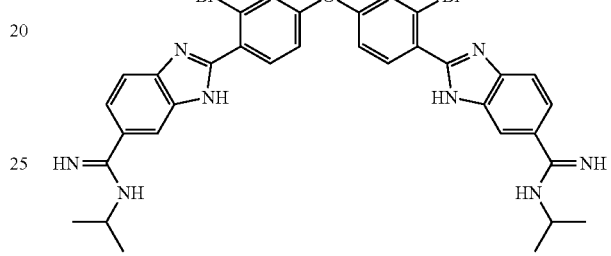

Compound D was synthesis from bis-aldehyde 3d and compound 6 using general procedure 2.

White solid (0.145 g, 17%), mp>300° C. ¹HNMR (DMSO-d₆): δ 9.70 (m, 2H), 9.58 (br s, 2H), 9.26 (br s, 2H), 8.18 (br s, 2H), 7.98 (d, J=7.8 Hz, 2H), 7.90 (d, J=7.8 Hz, 2H), 7.71 (m, 4H), 7.42 (d, J=8.4 Hz, 2H), 4.17 (m, 2H), 1.31 (d, J=5.6 Hz, 12H); ESI-HRMS: m/z calculated for $C_{34}H_{33}Br_2N_8O$: 727.1144, found: 727.1138 (amidine base M⁺+1); Anal. Calcd. For $C_{34}H_{32}Br_2N_8O$-4HCl-2.75H₂O: C, 44.36; H, 4.54; N, 12.18. Found: C, 44.70; H, 4.25; N, 11.85.

Example 15. Synthesis of 2-(2-Bromo-4-(3-fluoro-4-(6-(N-isopropylcarbamimidoyl)-1H-benzo[d]imidazol-2-yl)phenoxy)phenyl)-N-isopropyl-1H-benzo[d]imidazole-6-carboximidamide tetrahydrochloride. (E)

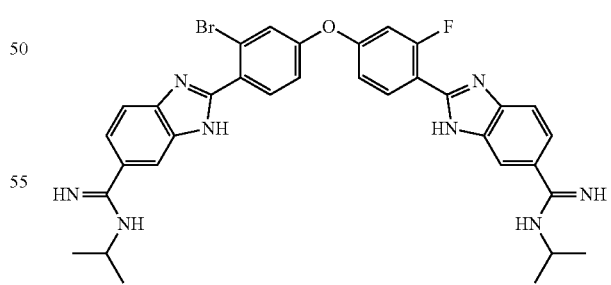

Compound E was synthesis from bis-aldehyde 3e and compound 6 using general procedure 2.

White solid (0.312 g, 40%), mp>300° C. ¹HNMR (DMSO-d₆): δ 9.70 (m, 2H), 9.57 (br s, 2H), 9.25 (br s, 2H), 8.44 (m, 1H), 8.16 (m, 2H), 7.97 (d, J=8.8 Hz, 1H), 7.89 (m, 2H), 7.70 (m, 3H), 7.43 (m, 2H), 7.25 (d, J=7.2 Hz, 1H), 4.17 (m, 2H), 1.32 (d, J=6 Hz, 12H); ESI-HRMS: m/z calculated for $C_{34}H_{34}BrFN_8O$: 334.1006, found: 334.0999 (Double charged amidine base M$^+$+2); Anal. Calcd. For $C_{34}H_{32}BrFN_8O$-4HCl-2.25H$_2$O: C, 47.96; H, 4.79, N, 13.16. Found: C, 48.07; H, 4.78; N, 12.87.

Example 16. Synthesis of 2-(2-Bromo-4-(2,6-difluoro-4-(6-(N-isopropylcarbamimidoyl)-1H-benzo[d]imidazol-2-yl)phenoxy)phenyl)-N-isopropyl-1H-benzo[d]imidazole-6-carboximidamide tetrahydrochloride. (F)

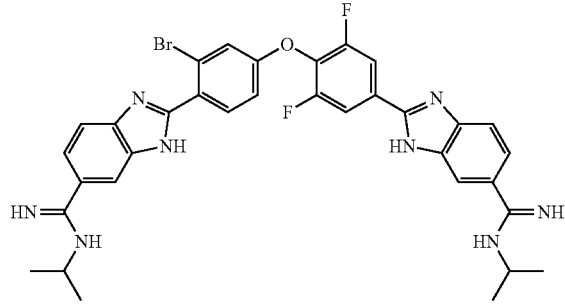

Compound F was synthesis from bis-aldehyde 3f and compound 6 using general procedure 2.

White solid (0.10 g, 14%), mp>300° C. $^1$HNMR (DMSO-d$_6$): δ 9.71 (d, J=8 Hz, 1H), 9.66 (d, J=8 Hz, 1H), 9.57 (s, 1H), 9.52 (s, 1H), 9.21 (s, 1H), 9.16 (s, 1H), 8.48 (d, J=8.8 Hz, 2H), 8.18 (s, 1H), 8.12 (s, 1H), 7.92 (m, 2H), 7.87 (d, J=8.4 Hz, 1H), 7.74 (m, 2H), 7.66 (d, J=8.4 Hz, 1H), 7.40 (dd, J=2, 8.4 Hz, 1H), 4.13 (m, 2H), 1.31 (d, J=6.4 Hz, 12H); ESI-HRMS: m/z calculated for $C_{34}H_{33}BrF_2N_8O$: 343.0959, found: 343.0941 (Double charged amidine base M$^+$+2); Anal. Calcd. For $C_{34}H_{31}BrF_2N_8O$-4HCl-3.25H$_2$O: C, 46.01; H, 4.71; N, 12.63. Found: C, 45.69; H, 4.36; N, 12.25.

Example 17. Synthesis of 2-(2-Bromo-4-(3,5-difluoro-4-(6-(N-isopropylcarbamimidoyl)-1H-benzo[d]imidazol-2-yl)phenoxy)phenyl)-N-isopropyl-1H-benzo[d]imidazole-6-carboximidamide tetrahydrochloride. (G)

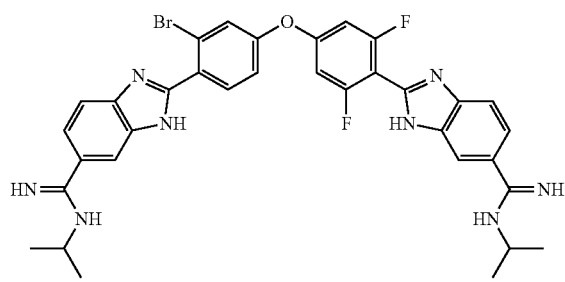 [SMILES: CC(C)NC(=N)c1ccc2nc(-c3ccc(Oc4ccc(-c5nc6ccc(C(=N)NC(C)C)cc6[nH]5)c(Br)c4)cc3F)[nH]c2c1]

Compound G was synthesis from bis-aldehyde 3g and compound 6 using general procedure 2.

White solid (0.320 g, 40%), mp>300° C. $^1$HNMR (DMSO-d$_6$): δ 9.69 (d, J=8 Hz, 1H), 9.64 (d, J=8 Hz, 1H), 9.54 (m, 2H), 9.21 (m, 2H), 8.17 (m, 2H), 7.98 (d, J=8.8 Hz, 1H), 7.88 (m, 2H), 7.78 (d, J=2 Hz, 1H), 7.71 (d, J=8.8 Hz, 1H), 7.66 (d, J=8.4 Hz, 1H), 7.47 (m, 1H), 7.28 (m, 2H), 4.17 (m, 2H), 1.31 (d, J=6 Hz, 12H); ESI-HRMS: m/z calculated for $C_{34}H_{33}BrF_2N_8O$: 343.0959, found: 343.0943 (Double charged amidine base M$^+$+2); Anal. Calcd. For $C_{34}H_{31}BrF_2N_8O$-4HCl-3.5H$_2$O: C, 45.78: H, 4.57; N, 12.57. Found: C, 45.87; H, 4.55; N, 12.83.

Example 18. Synthesis of 2-(2-Bromo-4-(2,3-difluoro-4-(6-(N-isopropylcarbamimidoyl)-1H-benzo[d]imidazol-2-yl)phenoxy)phenyl)-N-isopropyl-1H-benzo[d]imidazole-6-carboximidamide tetrahydrochloride. (H)

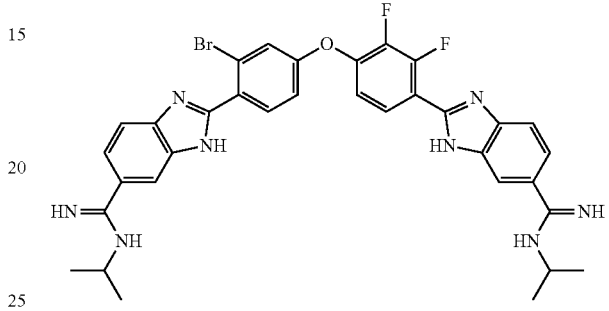

Compound H was synthesis from bis-aldehyde 3h and compound 6 using general procedure 2. White solid (0.300 g, 40%), mp>300° C. $^1$HNMR (DMSO-d$_6$): δ 9.62 (m, 2H), 9.49 (br s, 2H), 9.14 (br s, 2H), 8.19 (m, 1H), 8.13 (br s, 2H), 7.92 (d, J=8.4 Hz, 1H), 7.86 (m, 2H), 7.75 (d, J=2.4 Hz, 1H), 7.65 (m, 2H), 7.43 (dd, J=2.4, 8.4 Hz, 1H), 7.38 (m, 1H), 4.14 (m, 2H), 1.31 (d, J=6 Hz, 12H); ESI-HRMS: m/z calculated for $C_{34}H_{33}BrF_2N_8O$: 343.0959, found: 343.0940 (Double charged amidine base M$^+$+2); Anal. Calcd. For $C_{34}H_{31}BrF_2N_8O$-4HCl: C, 49.27; H, 4.26; N, 13.52. Found: C, 49.52; H, 4.66; N, 13.21.

Example 19. Synthesis of Compounds of Formula S and Formula T

Compounds S and T were synthesized according to the procedures provided in Hu et al. "Synthesis and structure-activity relationship of dicationic diaryl ethers as novel potent anti-MRSA and anti-VRE agents" Bioorg. Med. Chem. Lett. 2009, 19(16):4626-4629.

Example 20. Synthesis of 2-(4-Amino-3-nitrophenyl)-1H-benzo[d]imidazole-6-carboximidamide hydrochloride

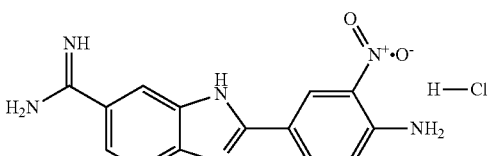

1,4-Benzoquinone (1.29 g, 12 mmol) was added to a solution of 4-amino-3-nitrobenzaldehyde (1.47 g, 8.8 mmol) and 3,4-diaminobenzimidamide hydrochloride (1.5 g, 8 mmol) in ethanol (50 mL). The mixture was heated at reflux for 12 h and filtered while boiling and washed with boiling ethanol, acetone, filtered and dried at 100° C. for 5 h yielding a gray solid (1.68 g, 71%), mp>300° C. ¹HNMR (DMSO-d₆): δ 9.34 (s, 2H), 8.94 (s, 2H), 8.90 (br s, 1H), 8.23 (d, J=9 Hz, 1H), 8.09 (br s, 1H), 7.91 (br s, 2H), 7.75 (d, J=8.5 Hz, 1H), 7.66 (d, J=8.5 Hz, 1H), 7.20 (d, J=9 Hz, 1H); ESI-HRMS: m/z calculated for $C_{14}H_{13}N_6O_2$: 297.1095, found: 297.1083 (M⁺+1); Anal. Calcd. For $C_{14}H_{12}N_6O_2$-2HCl: C, 45.54; H, 3.82; N, 22.76. Found: C, 45.66; H, 3.80; N, 22.39 Example 21. Synthesis of 2-(3,4-Diaminophenyl)-1H-benzo[d]imidazole-6-carboximidamide hydrochloride.

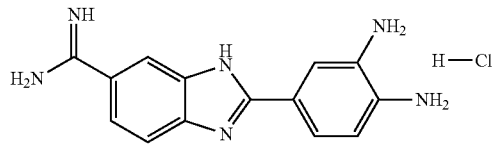

Pd/C (10%) (0.3 g) was added to a deaerated solution of the above nitro compound (3.32 g, 10 mmol) in water/methanol (60 ml: 20 ml) mixture. The mixture was shaken in a Parr hydrogenator under 50 psi until the uptake of hydrogen ceased, the consumption of hydrogen gave a clear solution. The solution was filtered through Celite, acidified with concentrated HCl (2 ml) and the filtrate was concentrated under reduced pressure to 20 ml volume, filtered and dried at 100° C. for 5 h to yield a green solid (2.79 g, 93%), mp>300° C. ¹HNMR (DMSO-d₆): δ 9.56 (s, 2H), 9.26 (s, 2H), 8.19 (br s, 1H), 8.08 (d, J=8.4 Hz, 1H), 8.01 (br s, 1H), 7.88 (d, J=8.4 Hz, 1H), 7.83 (d, J=8.4 Hz, 1H), 7.02 (d, J=8.4 Hz, 1H); ESI-HRMS: m/z calculated for $C_{14}H_{15}N_6$: 267.1553, found: 267.1346 (M⁺+1); Anal. Calcd. For $C_{14}H_{14}N_6$-3HCl-0.75H₂O: C, 43.20; H, 4.79; N, 21.59. Found: C, 43.00; H, 4.75; N, 21.24.

Example 22. Synthesis of 4-(6-carbamimidoyl-1H,3'H-[2,5'-bibenzo[d]imidazol]-2'-yl)benzamide hydrochloride

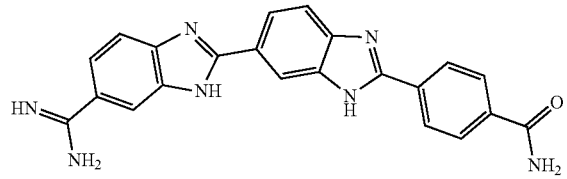 [SMILES: N=C(N)c1ccc2nc(-c3ccc4nc(-c5ccc(C(N)=O)cc5)[nH]c4c3)[nH]c2c1]

Sodium metabisulphite (0.25 g, 1.32 mmol) solution in water (2 ml) was added to a stirred solution of the 4-formylbenzamide (0.72 mmol) in ethanol (20 mL) and stirring was continued for 1 h. The diamine hydrochloride (0.66 mmol) was added to the reaction mixture and the mixture was refluxed for 24 h. The reaction mixture which formed was concentrated under reduced pressure and filtered, the precipitate was suspended in water and neutralized with sodium hydroxide solution (2 N), filtered and dried under vacuum at room temperature. The free base was dissolved in methanol (80 ml) and filtered. Finally, ethanolic HCl was added to the filtrate and stirred for 24 h. The solution was concentrated to 5 ml and filtered, washed with ethanol, acetone and dried at 100° C. for 12 h to yield a brown solid (0.16 g, 43%), mp>300° C. ¹HNMR (DMSO-d₆): δ 9.54 (s, 2H), 9.22 (s, 2H), 8.85 (br s, 1H), 8.49 (d, J=8.2 Hz, 2H), 8.45 (br s, 1H), 8.27 (br s, 1H), 8.22 (br s, 1H), 8.14 (d, J=8.2 Hz, 2H), 8.02 (d, J=8.8 Hz, 1H), 7.95 (d, J=8.8 Hz, 1H), 7.84 (d, J=8 Hz, 1H), 7.62 (br s, 1H); ESI-HRMS: m/z calculated for $C_{22}H_{18}N_7O$: 396.1567, found: 396.1577 (M⁺+1); Anal. Calcd. For $C_{22}H_{17}N_7O$-3HCl-1.25H₂O-0.5C₂H₆O: C, 50.19; H, 4.67; N, 17.81. Found: C, 50.65; H, 4.64; N, 17.42.

Example 23. Synthesis of 2-(4-Amino-3-nitrophenyl)-N-cyclobutyl-1H-benzo[d]imidazole-6-carboximidamide hydrochloride

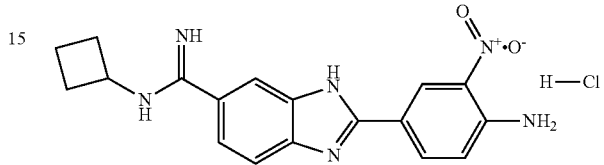

The reaction of 3,4-diamino-N-cyclobutylbenzimidamide hydrochloride with 4-amino-3-nitrobenzaldehyde and benzoquinone as described above for DB2379 yielded a green solid (1.66 g, 54%), mp>300° C. ¹HNMR (DMSO-d₆): δ 10.21 (d, J=9.2 Hz, 1H), 9.66 (s, 1H), 9.12 (s, 1H), 9.07 (s, 1H), 8.47 (d, J=9.2 Hz, 1H), 8.20 (br s, 2H), 8.12 (s, 1H), 7.86 (d, J=8.8 Hz, 1H), 7.75 (d, J=8.4 Hz, 1H), 7.27 (d, J=9.2 Hz, 1H), 4.35 (m, 1H), 2.47 (m, 2H), 2.26 (p, J=9.6 Hz, 2H), 1.79 (m, 2H); ESI-HRMS: m/z calculated for $C_{18}H_{19}N_6O_2$: 351.1569, found: 351.1559 (M⁺+1).

Example 24. Synthesis of 2'-(3-(2-(Dimethylamino)ethoxy)phenyl)-1H,3'H-[2,5'-bibenzo[d]imidazole]-6-carboximidamide hydrochloride

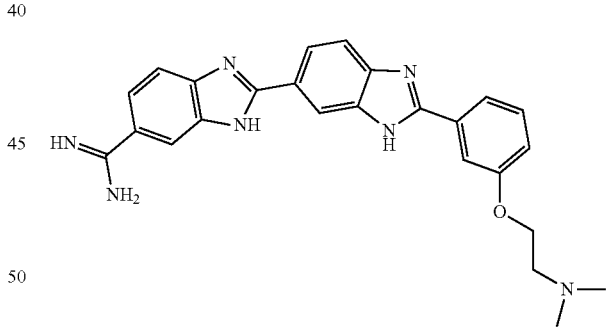

2-(3,4-Diaminophenyl)-1H-benzo[d]imidazole-6-carboximidamide, benzoquinone and 3-(2-dimethylaminoethoxy)benzaldehyde were allowed to react as described above for DB2379 to yield a brown solid (0.1 g, 26%), mp>300° C. ¹HNMR (DMSO-d₆): δ 11.22 (s, 1H), 9.57 (s, 2H), 9.39 (s, 2H), 8.79 (br s, 1H), 8.45 (d, J=7 Hz, 1H), 8.26 (m, 2H), 8.18 (d, J=7.6 Hz, 1H), 7.91 (d, J=8.8 Hz, 1H), 7.87 (d, J=7 Hz, 1H), 7.80 (d, J=8.4 Hz, 1H), 7.59 (t, J=8 Hz, 1H), 7.27 (d, J=7.2 Hz, 1H), 4.60 (m, 2H), 3.58 (m, 2H), 2.87 (s, 6H); ESI-HRMS: m/z calculated for $C_{25}H_{26}N_7O$: 440.2193, found: 440.2205 (M⁺+1); Anal. Calcd. For $C_{25}H_{25}N_7O$-3HCl-H₂O-0.25C₃H₆O: C, 53.19; H, 5.40; N, 16.86. Found: C, 52.79; H, 5.04; N, 16.46.

Example 25. Synthesis of N-Cyclobutyl-2-(3,4-diaminophenyl)-1H-benzo[d]imidazole-6-carboximidamide hydrochloride

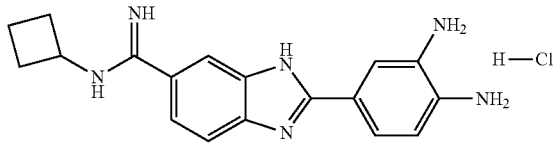

Reduction of 2-(4-amino-3-nitrophenyl)-N-cyclobutyl-1H-benzo[d]imidazole-6-carboximidamide as described above for DB2379 yielded a green solid (3.25 g, 93%), mp>300° C. $^1$HNMR (DMSO-$d_6$): δ 10.16 (d, J=9.2 Hz, 1H), 9.62 (s, 1H), 9 (s, 1H), 8 (s, 1H), 8.03 (d, J=8.8 Hz, 1H), 7.97 (s, 1H), 7.85 (d, J=8.4 Hz, 1H), 7.73 (d, J=8.8 Hz, 1H), 7 (d, J=8.4 Hz, 1H), 4.37 (m, 1H), 2.77 (m, 2H), 2.27 (m, 2H), 1.78 (m, 2H); ESI-HRMS: m/z calculated for $C_{18}H_{21}N_6$: 321.1828, found: 321.1842 (M$^+$+1).

Example 26. Synthesis of N-Cyclobutyl-2'-(3-hydroxyphenyl)-1H,3'H-[2,5'-bibenzo[d]imidazole]-6-carboximidamide hydrochloride

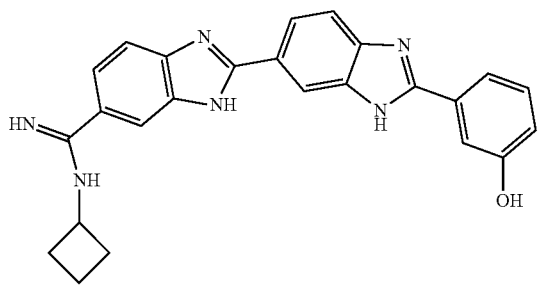 [SMILES: N=C(NC1CCC1)c1ccc2nc(-c3ccc4nc(-c5cccc(O)c5)[nH]c4c3)[nH]c2c1]

Reaction of N-cyclobutyl-2-(3,4-diaminophenyl)-1H-benzo[d]imidazole-6-carboximidamide hydrochloride with 3-hydroxybenzaldehyde and sodium metabisulphite as described above for DB2379 yielded a green solid (0.1 g, 23%), mp>300° C. $^1$HNMR (DMSO-$d_6$): δ 10.14 (d, J=6 Hz, 1H), 9.61 (s, 1H), 9 (s, 1H), 8.84 (s, 1H), 8.50 (d, J=8.8 Hz, 1H), 8.17 (s, 1H), 8.01 (d, J=8.4 Hz, 1H), 7.91 (d, J=8.4 Hz, 1H), 7.86 (d, J=8.4 Hz, 1H), 7.78 (s, 1H), 7.73 (d, J=8.8 Hz, 1H), 7.50 (t, J=8 Hz, 1H), 7.16 (d, J=7.6 Hz, 1H), 4.36 (m, 1H), 2.27 (m, 2H), 2.08 (m, 2H), 1.80 (m, 2H); ESI-HRMS: m/z calculated for $C_{25}H_{23}N_6O$: 423.1928, found: 423.1931 (M$^+$+1); Anal. Calcd. For $C_{25}H_{22}N_6O$-3HCl-1.5H$_2$O: Found, C, 53.72; H, 5.04; N, 15.03. Found: C, 53.60; H, 5.22; N, 14.78.

Example 27. Synthesis of N-Cyclobutyl-2'-(3-hydroxy-4-methoxyphenyl)-1H,3'H-[2,5'-bibenzo[d]imidazole]-6-carboximidamide hydrochloride

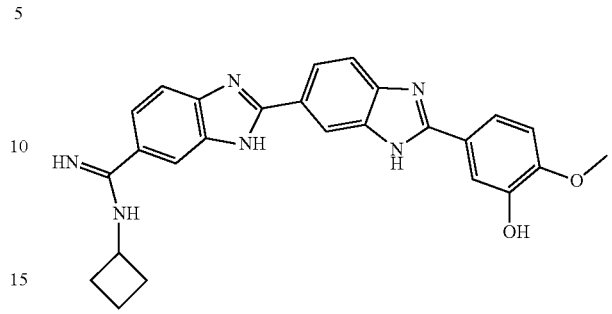

Reaction of N-cyclobutyl-2-(3,4-diaminophenyl)-1H-benzo[d]imidazole-6-carboximidamide with 3-hydroxy-4-methoxybenzaldehyde and sodium metabisulphite as described above for DB2379 yielded a green solid (0.105 g, 27%), mp>300° C. $^1$HNMR (DMSO-$d_6$): δ 10.14 (d, J=6 Hz, 1H), 9.60 (s, 1H), 9.02 (s, 1H), 8.78 (s, 1H), 8.50 (dd, J=8.8, 1.2 Hz, 1H), 8.15 (s, 1H), 7.99 (m, 2H), 7.87 (d, J=8.4 Hz, 1H), 7.98 (d, J=2 Hz, 1H), 7.68 (dd, J=8.8, 1.2 Hz, 1H), 7.27 (d, J=8.4 Hz, 1H), 4.36 (d, J=7.8 Hz, 1H), 3.93 (s, 3H), 2.43 (m, 2H), 2.27 (m, 2H), 1.78 (m, 2H); ESI-HRMS: m/z calculated for $C_{26}H_{25}N_6O_2$: 453.2039, found: 453.2022 (M$^+$+1); Anal. Calcd. For $C_{26}H_{24}N_6O_2$-3HCl-1.5H$_2$O: Found, C, 53.02; H, 5.13; N, 14.27. Found: C, 52.97; H, 5.46; N, 14.47.

Example 28. Synthesis of 2-Nitro-4-(6-(1,4,5,6-tetrahydropyrimidin-2-yl)-1H-benzo[d]imidazol-2-yl)aniline hydrochloride

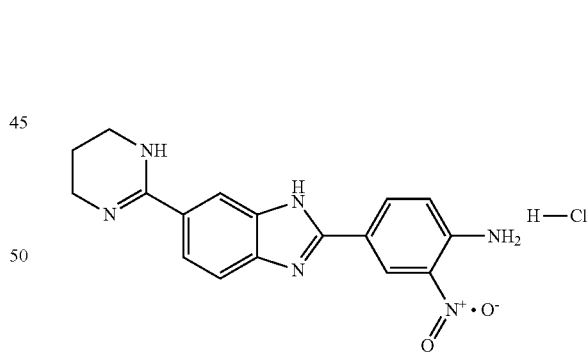

The reaction 4-(1,4,5,6-tetrahydropyrimidin-2-yl)benzene-1,2-diamine with 4-amino-3-nitrobenzaldehyde and benzoquinone as described above for DB2379 yielded a brown solid (1.98 g, 67%), mp>300° C. $^1$HNMR (DMSO-$d_6$): δ 10.27 (s, 2H), 9.12 (s, 1H), 8.46 (br s, 1H), 8.15 (m, 3H), 7.89 (br s, 1H), 7.77 (br s, 1H), 7.27 (br s, 1H), 3.44 (m, 4H), 2.02 (m, 2H); ESI-HRMS: m/z calculated for $C_{17}H_{17}N_6O_2$: 337.1408, found: 337.1393 (M$^+$+1).

Example 29. Synthesis of 4-(6-(1,4,5,6-Tetrahydropyrimidin-2-yl)-1H-benzo[d]imidazol-2-yl)benzene-1,2-diamine hydrochloride

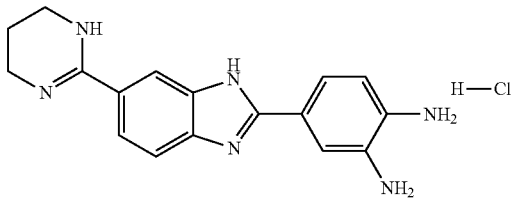

Reduction 2-nitro-4-(6-(1,4,5,6-tetrahydropyrimidin-2-yl)-1H-benzo[d]imidazol-2-yl)aniline hydrochloride as described above for DB2379 yielded a green solid (3.4 g, 94%), mp>300° C. $^1$HNMR (DMSO-$d_6$): δ 10.16 (s, 2H), 8.08 (br s, 1H), 7.98 (d, J=8 Hz, 1H), 7.93 (br s, 1H), 7.86 (d, J=8.4 Hz, 1H), 7.71 (d, J=8 Hz, 1H), 6.98 (d, J=8.4 Hz, 1H), 3.52 (m, 4H), 2.01 (m, 2H); ESI-HRMS: m/z calculated for $C_{17}H_{19}N_6$: 307.1666, found: 307.1672 (M$^+$+1).

Example 30. Synthesis of 2'-Phenyl-6-(1,4,5,6-tetrahydropyrimidin-2-yl)-1H,3'H-2,5'-benzo[d] imidazole hydrochloride

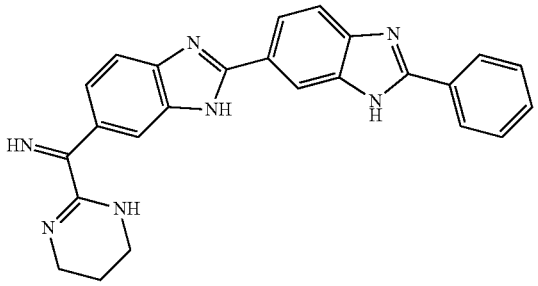 [SMILES: N=C(C1=NCCCN1)c1ccc2nc(-c3ccc4nc(-c5ccccc5)[nH]c4c3)[nH]c2c1]

Reaction of 4-(6-(1,4,5,6-tetrahydropyrimidin-2-yl)-1H-benzo[d]imidazol-2-yl)benzene-1,2-diamine with benzaldehyde and sodium metabisulphite as described above for DB2379 yielded a gray solid (0.14 g, 40%), mp>300° C. $^1$HNMR (DMSO-$d_6$): δ 10.21 (s, 2H), 8.86 (s, 1H), 8.51 (d, J=8.8 Hz, 1H), 8.48 (m, 2H), 8.19 (s, 1H), 8.03 (d, J=8.4 Hz, 1H), 7.94 (d, J=8.4 Hz, 1H), 7.72 (m, 4H), 3.54 (m, 4H), 2.02 (m, 2H); ESI-HRMS: m/z calculated for $C_{24}H_{21}N_6$: 393.1828, found: 393.1830 (M$^+$+1); Anal. Calcd. For $C_{24}H_{20}N_6$-3HCl-1.25$H_2O$: C, 54.97; H, 4.90; N, 16.02. Found: C, 55.06; H, 5.07; N, 15.89.

Example 31. Synthesis of 3-(6-(1,4,5,6-Tetrahydropyrimidin-2-yl)-1H,3'H-[2,5'-bibenzo[d]imidazol]-2'-yl)phenol hydrochloride

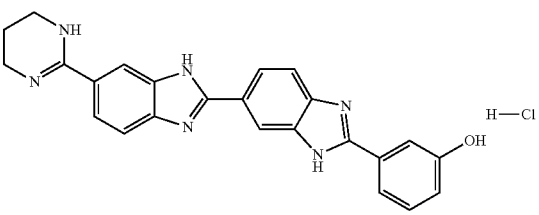

Reaction of 4-(6-(1,4,5,6-tetrahydropyrimidin-2-yl)-1H-benzo[d]imidazol-2-yl)benzene-1,2-diamine with 3-hydroxybenzaldehyde and sodium metabisulphite as described above for DB2379 yielded a green solid (0.090 g, 25%), mp>300° C. $^1$HNMR (DMSO-$d_6$): δ 10.26 (s, 2H), 8.87 (s, 1H), 8.54 (d, J=8.8 Hz, 1H), 8.20 (s, 1H), 8.02 (d, J=8.4 Hz, 1H), 7.93 (d, J=8.8 Hz, 1H), 7.89 (d, J=7.6 Hz, 1H), 7.80 (s, 1H), 7.75 (d, J=8.4 Hz, 1H), 7.50 (t, J=7.6 Hz, 1H), 7.18 (d, J=7.6 Hz, 1H), 3.44 (m, 4H), 2.08 (m, 2H); ESI-HRMS: m/z calculated for $C_{24}H_{21}N_6O$: 409.1771, found: 409.1779 (M$^+$+1); Anal. Calcd. For $C_{24}H_{20}N_6O$-3HCl-2.5$H_2O$: C, 51.21; H, 5.01; N, 14.93. Found: C, 51.15; H, 5.02; N, 14.60.

Example 32. Synthesis of 2-Methoxy-5-(6-(1,4,5,6-tetrahydropyrimidin-2-yl)-1H,3'H-[2,5'-bibenzo[d]imidazol]-2'-yl)phenol hydrochloride

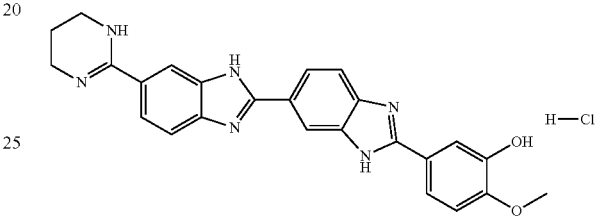

Reaction of 4-(6-(1,4,5,6-tetrahydropyrimidin-2-yl)-1H-benzo[d]imidazol-2-yl)benzene-1,2-diamine with 3-hydroxy-4-methoxybenzaldehyde and sodium metabisulphite as described above for DB2379 yielded a green solid (0.070 g, 19%), mp>300° C. $^1$HNMR (DMSO-$d_6$): δ 10.16 (s, 2H), 8.79 (s, 1H), 8.51 (d, J=8.8 Hz, 1H), 8.16 (s, 1H), 7.99 (m, 2H), 7.91 (d, J=8.4 Hz, 1H), 7.84 (d, J=2 Hz, 1H), 7.70 (d, J=7.6 Hz, 1H), 7.28 (d, J=8.4 Hz, 1H), 3.93 (s, 3H), 3.53 (m, 4H), 2.08 (m, 2H); ESI-HRMS: m/z calculated for $C_{25}H_{23}N_6O_2$: 439.1877, found: 439.1866 (M$^+$+1); Anal. Calcd. For $C_{25}H_{22}N_6O_2$-3HC-0.75$H_2O$: C, 53.48; H, 4.75; N, 14.97. Found: C, 53.84; H, 4.71; N, 14.69.

B. Evaluation of Anti-*Acanthamoeba* Activity of the Compounds of the Present Invention

Example 33. Growth and Development of *Acanthamoeba* Trophozoites

Two *Acanthamoeba* species (*Acanthamoeba castellanii*—ATCC50370 and *Acanthamoeba culbertsoni*—ATCC30171) were bought from the American Type Culture Collection (ATCC) and one species (*Acanthamoeba healyi*) was donated from the Centers for Disease Control and Prevention (CDC) for our experimentations. Trophozoites were thawed and grown in 10 mL of a nutrient rich Peptose-Glucose (PG) media. The PG media composition is 83.26 mM Glucose (15 g/L), Protease Peptone (15 g/L, yeast extract is manufactured under controlled conditions to retain its vitamin content and other nutritive values such as free amino acids, no other composition information given), 2.2 mM $KH_2PO_4$ (300 mg/L), 2.97 μM Thiamine (1 mg/L), 99.86 μM L-methionine (14.9 mg/L), 4.6 μM Vitamin B12 (83.3 μl of 0.1 mg/mL stock/L) and 68 μM Biotin (83.3 μl of 0.2 mg/mL stock/L). A separate salt solution was prepared at 10.20 mM $CaCl_2$) $H_2O$ (150 mg/100 mL), 1.23 mM $FeCl_3$ (20 mg/100 mL) and 99.81 mM $MgSO_4.7H_2O$ (2.46 g/100 mL). One mL/L of the salt solution was added to the media stock prior to autoclaving. All reagents were purchased from Sigma Aldrich except the Glucose which was purchased from Alfa Aesar. The cell pellet was resuspended in a final volume of 10 mL of PG media, cultured in 75 cm$^2$ coming tissue culture flasks and incubated at 27° C. PG was supplemented with 125 µg of penicillin/streptomycin. Sub-culturing occurred twice per week to allow the continued growth and development of the *Acanthamoeba* trophozoites.

Example 34. Production of Cysts

The trophozoites of *Acanthamoeba* were harvested by mechanical detachment and collected via centrifugation at 4000 rpm at 4° C. for 5 minutes. The trophozoites were washed in 10 mL of Neff's Encystment Media (NEM). NEM composition is 20 mM Tris-HCL [pH 8.8] (2.43 g/L), 100 mM KCL (7.46 g/L), 8 mM MgSO4 (962.96 mg/L), 0.4 mM CaCL2 58.81 mg/L) and 1 mM NaHCO$_3$ (84.01 mg/L) (Neff et al. 1964). All reagents were bought from Sigma Aldrich. Centrifugation of the trophozoites was repeated to ensure any residual growth medium was removed. The pellet was resuspended in a final volume of 15 mL of NEM, cultured in 75 cm$^2$ corning tissue culture flasks and incubated vertically in a thermal shaker, shaken at 100 rpm at 37° C. for 72 hours to produce fully matured cysts. NEM was supplemented with 250 µg of penicillin/streptomycin. Fresh cysts were produced each time for any experimentation.

Example 35. General Methods for Encystation/Excystation Viability Experiments

At 72 hours the cysts were harvested using a cell scraper and collected via centrifugation at 4000 rpm at 25° C. for 10 minutes. The cells were washed twice in 10 mL of HyClone™ water, Molecular Biology Grade, and centrifugation was repeated to ensure the removal of any residual NEM. The cell suspension was washed with 0.5% sodium dodecyl sulphate (SDS) to remove any remaining trophozoites and immature cysts. The fully mature cysts were further washed twice with 10 mL of HyClone™ water and 1% NEM, centrifugation was repeated to remove any residue of SDS. The concentration of mature cysts was determined using a haemocytometer and adjusted to 1×10$^4$ cysts/mL in NEM.

All test compounds were prepared as 5 mg/mL stock solutions in dimethylsulfoxide (DMSO). All compounds were diluted in NEM, serially diluted in 2-fold dilutions 6 or 11 times, yielding a screening concentration range of 1.56 µg/mL to 50 µg/mL or 48 ng/mL to 50 µg/mL with a final highest screening concentration of 1% DMSO. 1% DMSO has been tested as a control and does not have any effects on excysting amoeba.

Previous experimentation using controlled encystation and excystation found that fully mature cysts of different species of *Acanthamoeba* take different times for recrudescence. This may explain the added difficulty in trying to treat patients. After synchronizing this process, it was found that *Acanthamoeba castellanii* (ATCC50370) not exposed to drug take only 5 days to excyst and become confluent in a 96 well plate (recrudescence). *Acanthamoeba culbertsoni* (ATCC30171) took 9 days and *Acanthamoeba healyi* took 11 days to recrudesce. Another *Acanthamoeba* species from the CDC "PA" took 22 days to recrudesce under no drug pressure, however, this isolate was discontinued due to it being a poor cyst former. Based on this, a strain specific test period and also a 30 day non-specific recovery time were considered. For the 30 day recovery period, the media was changed 5 times to ensure the contents of wells dis not evaporate and have an effect within the results of the assay.

Example 36. Encystation Drug Susceptibility Assay Procedure

90 µL of 1×10$^4$ Cysts/ml and 10 µL of experimental compounds from the screening plates were produced according to the protocols above and combined into a Corning clear 96 well treated tissue culture plate. Control wells include cysts in non-drug treated, 1% DMSO, NEM (to be used for negative growth control), NEM Blank, PG blank and cysts in non-drug treated, 1% DMSO, PG (to excyst cells and to be used for positive growth control). The total well volume for all wells was 100 µL. The drug exposed plates were screened at 27° C. for 6 or 24 hours only. At the exposure time point the plates were centrifuged at 4000 rpm at 25° C. for 10 minutes and washed twice with phosphate-buffered saline (PBS) to remove any residual experimental compound.

Example 37. Excystation/Viability Determination Assay Procedure

Once the plate(s) underwent the Encystation drug susceptibility process, all wells except the negative growth control and NEM blank wells received PG growth medium. All plates were left to recover at 27° C. for the strain specific time period of 5, 9 or 11 days depending on the species of *Acanthamoeba*. At each of the strain specific time points the plates were removed from incubation and microscopically analysed (qualitatively) for the excystation process for the emergence of excysted viable trophozoites or residual cysts. The presence of excysted trophozoites indicated viable amoebae (non-cystistatic or cysticidal—no effect) and the absence of excystation was considered as cystistatic/cysticidal effects. Once qualitatively assessed, 25 µl of CellTiter-Glo (CTG-Promega) 2.0 luminescent cell viability reagent was used to quantitatively assess the presence of ATP in lysed amoeba since cysts are resistant to this lysis or dormant and produce little cellular ATP. After the addition of CTG the contents of each well/plate was transferred from the Corning clear 96 well treated tissue culture plate to a Nunc white 96 well treated tissue culture plate and relative light unit values were determined at 470 nm using the SpectraMax i3X plate reader (Molecular Devices, Sunnyvale, CA). Curve fitting using nonlinear regression was carried out using DataAspects Plate Manager analysis software to obtain cysticidal IC$_{50}$ and IC$_{90}$ values.

As cells were removed during the 5× media changes for the 30 day time point at concentrations of drugs that allowed excystation, only qualitative, microscopic analysis was performed. This time point determined compounds that have a cystistatic or cysticidal property. Cystistatic compounds inhibit the excystation process at the strain specific time point, but then cells recover up to the 30 day time point. Cysticidal compounds completely stop the excystation process and do not allow any cells to recover up to the 30 day time point. This is reported as the minimum cysticidal concentration or MCC in Table 5.

Example 38. Anti-*Acanthamoeba* Activity Compounds A-T

The results of the above anti-*Acanthamoeba* studies are provided in Table 5. All of the compounds of Formula A-T had 30 day cysticidal activity at the minimum concentrations reported with minimal toxicity to human cells (A549 cells) as compared using the selectivity index (SI). Most compounds reported had an SI>1, meaning that the 30 day MCC was greater than the $IC_{50}$ reported for the A549 cell line. In comparison, alexidine and chlorhexidine had low SI values of 0.29 and 0.03, respectively, showing that these compounds would be significantly toxic at the concentrations necessary to have a cysticidal effect. Additionally, one of the current standard treatments for *Acanthamoeba* keratitis, PH1 MB, shows no cysticidal effect at all in these studies.

Previous in vitro testing has shown that pentamidine may be the most effective drug against *B. mandrillaris* at 10 ug/ml (29.38 μM), while amphotericin B exhibits marginal effects and azithromycin, clarithromycin, and TMP-SMX have no effect (Schuster F L, Visvesvara G S. Axenic growth and drug sensitivity of *Balamuthia mandrillaris*, an agent of amebic meningoencephalitis humans and other animals. J Clin Microbiol 1996; 34:385-8). The compounds described herein are more active than pentamide. For example, Compound I ($IC_{50}$=50 nM) is 587.6 times more potent than

TABLE 5

Activity for Compounds A-T against *Acanthamoeba*

| Compound | *A. cactellanii* Trophozoite $IC_{50}$ (μM) | A549 cell $IC_{50}$ (μM) | *A. castellanii* 30 day MCC (μM) | SI | *A. healyi* 30 day MCC (μM) | SI | *A. culbertsoni* 30 day MCC (μM) | SI |
|---|---|---|---|---|---|---|---|---|
| A | 1.19 | 32.69 | 47.38 | 0.69 | 7.90 | 4.14 | 7.90 | 4.14 |
| B | 0.54 | 17.09 | 9.60 | 1.78 | 3.84 | 4.45 | 2.88 | 5.94 |
| C | 1.22 | 34.83 | 23.12 | 1.51 | 23.12 | 1.51 | 11.56 | 3.01 |
| D | 0.31 | 4.17 | 3.40 | 1.23 | 3.40 | 1.23 | 1.27 | 3.28 |
| E | 0.22 | 3.79 | 2.75 | 1.38 | 1.83 | 2.07 | 1.83 | 2.07 |
| F | 0.59 | 13.73 | 5.29 | 2.60 | 3.52 | 3.90 | 5.29 | 2.60 |
| G | 0.26 | 6.02 | 1.75 | 3.44 | 1.75 | 3.44 | 1.75 | 3.44 |
| H | 0.27 | 3.11 | 1.88 | 1.65 | 1.88 | 1.65 | 1.88 | 1.65 |
| I | 0.71 | 3.46 | 4.20 | 0.82 | 4.20 | 0.82 | 8.41 | 0.41 |
| J | 0.95 | 4.03 | 11.21 | 0.36 | 9.34 | 0.43 | 7.47 | 0.54 |
| K | 1.10 | 4.03 | 9.65 | 0.42 | 7.72 | 0.52 | 7.89 | 1.39 |
| L | 0.39 | 4.17 | 2.88 | 1.45 | 2.88 | 1.45 | 2.88 | 1.45 |
| M | 0.39 | 3.92 | 2.85 | 1.38 | 3.80 | 1.03 | 5.70 | 0.69 |
| N | 0.56 | 3.92 | 9.20 | 0.43 | 5.52 | 0.71 | 3.68 | 1.07 |
| O | 0.67 | 3.71 | 11.38 | 0.33 | 11.38 | 0.33 | 11.38 | 0.33 |
| P | 0.81 | 4.91 | 17.98 | 0.27 | 9.99 | 0.49 | 19.98 | 0.25 |
| Q | 0.41 | 3.51 | 3.60 | 0.98 | 3.60 | 0.98 | 2.70 | 1.30 |
| R | 0.55 | 4.18 | 2.66 | 1.57 | 3.56 | 1.18 | 2.66 | 1.57 |
| S | 2.79 | 2.95 | 2.81 | 1.05 | 1.87 | 1.58 | 0.93 | 3.16 |
| T | 1.13 | 31.42 | 11.42 | 2.75 | 7.61 | 4.13 | 5.71 | 5.51 |
| Alexidine HCL | 1.71 | 1.58 | 5.37 | 0.29 | 5.37 | 0.29 | 5.37 | 0.29 |
| Chlorhexidine | 1.01 | 3.08 | 100.00 | 0.03 | 100.00 | 0.03 | 100.00 | 0.03 |
| PHMB | 11.48 | 12.64 | No effect | No effect | No effect | No effect | No effect | No effect |

Example 39. Activity of Select Compounds against *Balamuthia mandrillaris* and *Acanthamoeba* Trophozoites

*Balamuthia mandrillaris* trophozoites were thawed and grown in 10 ml of BM-3 medium. The BM-3 media composition was Bacto Casitone (20 g/L, pancreatic digest of casein from animal origin is manufactured under controlled conditions to retain its nutritional content. Enzymatic digest results in a high content of free amino acids and peptides of varying sizes, no other composition information given), 68 ml/L of Hanks' balanced salts (composition includes; 12.61 mM $CaCl_2$ (1400 mg/L), 4.93 mM Mg $Cl_2.6H_2O$ (1 g/L), 4.06 mM $MgSO_4.7H_2O$ (1 g/L), 53.33 mM KCl (4 g/L), 4.41 mM $KH_2PO_4$ (600 mg/L), 1.38 M NaCl (8 g/L), 3.36 mM $Na_2HPO_4.7H_2O$ (900 mg/L), 55.55 mM D-Glucose (Dextrose) (1 g/L)), 912 ml of deionised water. After autoclaving, complete BM-3 media was produced by the addition of 10% fetal bovine serum and 125 μg of penicillin/streptomycin antibiotics. Select compounds were then tested against the *B. mandrillaris* trophozoites and the results are shown in Table 6. The table describes all of the compounds and the activity against *Balamuthia* trophozoites compared to the activity for select *Acanthamoeba* trophozoites shown in Table 5. The compounds are also compared to the currently suggested therapeutics.

pentamide as reported in Schuster et al. and Compound A ($IC_{50}$=600 nM) is 48.9 times more potent.

TABLE 6

Trophozoite Activity for Compounds A-T

| Compound | *Balamuthia mandrillaris*- n = 2 | | *Acanthamoeba castellanii*- n = 2 | |
|---|---|---|---|---|
| | $IC_{50}$ (μM) | SEM (±) | $IC_{50}$ (μM) | SEM (±) |
| A | 0.60 | 0.25 | 1.19 | 0.23 |
| B | 0.40 | 0.07 | 0.54 | 0.12 |
| C | 0.49 | 0.08 | 1.22 | 0.37 |
| D | 0.10 | 0.05 | 0.31 | 0.04 |
| E | 0.11 | 0.05 | 0.77 | 0.00 |
| F | 0.59 | 0.04 | 0.59 | 0.01 |
| G | 0.11 | 0.11 | 0.26 | 0.01 |
| H | 0.10 | 0.03 | 0.27 | 0.03 |
| I | 0.05 | 0.01 | 0.71 | 0.23 |
| J | 0.08 | 0.02 | 0.95 | 0.14 |
| K | 0.14 | 0.03 | 1.10 | 0.32 |
| L | 0.08 | 0.04 | 0.39 | 0.08 |
| M | 0.08 | 0.04 | 0.39 | 0.09 |
| N | 0.12 | 0.04 | 0.56 | 0.11 |
| O | 0.13 | 0.04 | 0.67 | 0.10 |
| P | 0.18 | 0.04 | 0.81 | 0.08 |
| Q | 0.10 | 0.02 | 0.41 | 0.07 |

TABLE 6-continued

Trophozoite Activity for Compounds A-T

| Compound | Balamuthia mandrillaris- n = 2 IC$_{50}$ (µM) | SEM (±) | Acanthamoeba castellanii- n = 2 IC$_{50}$ (µM) | SEM (±) |
|---|---|---|---|---|
| R | 0.20 | 0.11 | 0.55 | 0.09 |
| S | 0.06 | 0.03 | 2.79 | |
| T | 0.14 | 0.09 | 1.13 | 0.15 |
| U | 0.15 | 0.01 | 1.44 | 0.31 |
| V | 0.07 | 0.02 | 1.03 | 0.16 |
| W | 0.29 | 0.06 | 33.29 | 2.21 |
| X | 0.10 | 0.04 | 0.62 | 0.07 |
| Y | 0.09 | 0.03 | 0.95 | 0.11 |
| Z | 0.28 | 0.09 | 1.87 | 0.27 |
| AA | 0.06 | 0.00 | 0.73 | 0.22 |
| AB | 0.26 | 0.10 | 1.44 | 0.46 |
| AC | 0.39 | 0.19 | 1.03 | 0.22 |
| AD | 0.13 | 0.04 | 0.83 | 0.37 |
| AE | 0.38 | 0.09 | 1.09 | 0.36 |
| AF | 0.13 | 0.04 | 0.75 | 0.01 |
| AG | 0.05 | 0.01 | 0.31 | 0.06 |
| AH | 0.09 | 0.04 | 1.89 | |
| AI | 0.07 | 0.04 | 2.92 | |
| AJ | 0.05 | 0.02 | 0.46 | 0.02 |
| AK | 0.08 | 0.00 | 28.84 | 4.18 |
| AL | 0.28 | 0.06 | 2.33 | 0.23 |
| AM | 0.13 | 0.07 | 1.93 | 0.61 |
| AN | 0.23 | 0.15 | 0.48 | 0.00 |
| AO | 0.25 | 0.15 | 2.96 | 0.90 |
| AP | 0.40 | 0.04 | 47.61 | 2.33 |
| AQ | 0.42 | 0.04 | 13.21 | 1.87 |
| AR | 0.66 | 0.11 | 2.01 | 0.54 |
| AS | 0.28 | 0.13 | 2.40 | 0.30 |
| AT | 0.40 | 0.31 | 1.25 | 0.07 |
| AU | 0.36 | 0.04 | 2.44 | 0.18 |
| AV | 0.68 | 0.14 | 0.37 | 0.03 |
| AW | 0.35 | 0.11 | 13.70 | |
| AX | 0.35 | 0.04 | 6.05 | |
| AY | 0.04 | 0.01 | 5.99 | |
| AZ | 0.04 | 0.01 | 0.55 | 0.01 |
| BA | 0.05 | 0.02 | 1.70 | |
| BB | 0.10 | 0.06 | 2.99 | |
| BC | 0.25 | 0.00 | >67.79 | |
| BD | 0.35 | 0.12 | 5.71 | |
| BE | 0.38 | 0.05 | 4.91 | |
| BF | 0.41 | 0.18 | 3.87 | |
| BG | 0.47 | 0.16 | 3.10 | |
| BH | 0.50 | 0.18 | 17.63 | |

All publications and patent applications cited in this specification are herein incorporated by reference as if each individual publication or patent application were specifically and individually indicated to be incorporated by reference.

Although the foregoing invention has been described in some detail by way of illustration and example for the purposes of clarity of understanding, it will be readily apparent to one of ordinary skill in the art in light of the teaching of this invention that certain changes and modifications may be made thereto without departing from the spirit and scope of the invention as defined in the appended claims.

What is claimed is:

1. A compound of Formula 2 or Formula 3:

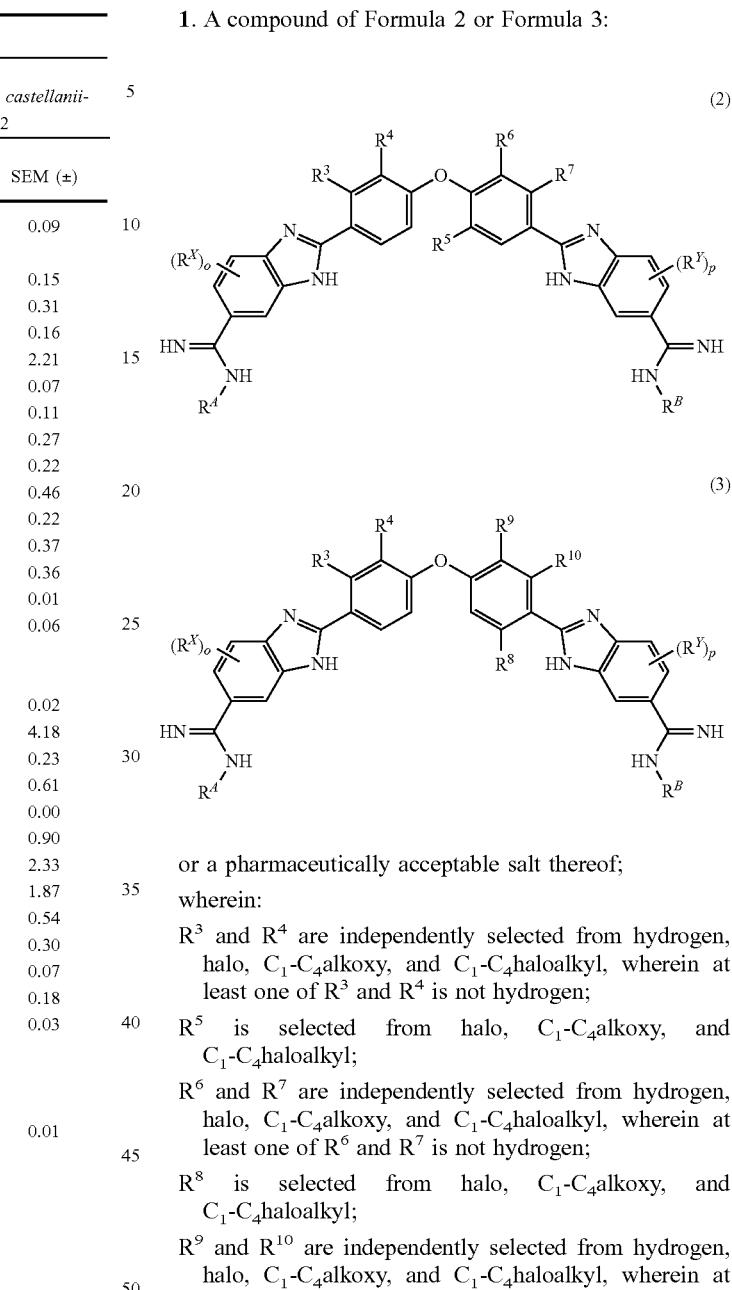

or a pharmaceutically acceptable salt thereof;

wherein:

$R^3$ and $R^4$ are independently selected from hydrogen, halo, $C_1$-$C_4$alkoxy, and $C_1$-$C_4$haloalkyl, wherein at least one of $R^3$ and $R^4$ is not hydrogen;

$R^5$ is selected from halo, $C_1$-$C_4$alkoxy, and $C_1$-$C_4$haloalkyl;

$R^6$ and $R^7$ are independently selected from hydrogen, halo, $C_1$-$C_4$alkoxy, and $C_1$-$C_4$haloalkyl, wherein at least one of $R^6$ and $R^7$ is not hydrogen;

$R^8$ is selected from halo, $C_1$-$C_4$alkoxy, and $C_1$-$C_4$haloalkyl;

$R^9$ and $R^{10}$ are independently selected from hydrogen, halo, $C_1$-$C_4$alkoxy, and $C_1$-$C_4$haloalkyl, wherein at least one of $R^9$ and $R^{10}$ is not hydrogen;

$R^X$ and $R^Y$ are independently selected at each occurrence from halo, $C_{1-4}$alkoxy, and $C_1$-$C_4$haloalkyl;

o and p are independently selected 0, 1, 2, and 3; and $R^A$ and $R^B$ are independently $C_1$-$C_6$alkyl.

2. The compound of claim 1, wherein one of $R^3$ and $R^4$ is a halogen.

3. The compound of claim 1, wherein two of $R^3$ and $R^4$, $R^5$, $R^6$ and $R^7$ are selected from a halogen.

4. The compound of claim 1, wherein two of $R^3$, $R^4$, $R^8$, $R^9$ and $R^{10}$ are selected from a halogen.

5. The compound of claim 1, wherein one of $R^3$, $R^4$, $R^8$, and $R^9$ is selected from $C_1$-$C_4$alkoxy.

6. The compound of claim 1, wherein $R^A$ and $R^B$ are isopropyl.

7. The compound of claim 1, wherein the compound is selected from:

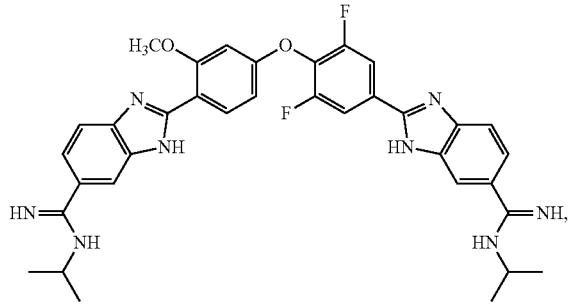
(A)

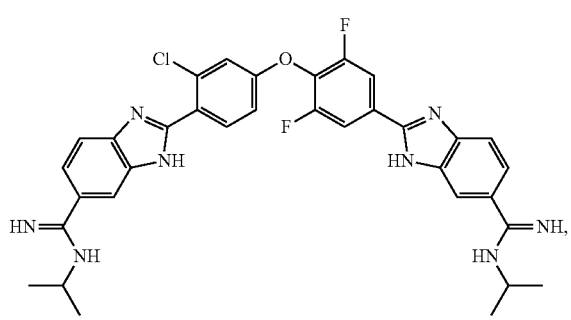
(B)

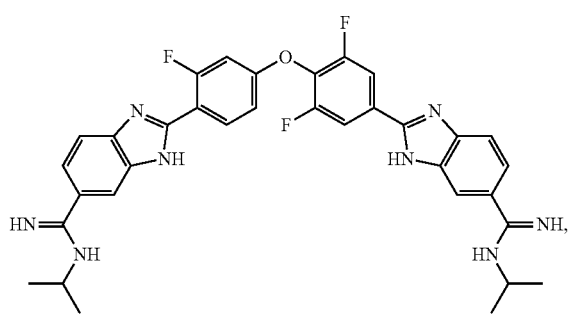
(C)

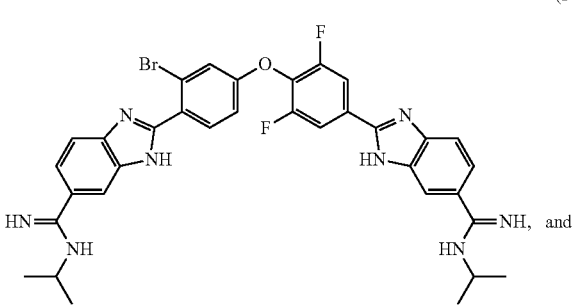
(F)

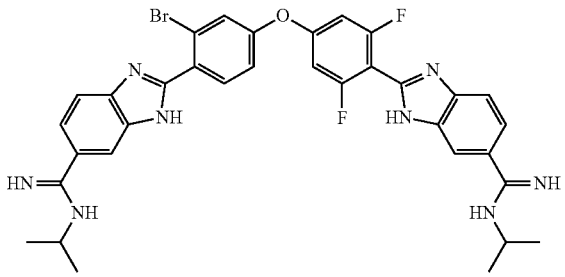
(G)

or a pharmaceutically acceptable salt thereof.

8. A pharmaceutical composition comprising a compound of claim 1 or a pharmaceutically acceptable salt thereof, optionally in a pharmaceutically acceptable carrier.

9. A method for treating an eye infection caused by one or more *Acanthamoeba* species in a host in need thereof comprising administering an effective amount of a compound of claim 1, optionally in a pharmaceutically acceptable carrier.

10. The method of claim 9 wherein the eye infection is *Acanthamoeba keratitis*.

11. The method of claim 9, further comprising administering an effective amount of an additional therapeutic agent selected from alexidine, chlorhexidine, polyhexamethylene biguanide (PHMB), propamidine isethionate, hexamidine isethionate, natamycin, neomycin, ketoconazole, itraconazole, polymyxin B, gramicidin, voriconazole, miconazole nitrate, pentamidine, octamidine, fluconazole, miltefosine, and combinations thereof.

12. The method of claim 9, wherein the one or more *Acanthamoeba* species are present as both cysts and trophozoites.

13. The method of claim 9, wherein the host is treated with the compound for at least 1 day, at least 3 days, at least 5 days, at least 10 days, at least 20 days, at least 30 days, at least 40 days, or at least 50 days.

14. The method of claim 9 wherein the host is a human.

15. A method for disinfecting one or more *Acanthamoeba* species from a solid, liquid or gel object comprising administering an effective amount of a compound of claim 1, optionally in a pharmaceutically acceptable carrier.

16. The method of claim 15, wherein the object is selected from an application, a dressing, contact lens, an optical implant, a contact lens solution, an ocular solution and rewetting eye drops.

17. A method for treating an infection caused by *Balamuthia mandrillaris* in a host in need thereof comprising administering an effective amount of a compound of claim 1, optionally in a pharmaceutically acceptable carrier.

18. The method of claim 17, wherein the infection caused by *Balamuthia mandrillaris* is granulomatous amoebic encephalitis.

19. The method of claim 17, wherein the *Balamuthia mandrillaris* is present as both cysts and trophozoites.

20. A disinfecting solution comprising an effective amount of a compound of claim 1 in an aqueous carrier.

21. A contact lens care solution comprising an effective amount of a compound of claim 1 in a suitable aqueous carrier.

22. A method for treating an infection caused by one or more *Acanthamoeba* species in a host in need thereof comprising administering an effective amount of a compound of claim 1 or a pharmaceutically acceptable salt thereof.

23. The method of claim 22 wherein the infection is *Acanthamoeba keratitis*.

24. The method of claim 22, wherein the one or more *Acanthamoeba* species are present as both cysts and trophozoites.

25. The method of claim 22, wherein the host is treated with the compound for at least 1 day, at least 3 days, at least 5 days, at least 10 days, at least 20 days, at least 30 days, at least 40 days, or at least 50 days.

26. The method of claim 22, wherein the host is a human.

27. A compound selected from the group consisting of:

(D)

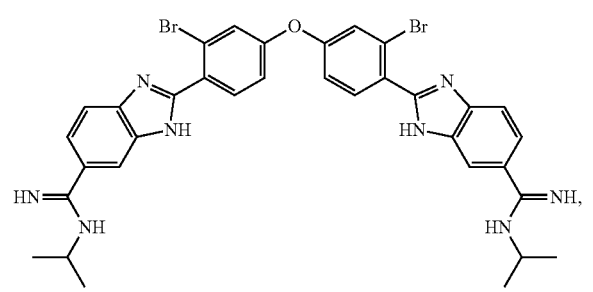

(E)

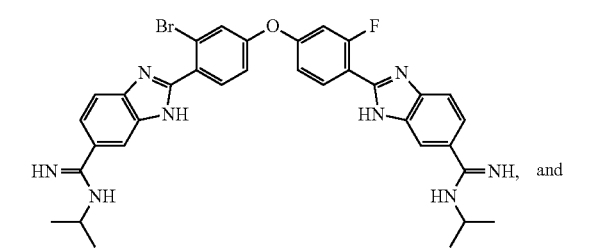

(H)

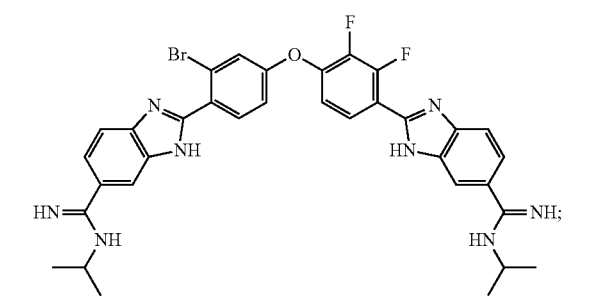

(J)

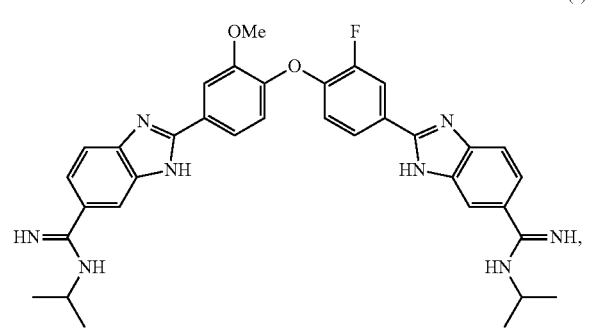

-continued (K)

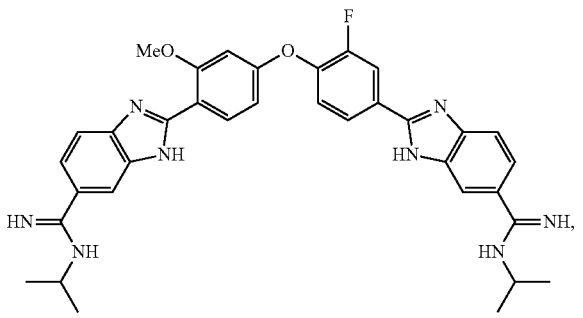

(L)

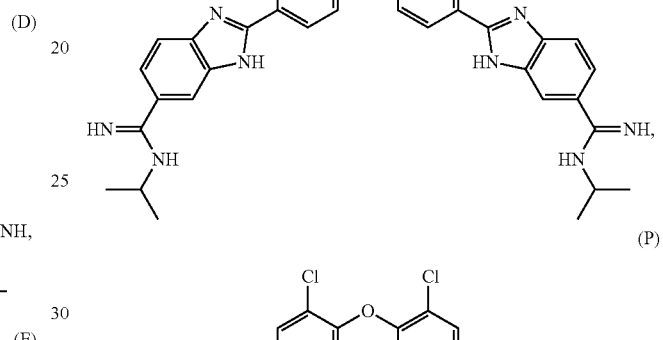

(P)

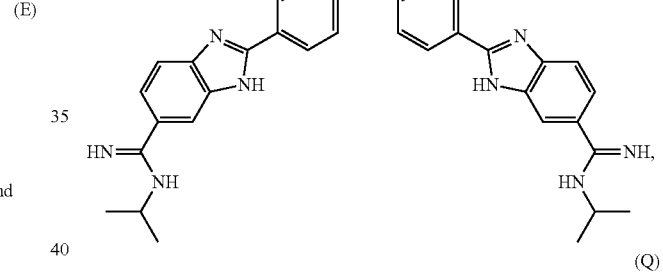

(Q)

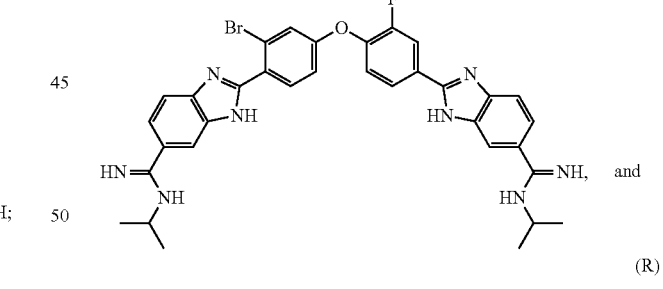

(R)

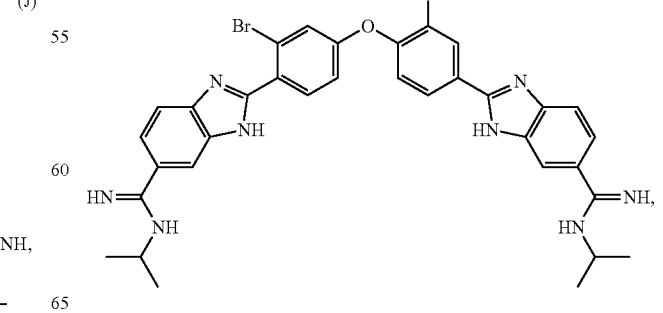

or a pharmaceutically acceptable salt thereof.

28. A method for treating an infection caused by *Balamuthia mandrillaris* or a *Acanthamoeba* species in a host comprising administering an effective amount of a compound from the group consisting of:
(D)
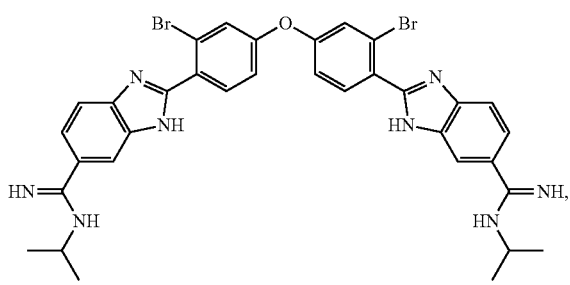
(E)
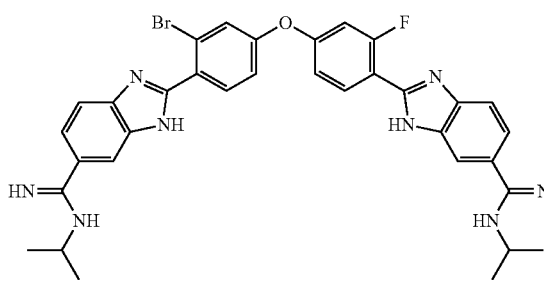
(H)
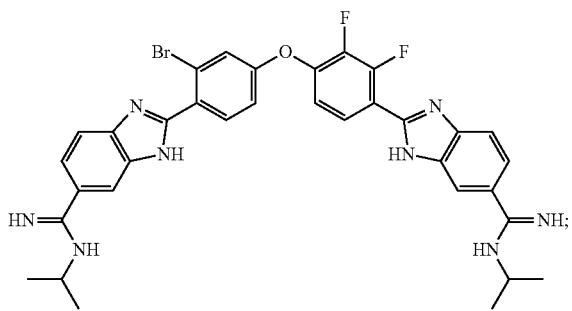
(J)
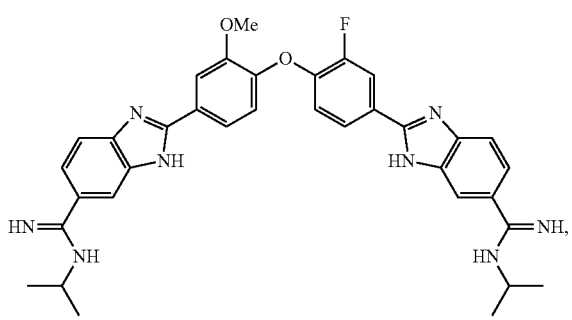
(K)
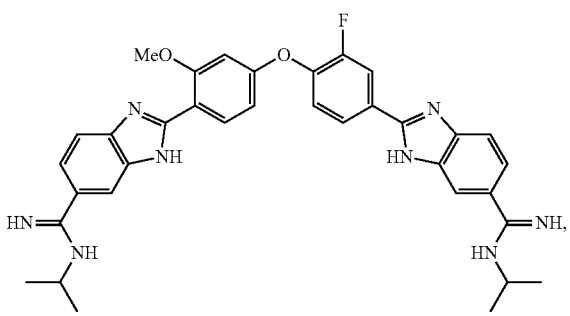
(L)
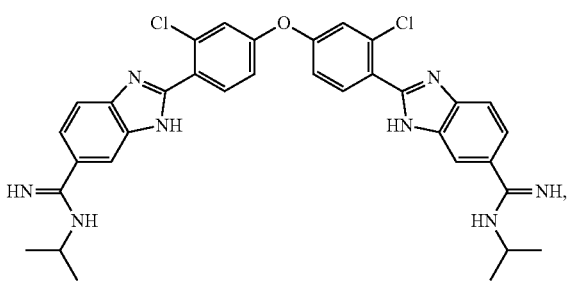
(P)
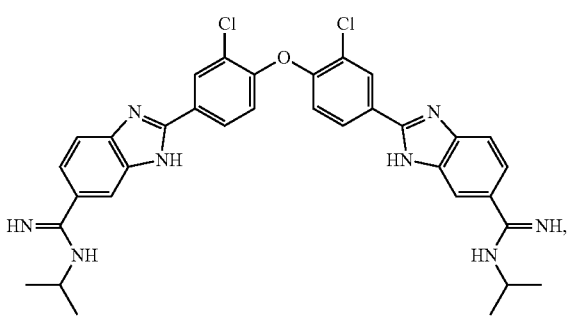
(Q)
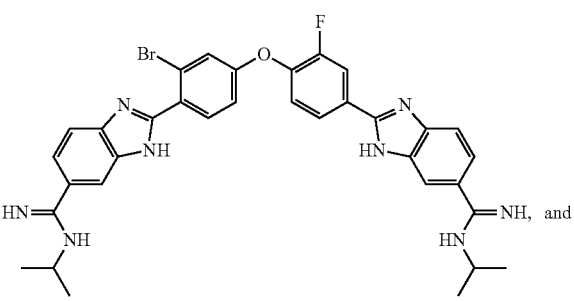

-continued
(R)
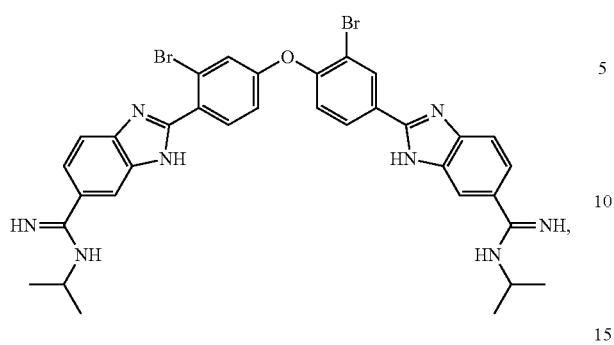
or a pharmaceutically acceptable salt thereof.
* * * * *